US008874023B2

(12) United States Patent
Elzinga et al.

(10) Patent No.: US 8,874,023 B2
(45) Date of Patent: **\*Oct. 28, 2014**

(54) SYSTEMS AND METHODS FOR PROVIDING A DYNAMIC CONTINUAL IMPROVEMENT EDUCATIONAL ENVIRONMENT

(75) Inventors: C. Bret Elzinga, Springville, UT (US); Kent S. Parry, Alpine, UT (US); Sherrie L. Spencer, Provo, UT (US); Joseph B. South, Provo, UT (US); Raeiyan Williams, Salt Lake City, UT (US)

(73) Assignee: Intellectual Reserve, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,877

(22) Filed: May 21, 2012

(65) Prior Publication Data
US 2013/0130219 A1 May 23, 2013

Related U.S. Application Data

(63) Continuation of application No. 10/632,892, filed on Jul. 31, 2003, now Pat. No. 8,182,270.

(51) Int. Cl.
*G09B 7/02* (2006.01)
*G09B 5/00* (2006.01)
*G09B 7/00* (2006.01)

(52) U.S. Cl.
CPC ... *G09B 7/00* (2013.01); *G09B 5/00* (2013.01)
USPC ........................................................ 434/350

(58) Field of Classification Search
USPC .................................. 434/322, 323, 350, 365
See application file for complete search history.

(56) References Cited

U.S. PATENT DOCUMENTS

| | | |
|---|---|---|
| 4,637,797 A | 1/1987 | Whitney et al. |
| 5,302,132 A | 4/1994 | Corder |
| 5,306,154 A | 4/1994 | Ujita et al. |
| 5,316,485 A | 5/1994 | Hirose |
| 5,318,450 A | 6/1994 | Carver |
| 5,387,104 A | 2/1995 | Corder |
| 5,395,243 A | 3/1995 | Lubin et al. |
| 5,441,415 A | 8/1995 | Lee et al. |
| 5,442,782 A | 8/1995 | Malatesta et al. |
| 5,486,111 A | 1/1996 | Watkins |
| 5,503,560 A | 4/1996 | Stentiford |
| 5,565,316 A | 10/1996 | Kershaw et al. |
| 5,597,312 A | 1/1997 | Bloom et al. |
| 5,788,508 A | 8/1998 | Lee et al. |
| 5,797,754 A | 8/1998 | Griswold et al. |
| 5,810,605 A | 9/1998 | Siefert |

(Continued)

*Primary Examiner* — Robert J Utama
(74) *Attorney, Agent, or Firm* — David B. Tingey; Kirton McConkie

(57) ABSTRACT

Dynamic systems and methods for gathering/tracking data, automatically adapting to an individual's pace of learning, selectively determining the type of content provided to an individual, selectively providing an exposure frequency for the content, and/or enabling rapid design modifications within the educational environment. Educational content is dynamically designed and customizably presented to an individual learner. An analysis is performed on the data to optimize learning. Modifications are selectively or automatically made to the educational content. The process of designing, implementing, analyzing, and selectively modifying creates a cycle that optimizes the learning process and adapts to individual learners. Furthermore, the educational content is dynamically provided to the learner on an iterative basis according to the need of that learner in the learning process.

18 Claims, 46 Drawing Sheets

(56) References Cited

U.S. PATENT DOCUMENTS

| | | | |
|---|---|---|---|
| 5,957,669 A | 9/1999 | Parikh et al. | |
| 6,077,085 A * | 6/2000 | Parry et al. | 434/322 |
| 6,293,801 B1 | 9/2001 | Jenkins et al. | |
| 6,409,514 B1 | 6/2002 | Bull | |
| 6,633,742 B1 | 10/2003 | Turner et al. | |
| 6,652,285 B1 | 11/2003 | Breivik | |
| 6,669,486 B2 | 12/2003 | Frankenbery et al. | |
| 6,834,276 B1 | 12/2004 | Jensen et al. | |
| 7,029,280 B2 * | 4/2006 | Krebs et al. | 434/118 |
| 2002/0098468 A1 | 7/2002 | Barrett et al. | |
| 2002/0120593 A1 | 8/2002 | Iemoto et al. | |
| 2002/0160347 A1 | 10/2002 | Wallace et al. | |
| 2002/0188583 A1 * | 12/2002 | Rukavina et al. | 706/45 |
| 2003/0222890 A1 | 12/2003 | Salesin et al. | |
| 2004/0152055 A1 | 8/2004 | Gliessner et al. | |

* cited by examiner

SYSTEMS AND METHODS FOR PROVIDING A DYNAMIC CONTINUAL IMPROVEMENT EDUCATIONAL ENVIRONMENT

RELATED APPLICATIONS

This application claims priority to and is a continuation of U.S. patent application Ser. No. 10/632,892, filed Jul. 31, 2003, entitled SYSTEMS AND METHODS FOR PROVIDING A DYNAMIC CONTINUAL IMPROVEMENT EDUCATIONAL ENVIRONMENT, which is incorporated herein by reference.

BACKGROUND OF THE INVENTION

1. Field of the Invention

The present invention relates to providing a dynamic continual improvement educational environment. In particular, the present invention relates to dynamic systems and methods for gathering/tracking data, automatically adapting to an individual's pace of learning, selectively determining the type of content provided to an individual, selectively providing an exposure frequency for the content, and/or enabling rapid design modifications within the educational environment.

2. Background and Related Art

Historically, a variety of techniques have been utilized to teach educational concepts with varying degrees of success. Some techniques include instructor-led classrooms, wherein a group of students are exposed to lessons given by the instructor. While this technique is available, a typical ratio of instructor per number of students limits the amount of individualized training that can occur with the students.

The emergence of the personal computer has allowed for electronic teaching techniques to be used, including a technique that allows multimedia to be used. Enhanced presentations are used in classroom environments to provide exciting/captivating educational lessons. While this technique may yield more interesting lessons, the amount of individualized training is not increased.

Computers have been utilized in other teaching techniques, such as computer based training (CBT) or computer based instruction (CBI). These computer based techniques allow a student to interface with a computer program having instructional content rather than an instructor to enable the classes to be available at the convenience of the student. Thus, while instructor-led classes can become full, computer based classes are always available.

In some computer based training, a series of static electronic lessons are provided that are separated by a prompt-response testing procedure. The testing procedure determines whether the student is allowed to progress to the next lesson or is alternatively required to return to additional instruction on the tested subject matter to better understand the material. These techniques monitor student progress and disseminate additional information as the student progresses.

Other educational techniques employ computer technology, but are limited in scope to particular fields of instruction (e.g., instruction on the use of computer programs) or are limited in format to specific media (e.g., text and simulation exercises). Other techniques use lessons or objectives arranged in a predefined hierarchy, or focus on monitoring and evaluating the student rather than on providing instruction to the student.

Many current educational techniques utilize a static lesson format that is typically arranged in a predefined order. The lesson format is irrelevant to the individual needs of each student and requires conformity to a static learning method that may not fit a student's specific learning needs.

Thus, while educational techniques are available for use in teaching educational content, challenges still exist with the current techniques. For example, current techniques are typically static in nature, are time consuming in their creation, and the underlining principles of particular techniques are not strictly followed, preventing accurate analysis of their implementation. Accordingly, it would be an improvement in the art to augment or even replace current techniques with other techniques.

SUMMARY OF THE INVENTION

The present invention relates to providing a dynamic continual improvement educational environment. In particular, the present invention relates to dynamic systems and methods for gathering/tracking data, automatically adapting to a characteristic of an individual (e.g., the individual's pace, background, style, and/or progress in learning), selectively determining the type and difficulty of content provided to an individual, selectively providing an exposure frequency for the content, and/or enabling rapid design modifications within the educational environment.

Implementations of the present invention take place in association with a dynamic learning process that includes the ability to design or develop an educational experience or otherwise provide educational lessons (e.g., educational activities, educational content, etc.). The designing of the educational experience or lesson is facilitated by utilizing an object oriented format, a drag-and-drop interface, or other process that facilitates design development of educational content and does not require a computer programmer to develop the educational experience. Once designed, the implementation of the educational lesson is experienced by an individual, sometimes in collaboration with a peer or tutor, and includes providing instruction and gathering data. An analysis is performed on the data to optimize learning. The analysis corresponds to a particular individual, group and/or educational lesson. Modifications are selectively or automatically made to the educational lesson. The process of designing, implementing, analyzing, and selectively modifying creates a cycle that optimizes the learning process and adapts to groups and individual learners with the goal of improving learning outcomes and efficiency.

At least some implementations of the present invention embrace the utilization of a computer device in designing and developing educational lessons, implementing educational lessons, performing analysis and/or providing modifications. An individual learner/student may interface with the computer device in the educational environment and may additionally interface with an instructor. If the instructor (or a peer) is at a distant location, their collaboration may be mediated through multiple computers connected to the internet or some other network.

Within the environment, the educational lesson or content is dynamically provided to the learner on an iterative basis according to the need of that learner in the learning process. Learner performance data is gathered and is selectively used to adjust the pace of learning, to modify the frequency of exposure to particular content, and to regulate the type and difficulty of content to which the learner is exposed.

Aspects of the educational environment are easily and/or automatically adapted to a learner's performance. For example, if an analysis of user data indicates that a given learning activity needs an additional feature, that feature can quickly be added or created, such as through the use of a drag-and-drop interface. Similarly, if a given activity proves to be unhelpful, it can be immediately eliminated. Also, if a particular activity proves to be helpful to some learners, but not to others, entry conditions are set to only allow those learners that are predicted to benefit from the activity to be exposed to the activity. Factors or characteristics of the user that may be taken into account include age, native language, learning style, institution, background, interests, purpose in learning, degree of long-term retention desired, the breadth or depth of their overall mastery, and their need to be particularly well-prepared to use a certain subset of the information for an upcoming responsibility or engagement (such as an academic conference on a particular subject), etc.

Other learners skip or never experience the particular activity. Alternatively, they may be exposed to another educational activity. If a new activity would be useful to the learner, the new activity may be quickly provided or otherwise authored by a designer rather than a programmer.

Automatic or partially automated studies determine the effectiveness of particular lessons, activities, or other instructional design decisions. For example, an assignment may be made for a first test group to experience a first lesson and a second test group to experience a second lesson. In another example, one learning activity might be presented in a different way to one group than another group. In both examples, the groups are formed automatically by random assignment of treatment to subjects. The results of the two test groups are analyzed to determine the effectiveness of the two lessons in relation to each other.

The methods and processes of the present invention have proven to be particularly useful in the area of teaching a foreign language to the learner. However, those skilled in the art will appreciate that the methods and processes of the present invention can be used in a variety of different applications and in a variety of different educational environments to teach any type of educational topic or material. For example the educational content may embrace language, mathematics, science, technical training, cooking, medical procedures, a particular skill, professional training, or any other learning.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which:

FIGS. 12-13 illustrate a representative user interface for association with a content checker tool;

FIGS. 19-20 illustrate a representative user interface for association with a text importer tool;

FIG. 24 illustrates a representative user interface in association with a component tester tool;

FIGS. 25-27 illustrate a representative user interface in association with an instruction engine;

FIG. 36 illustrates a representative user interface in association with a frequency screen of a reports builder tool;

FIG. 40 illustrates another representative user interface relating to a group screen in association with a reports builder tool;

FIG. 41 illustrates a representative user interface in association with an edit screen relating to a reports builder tool, wherein the edit screen is on a question level;

FIG. 42 illustrates a representative user interface in association with an edit screen relating to a reports builder tool, wherein the edit screen is on an item level;

FIGS. 44-45 illustrate a representative user interface in association with a tutor guidance system; and FIG. 46 illustrates a representative user interface in association with a research organizer tool.

DETAILED DESCRIPTION OF THE INVENTION

Figure 1:
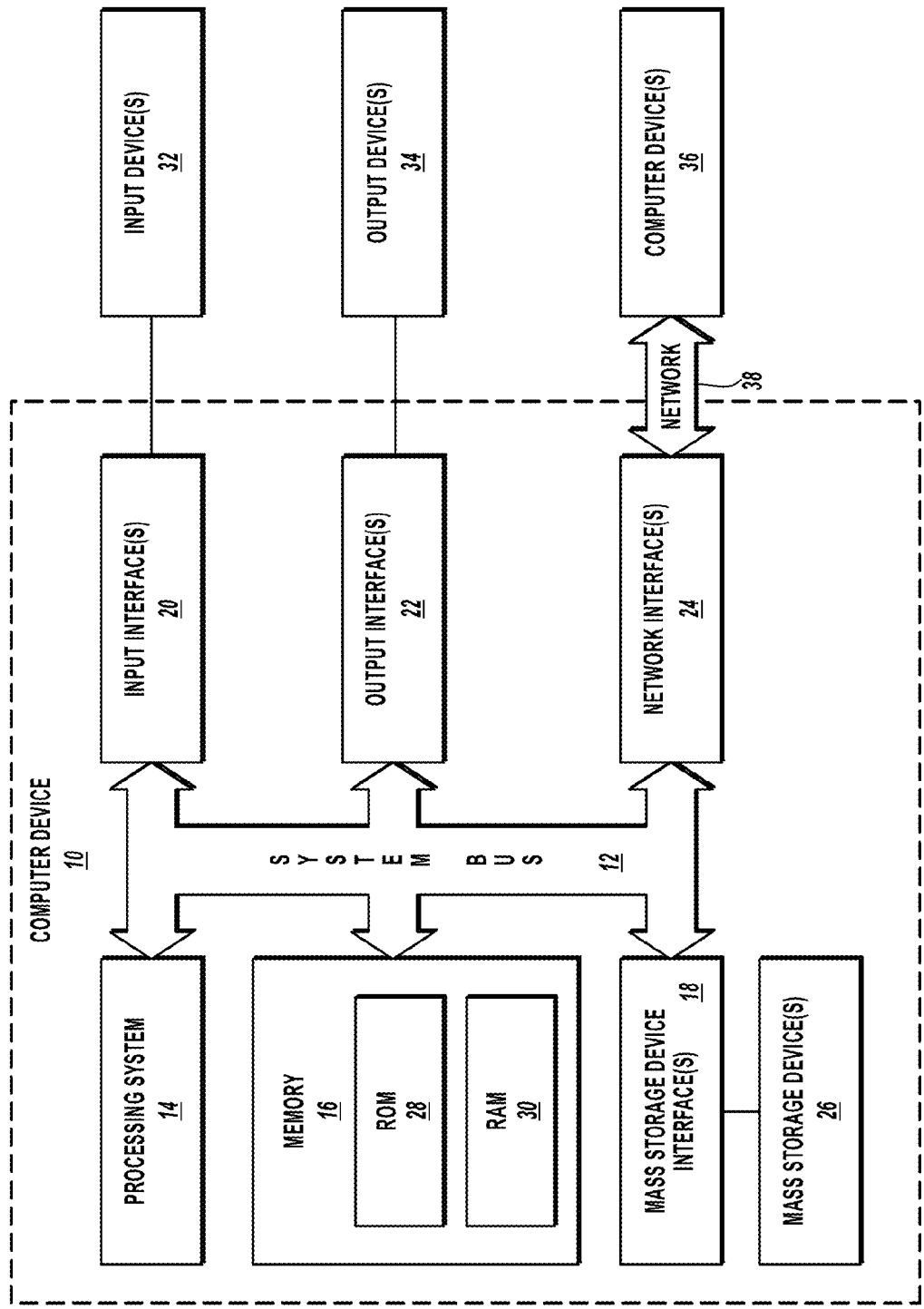
FIG. 1 illustrates a representative system that provides a suitable operating environment for use of the present invention.

The present invention relates to providing a dynamic continual improvement educational environment. In particular, the present invention relates to dynamic systems and methods for gathering/tracking data, automatically adapting to information about an individual (e.g., the individual's pace of learning, background, style of learning, progress in learning, etc.) selectively determining the type and difficulty of content provided to an individual, selectively providing an exposure frequency for the content, and/or enabling rapid design modifications within the educational environment.

In the disclosure and in the claims the term "design" or "designing" shall refer to any phase in creating, developing, organizing or crafting educational content for presentation to one or more users, including crafting how the educational content shall function, generating the instructional system or educational content for presentation, or the like.

Embodiments of the present invention take place in association with a dynamic learning process that includes the ability to design or develop an educational experience or otherwise provide educational lessons (e.g., educational activities, educational content, etc.). The designing of the educational experience or lesson is facilitated by utilizing an object oriented format, a drag-and-drop interface, or another design process that eases development. Once designed, the educational lesson is experienced by an individual, includes instruction and gathers data. An analysis is performed on the data to optimize learning, and may correspond to a particular individual, group and/or educational lesson. Modifications are selectively or automatically made to the educational lesson to enhance learning. The process of designing, implementing, analyzing, and selectively modifying creates a cycle that optimizes the learning process and adapts to groups and individual learners with the goal of improving learning outcomes and efficiency.

While the methods and processes of the present invention have proven to be particularly useful in the area of teaching a foreign language to the learner, and will be described in terms of teaching a foreign language, those skilled in the art will appreciate that the methods and processes of the present invention embrace a variety of different applications and/or a variety of different educational environments to teach any type of educational topic or material. For example the educational content may embrace language, mathematics, science, cooking, technical training, medical procedures, a particular skill, professional training, or any other educational learning.

The following disclosure of the present invention is grouped into two subheadings, namely "Exemplary Operating Environment" and "Dynamic Continual Improvement Educational Environment." The utilization of the subheadings is for convenience of the reader only and is not to be construed as limiting in any sense.

Exemplary Operating Environment

At least some embodiments of the present invention embrace the utilization of a computer device in designing educational lessons, implementing educational lessons, performing analysis and/or providing modifications. An individual learner/student may interface with the computer device in the educational environment and may additionally interface with an instructor. If the instructor (or a peer) is at a distant location, their collaboration may be mediated through multiple computers connected to the interne or some other network.

Accordingly, FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
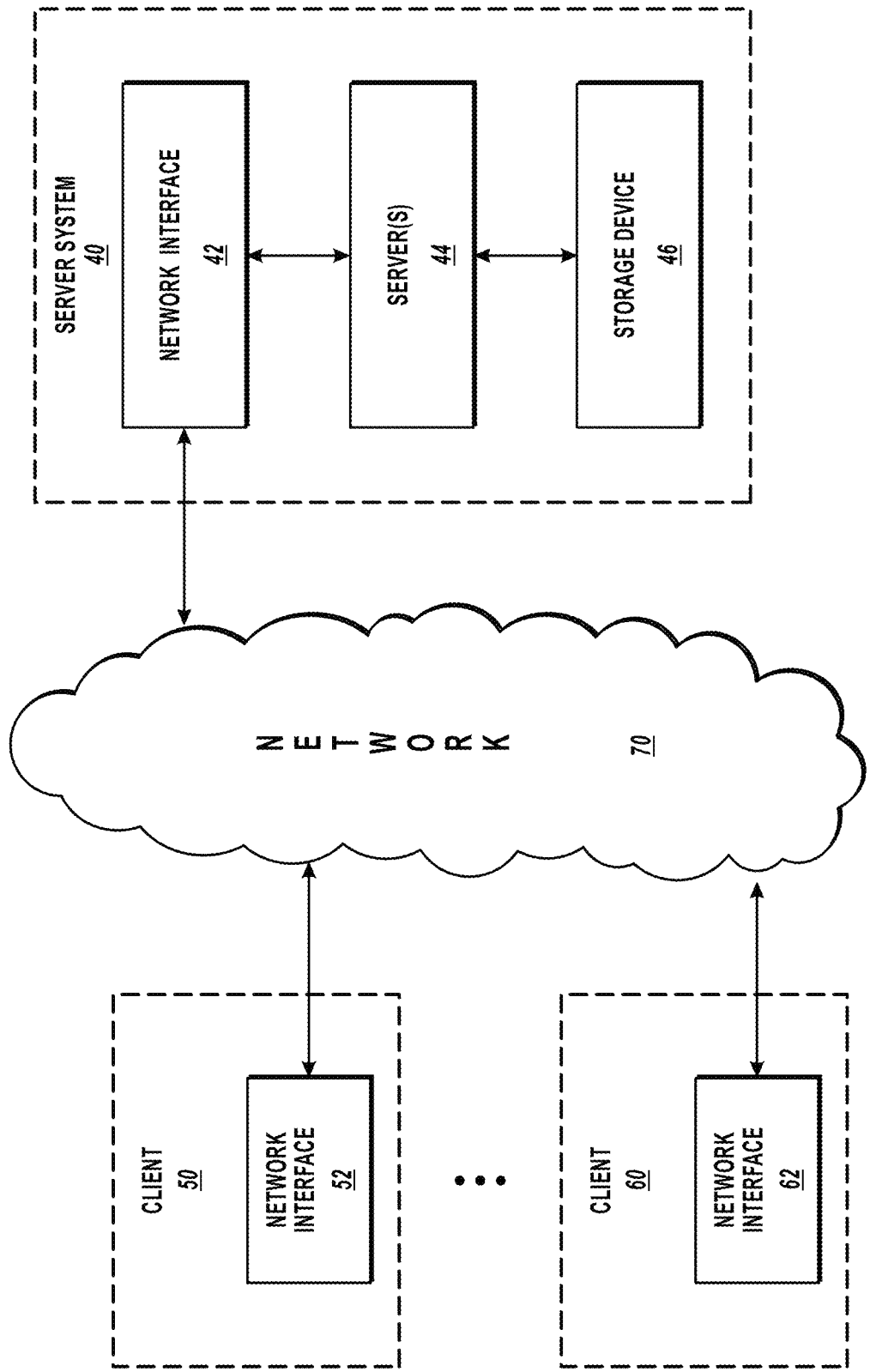
FIG. 2 illustrates a representative networked system for use in association with an embodiment of the present invention.

While those skilled in the art will appreciate that the invention may be practiced in a variety of computing environments, with many types of computer system configurations, including networked environments, FIG. 2 represents an embodiment of the present invention in a networked environment that includes a variety of clients connected to a server system via a network. While FIG. 2 illustrates an embodiment that includes multiple clients connected to the network, alternative embodiments include one client connected to a network, one server connected to a network, or a multitude of clients throughout the world connected to a network, where the network is a wide area network, such as the Internet. Moreover, embodiments of the present invention embrace non-networked environments, such as where a dynamic continual improvement educational, environment utilizes a single computer device. At least some embodiment of the present invention further embrace at least a portion of a dynamic continual improvement environment that does not require a computer device.

In FIG. 2, a representative networked configuration is provided for which learning occurs. Server system 40 represents a system configuration that includes one or more servers. Server system 40 includes a network interface 42, one or more servers 44, and a storage device 46. A plurality of clients, illustrated as clients 50 and 60, communicate with server system 40 via network 70, which may include a wireless network, a local area network, and/or a wide area network. Network interfaces 52 and 62 are communication mechanisms that respectfully allow clients 50 and 60 to communicate with server system 40 via network 70. For example, network interfaces 52 and 62 may be a web browser or other network interface. A browser allows for a uniform resource locator ("URL") or an electronic link to be used to access a web page sponsored by a server 44. Therefore, clients 50 and 60 may independently access or exchange information with server system 40.

As provided above, server system 40 includes network interface 42, servers 44, and storage device 46. Network interface 42 is a communication mechanism that allows server system 40 to communicate with one or more clients via network 70. Servers 44 include one or more servers for processing and/or preserving information. Storage device 46 includes one or more storage devices for preserving information, such as a particular record of data. Storage device 46 may be internal or external to servers 44.

In the illustrated embodiment of FIG. 2, the networked system is used to provide a dynamic continual improvement educational environment. In particular, the networked system provides dynamically gathers data, automatically adapts to an individual's pace of learning, selectively determines the type and difficulty of content provided to an individual, selectively provides an exposure frequency for the content, and/or enables rapid design modifications within the educational environment, as will be further discussed below. Those skilled in the art will appreciate that the networked system of FIG. 2 is a representative system in accordance with the present invention. Accordingly, embodiments of the present invention embrace other computer system configurations for performing methods disclosed herein.

Dynamic Continual Improvement Educational Environment

As provided above, embodiments of the present invention take place in association with a dynamic learning process that includes the ability to design or develop an educational experience or otherwise provide educational lessons (e.g., educational activities, educational content, etc.). The designing of the educational experience or lesson is facilitated by utilizing an object oriented format, a drag-and-drop interface, or another design process that eases development. Once designed, implementation of the educational lesson is experienced by an individual learner/student/tutor/administrator/user, and includes providing instruction focused to the user and gathering data relating to the user's learning. An analysis is performed on the data to optimize learning and may correspond to a particular individual, group, and/or educational lesson. Modifications are selectively or automatically made to the educational lesson. The process of designing, implementing, analyzing, and selectively modifying creates a cycle that optimizes the learning process and adapts to groups and/or individual learners with the goal of improving learning outcomes and efficiency.

As provided herein, within the environment the educational lesson or content is dynamically provided to the learner on an iterative basis according to the need of that learner in the learning process. For example, a systematic spaced review of content is dynamically provided to the learner/student based on the student's accuracy and speed in understanding educational concepts/lessons taught. The systematic spaced review facilitates retaining the educational concepts/lessons taught and customizes the teaching to the individual learner's ability to grasp the educational concepts taught. The systematic spaced review of content relates to how frequent and over what duration of time a learner sees an item based on accuracy and speed of the learner. Accordingly, it tracks the accuracy and speed of understanding concepts, and transitions the concepts from short-term to long-term memory.

Thus, learner performance data is gathered and is selectively used to adjust the pace of learning, to modify the frequency of exposure to particular content, to control the sequencing of learning activities and to regulate the type and difficulty of content to which the learner is exposed.

Aspects of the educational environment are easily and/or automatically adapted to a learner's performance. For example, one type of adaptivity in accordance with embodiments of the present invention includes providing an evaluation/pre-test prior to an educational lesson. The lesson is then filtered down to include only the portions that the user failed or did not know during the pre-test.

Another type of adaptivity in accordance with embodiments of the present invention relates to providing an evaluation prior to an educational lesson. Parallel versions of the same educational content are created and the user takes a pre-test to determine which is most suitable for his/her needs. After the version is selected, either automatically or by an instructor, the learner pursues only that version throughout the instruction.

Another type of adaptivity in accordance with embodiments of the present invention relates to branching or cascading. In this type of adaptivity, the user is able to selectively navigate through the educational content as the user desires. Evaluation is periodic and occurs at predetermined points to determine when and what type and difficulty of content is presented to the learner. At each evaluation point, there are a finite number of options that lead to potentially many more evaluation points, each with a finite number of options. In some embodiments, there are many ending points to the various branches, but the number is ultimately finite, unless an infinite loop is created (which is generally not desired). The total number of original paths through the material is predictable and finite (with the exception of the number of times a user may go through an infinite loop).

Another type of adaptivity in accordance with embodiments of the present invention relates to computer adaptive testing. This includes continuous and ongoing evaluation. Test items are preset and ranked. Educational content having a range of difficulty is presented to the student. The student's responses to the educational content assist in establishing a particular area of difficulty within the range for that student.

Another type of adaptivity in accordance with embodiments of the present invention relates to a performance feedback loop. This provides continuous and ongoing evaluation. Speed and accuracy of every response are evaluated. The instruction is not preset, and thus the learner can take a near infinite number of paths through activities and educational content based upon the learner's performance. This and any of the types of adaptivity described above, can be used alone or in combination with any of the other type of adaptivity described above, as needed, and are all enabled by embodiments of the present invention.

Figure 3:
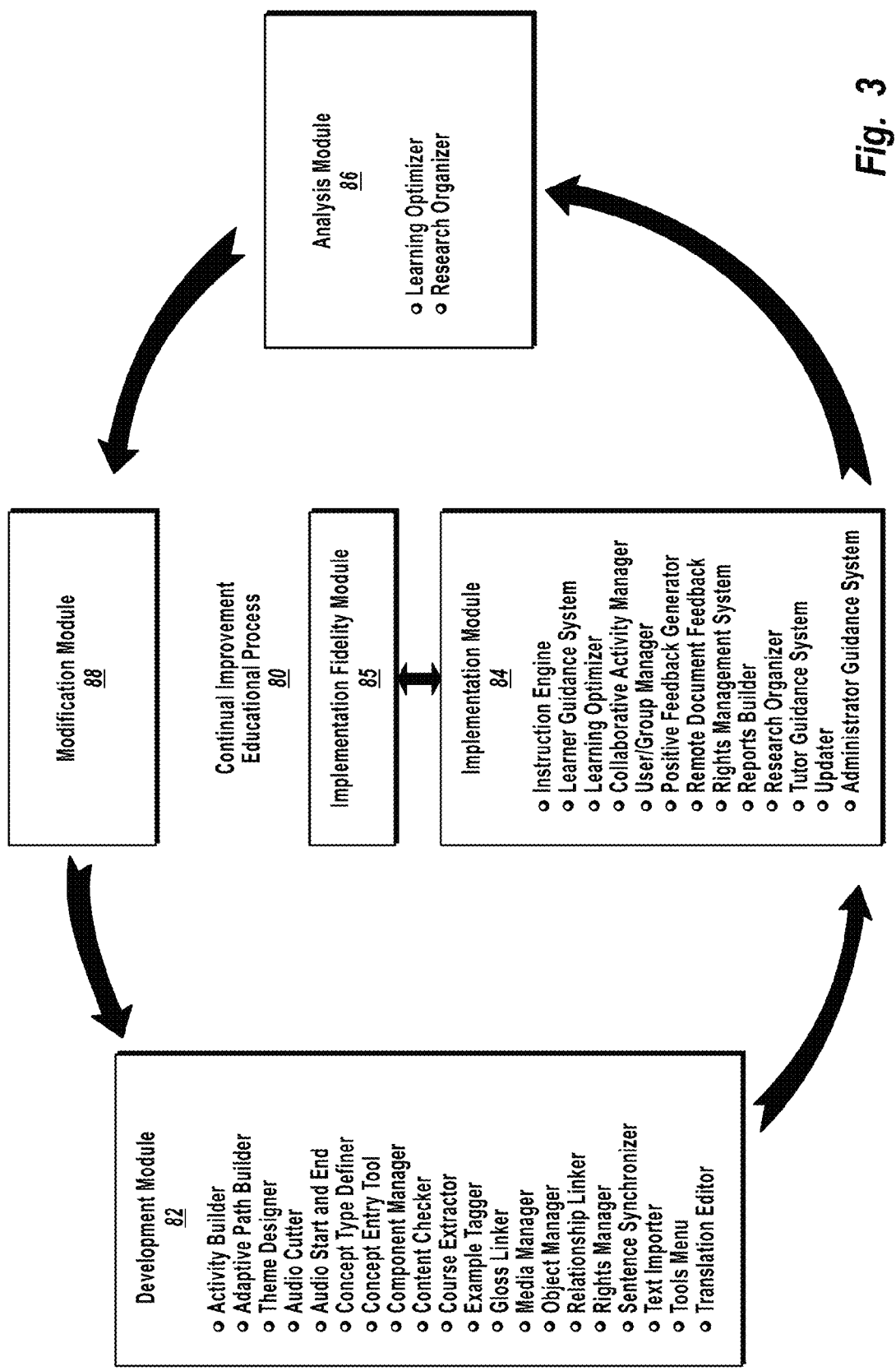
FIG. 3 illustrates a representative relationship within a continual improvement educational process.

With reference now to FIG. 3, a representative relationship within a continual improvement educational process is illustrated. In FIG. 3, continual improvement educational process 80 includes a relationship between development module 82, implementation module 84, implementation fidelity module 85, analysis module 86 and modification module 88. In accordance with the illustrated embodiment, development module 82 includes a variety of tools (e.g., activity builder, adaptive path builder, theme designer, audio cutter, audio start and end, concept entry tool, concept type definer, component manager, content checker, course extractor, example tagger, gloss linker, media manager, object manager, relationship linker, rights management system, sentence synchronizer, text importer, tool menu, translation editor, etc.) that may be employed to selectively design or otherwise provide instructional development and/or content development. In at least some embodiments of the present invention, development module 82 is utilized to develop educational activities and/or content. Once designed, implementation module 84 is employed to implement educational content and data gathering. For example, in at least some of the embodiments of the present invention implementation module 84 is used to instruct individual students/learners and selectively gather data. Implementation module 84 includes a variety of tools (e.g., installer, instruction engine, learner guidance system, learning optimizer, collaborative activity manager, user/group manager, positive feedback generator, remote document feedback, rights management system, research organizer, tutor guidance system, updater, administrator guidance system, reports builder, etc.) to enable implementation of educational lessons or content and/or to manipulate data.

Implementation module 84 interfaces with implementation fidelity module 85 to determine the degree that implementation fidelity as defined in development module 82 is achieved, and to provide administrators, teachers and tutors, and learners with information and instruction on how to improve fidelity. Implementation module 84 also provides designers and researchers with data that can help them determine how to implement the system and/or enhance the system.

Implementation module 84 also interfaces with analysis module 86, which is employed to evaluate the learning. Analysis module 86 includes various tools (e.g., learning optimizer, research organizer, etc.) to perform the evaluation. Based on the evaluation, modification module 88 may be employed to selectively customize educational content. For example, in one embodiment, response measurements are tracked from a given experiment and are provided to research organizer for automated data analysis, which can then be interpreted by an instructional designer in order to improve the learning system. Or the results may be fed to the learning optimizer for automatic adjustment of the learning system. In at least some of the embodiments of the present invention, one or more of the tools of development module may be utilized in modification module 88.

The educational content may be customized in a variety of manners. For example, the frequency of which the content is presented may be modified to a learner or group, the order in which the content is presented may be modified to a learner or group, or the difficulty of the content may be modified to a learner or group. In some embodiments, modification module 88 includes all the development tools listed under the development module 82.

Accordingly, embodiments of the present invention embrace the utilization of a variety of modules that enable the creation of a dynamic and customizable continual improvement educational process. A discussion of each of the modules and corresponding tools will be discussed independently below.

I. Development Tools

In accordance with embodiments of the present invention, an instructional designer selectively develops instructional/educational content for a learner/student. As will be provided herein, the development of the educational content is facilitated by not requiring that the educational content be modified at the code level by a computer programmer. Instead, a method (e.g., object oriented method, drag-and-drop method, etc.) is employed that enables an instructional designer to quickly, dynamically and customizably create educational content for a student/learner, or group of students. A variety of tools are available for use by the instructional designer to develop the content. Accordingly, the following is a discussion relating to representative development tools available for use in designing educational content in a continual improvement educational process.

A. Activity Builder

An activity builder tool is a development tool that lets instructional designers and content experts selectively develop learning activities. With the use of an activity builder tool, the instructional designer can create individual test items, questionnaire items, menus, navigation bars, peer-practice and practice-with-tutor activities, a learner guidance system, and/or tutor and administrator guidance systems. An activity builder tool generates activities for the learner at runtime.

Figure 4:
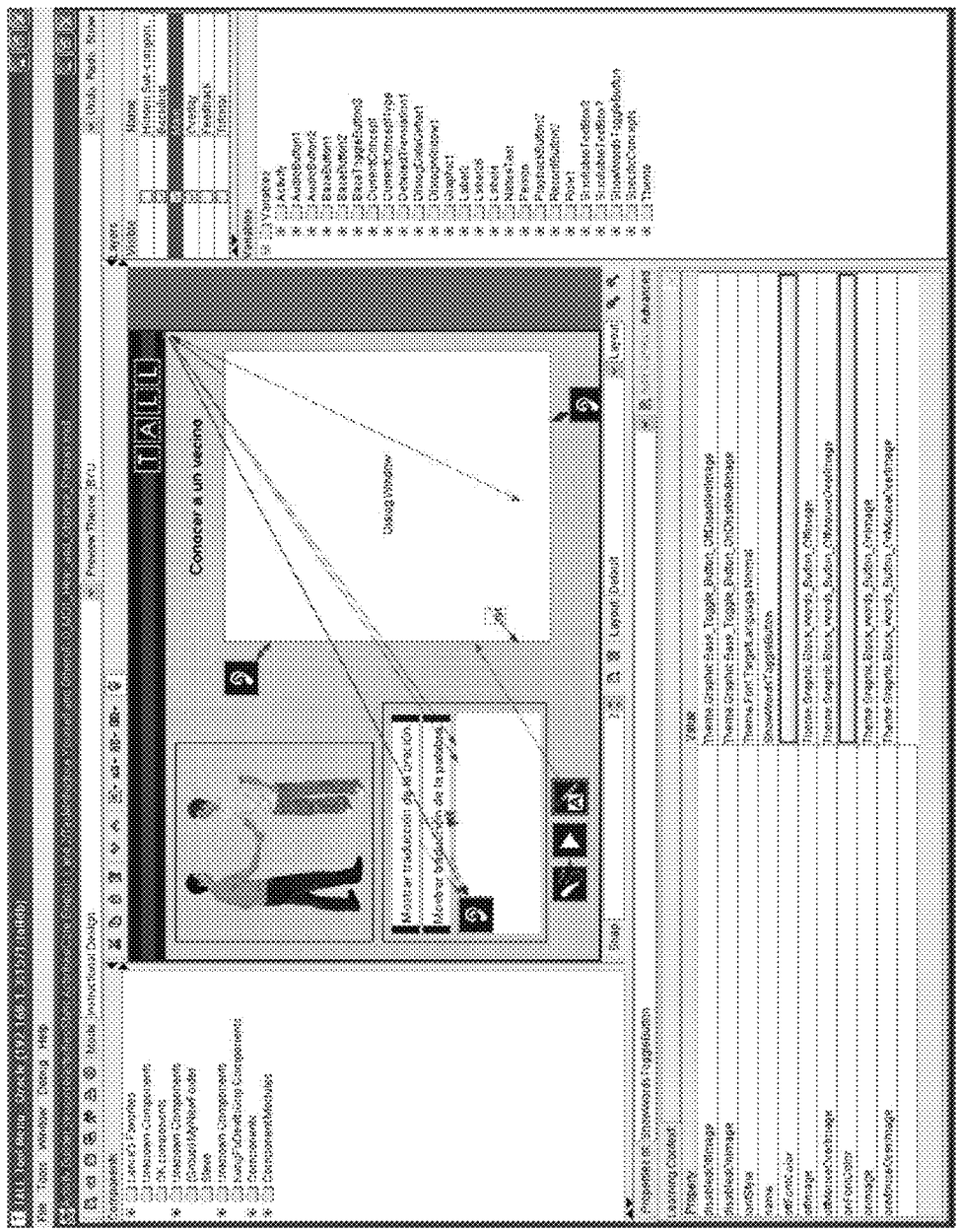
FIGS. 4-5 illustrate a representative user interface in association with an activity builder tool.
Figure 5:
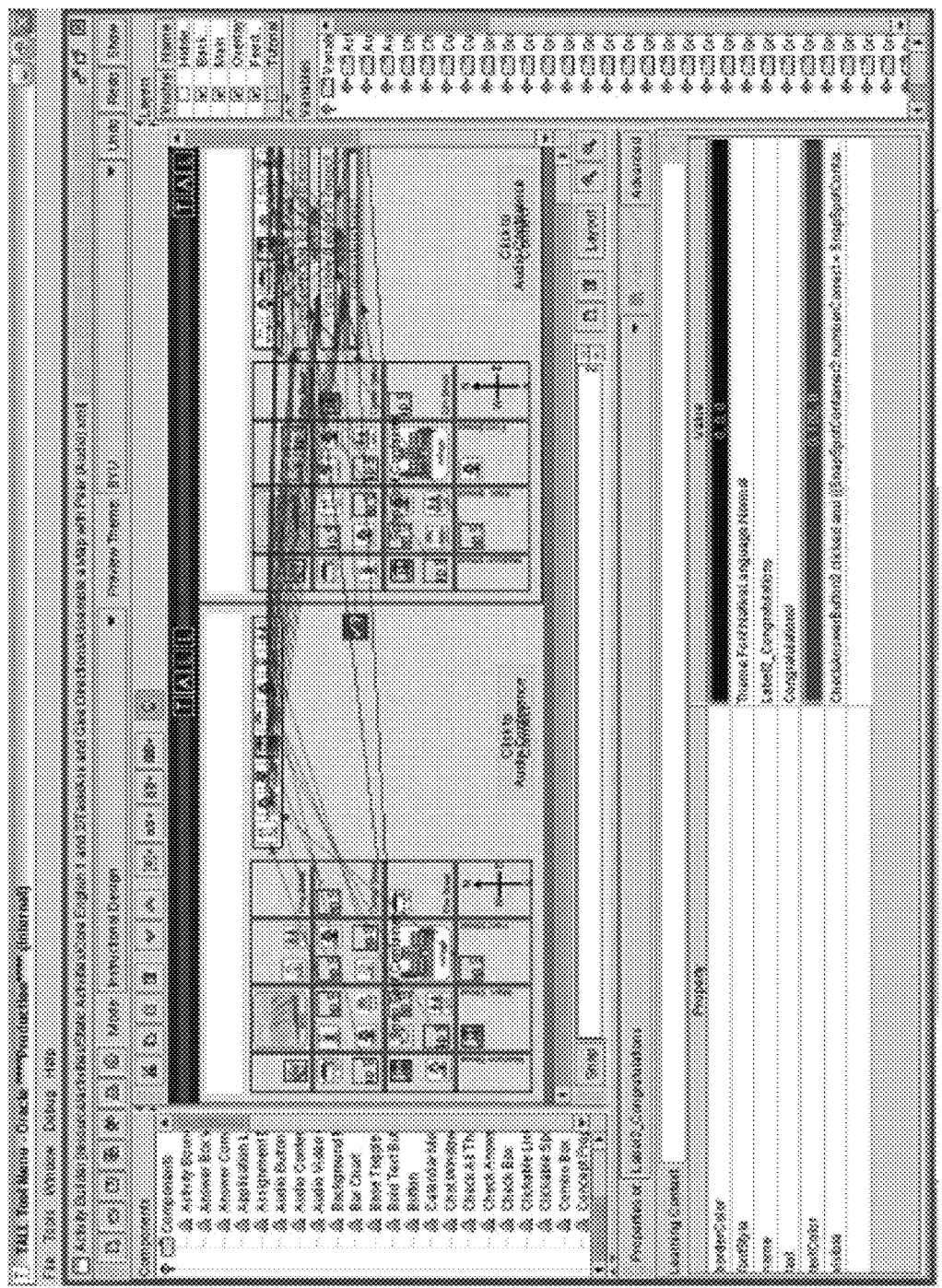

With reference now to FIGS. 4-5, a representative user interface in association with an activity builder tool is illustrated. In FIG. 4, one or more components are selected and dragged into a work area. In one embodiment, the sequence of dragging the components relates the components to each other. The components can also be related to one or more variables. Further, an instructional designer is able to selectively modify properties of a particular component. In FIG. 5, collaborative activities are built.

In one embodiment, the activity builder tool includes a variety of features. For example, such features include specialized property editors, read-only properties, abilities to handle complex components, support for multiple learning contexts, abilities to handle variables like components, support for multi-component selection, a lock button to lock sizes and positions, support for experimental variables, and handling of syntax errors in expressions. Further features include support for multiple layers of components, support for multiple layouts, various layout tools for alignment and sizing, direct component manipulation within the activity editing window, customizable hierarchically organized components list, shareable component folders, multi-user activities, an advanced mode that reveals less-frequently-used properties, zoom, ways of connecting components to each other easily, a diagnostics feature, support for arithmetic and Boolean expressions in property values, rights management, human-readable display of property values, support for user data tracking, and component modules.

An activity builder allows an instructional designer trained in the tool to rapidly construct a limitless variety of sophisticated learning activities without the need for time-consuming computer programming. There are many features of activity builder that make this possible, including connecting components without the use of a programming language or scripting language, providing support for creating collaborative activities, utilizing a wide variety of sophisticated components, re-using functionality through component modules and dynamic activities, providing features for flexible user data tracking and reporting, and supporting multiple layouts. These six features are described below.

Existing authoring systems and rapid application development (RAD) environments typically require the tool user to use a programming language or scripting language to achieve complex interactions between components. This necessitates a considerable time investment before becoming proficient with such a system, and mastery of such a system is typically only within the reach of a computer programming professional. Even after the initial time investment, the need for programming or scripting lengthens the development process. In contrast, activity builder intentionally prevents the use of scripting and programming, and instead provides simple ways of creating complex interactions between components. One way is to drag and drop from the variables list to the properties list. For example, to make a label in the activity visible when a button is clicked by the learner, the instructional designer simply drags and drops the button's .clicked property from the variables list onto the label's .visible property in its properties list. Then at runtime, when the learner clicks the button, its .clicked property becomes true, which in turn sets the label's .visible property to true, causing it to become visible to the learner. The variables list includes all of the activity's components and their properties, so the instructional designer can easily set any property equal to any other property by a drag-and-drop technique.

Alternatively, the instructional designer may connect components by selecting one component, and then clicking a second component while holding the Alt key down. A connection dialog box then appears. This dialog box shows the most likely property connections between the two components, based on known frequencies of component connections. The instructional designer may then click OK to simply accept the automatic connections, or change the property connections via drop-down lists for each property. For the sake of efficiency, in one embodiment the drop-down lists just display the other component's properties having a compatible data type.

A third method of connecting properties is to use the drop-down list found in the property value cells of the properties list. These drop-down lists display every compatible property of all other components and variables, including system constants such as true and false. After connecting two components, a blue arrow is automatically drawn between them in the activity editing panel. This blue arrow depicts the flow of information from one component to the other, and is only visible at design time. Properties can also be set to expressions involving any number of properties. These expressions can include Boolean operators (and, or, not, =, <, >, etc.), arithmetic operators (+, − /, *, etc.), parentheses, numbers, text, user properties, variables, and so on. This allows the instructional designer more flexibility without introducing too much complexity. Continuing the previous example, to make a label invisible when a button is clicked, the instructional designer would simply add "not" before the reference to button.clicked. In another example, the instructional designer may want to let the learner control the speed of an activity via a slider component. In this activity, a delay timer component may be used to set a delay between two events. The delay timer's .startSeconds property could be set to the slider's .value property to control the speed. Alternatively, the delay timer's .startSeconds property could be set to slider-.max-slider.value to reverse the orientation. Alternatively, the instructional designer could set the .startSeconds property to slider.value*10 to increase the speed range.

The instructional designer can also create complex interactions between multiple users, by creating collaborative activities in activity builder. To do this, the instructional designer specifies the number of roles in the collaborative activity, and the number of participants for each unique role. Activity builder then splits the activity editing panel, so that the instructional designer can specify what each role will see. In essence, each role gets its own activity, with its own components. What each participant sees and interacts with may be very different during the collaborative activity, as specified by the designer. Components may be connected between the various roles, just as they are connected within an activity, as described above. Thus, a tutor at a remote location may click a button that causes a graphic to appear on the learner's screen. Also two peers may collaborate on a gap activity, where each learner lacks information that the other learner has. For example, one learner may have one half of a map, while another learner sees the remaining half. The activity invites the two learners to work together by exchanging information via text chat or audio conferencing, until they are both able to sketch the missing portion. Activity builder makes it feasible for an instructional designer to create such an activity rapidly. Each role is simply given a graphic component with a different map image. The instructional designer may also give the learners the ability to see each other's sketches in progress, by simply connecting a second graphic component to the other learner's sketch, via their image properties. At runtime, the instruction engine can send this information in real time between the participants' computers, via the internet, LAN or other available network.

Another important difference between activity builder and existing development tools is that most other tools provide mostly general purpose "nuts and bolts" components. In contrast, activity builder specializes in providing an extensive variety of sophisticated components tailored to designing adaptive instructional activities. This greatly increases development efficiency. For example, the instructional designer may use a multiple choice component to construct a multiple choice exercise in a matter of seconds or minutes, because the multiple choice component inherently provides option buttons for the learner to click on, randomizes the options automatically, gives corrective feedback, and so on. Another example is the dialog component, which displays a dialog with accompanying audio. The dialog component inherently provides audio buttons for the learner to click on in order to listen to any sentence or paragraph. The dialog window also has a .clickedWord property which can be easily sent to a detailed translation component to provide a translation or definition of any word the learner clicks on.

Activity builder also increases development efficiency through component modules. Component modules are re-usable portions of an activity, having component(s) with pre-set property values and interconnections. Component modules are listed in the components list panel with components, making them easily accessible to instructional designers to drag and drop into any activity. The instructional designer can create any number of component modules within activity builder, with the same process used to create activities. By supporting component modules, activity builder allows the instructional designer to apply object oriented principles such as encapsulation and abstraction. For example, by placing sub-components in a hidden layer, the inner complexity of the component module can be hidden from the instructional designers that subsequently incorporate the component module in their activities. The use of component modules improves development efficiency, by encapsulating re-usable activity functionality and making it readily accessible. Component modules also facilitate efficient implementation of user-interface standards, since they can be pre-set to the prescribed size, position, color, etc. A related aspect of activity builder is its support for dynamic activities. A dynamic activity is an activity that draws information from the properties of the concept the learner is currently learning. In other words, some of the properties of the activity's components are set to values of the current concept's properties, which are resolved at runtime. For example, a dynamic vocabulary activity may contain a label with the word being learned and another label for its translation. In the present example, the first label's .text property would be set to currentConcept.name, and the second label's .text property would be set to currentConcept.translation. This single activity could then be used in learning any number of vocabulary concepts, since the contents of the activity are dynamic. Instructional design efficiency is significantly increased by activity builder's support for dynamic activities. Also, since concept type definer (described below) allows the instructional designer to create any number and variety of concept properties, the advantage of dynamic activities is greatly enhanced.

Activity builder also provides a flexible method for adding user data tracking and reporting. Specifically, a time measurer component allows the instructional designer to track the duration of activity interactions with the learner. A counter component provides tracking of the number of times a given interaction or group of interactions occurred. For reporting, activity builder provides a variety of charting components for displaying bar charts, pie charts, line graphs, tables, and so on. Also, to supply data to these charts, activity builder offers components that query for and process user data previously collected. The instructional designer can use any of these components in combination to create activities that supply reports to learners, tutors, and administrators.

In addition, activity builder simplifies the creation of multiple delivery formats. To accomplish this, activity builder allows the instructional designer to specify any number of target layouts. These layouts might include a desktop PC, PDA, cell phone, or 8½×11 printout. The components in a given activity can then be sized and positioned for each layout separately, while all other aspects of the activity remain the same. This boosts development speed considerably in cases where the instruction is targeted at multiple delivery platforms. Also, activity builder provides tools to speed up the sizing and positioning for each layout. Specifically, in the moment the instructional designer switches to a new layout of an activity for the first time, activity builder automatically resizes and repositions the components in the activity to fit the new layout. In one embodiment, the instructional designer can select from one of four options: (1) auto-size and position every component proportionally so that the new percentage sizes and positions relative to the whole activity are the same as the previous percentage sizes and positions, (2) the same as above, except that components with .keepAspectRatio set to true would maintain their aspect ratio by shrinking and centering themselves to fit within the region that the first algorithm would have allowed, (3) the same as above, but keep the aspect ratio intact for all components, or (4) maintain the aspect ratio and relative positions of all components, and simply center and shrink/expand the entire activity to the maximum size permitted by the new layout. The instructional designer may then opt to refine the component sizes and position for each layout as needed.

As indicated, the activity builder allows instructional developers to create learning activities. It includes a drag and drop interface for assembling activities from components and facilitates dynamic, adaptive instruction. It provides a list of dynamic content elements, which can be connected to components. It further provides a way to adjust algorithms for different learners. These algorithms can affect the behavior of various components and content elements.

Activity builder may also be used to create menus, navigation backgrounds, peer-practice and practice-with-tutor activities, a learner guidance system, tutor and administrator guidance systems, questionnaire items, test items, and reports. The activity builder includes code associated with drag and drop objects to generate activities for the end user. A portion of this same code is used at runtime to deliver the activity to the learner.

There are three types of users of the activity builder: (i) instructional designers, (ii) graphic designers, and (iii) content experts. The instructional designer uses the activity builder to determine what elements will appear on the screen, what responses are invited from the learner, and how the responses are judged. The graphic designer decides the layout of the elements, and the graphics and sounds associated with each component. For activities that allow static content, the content expert or instructional designer uses the activity builder to enter this content.

The activity builder is generally opened from the adaptive path builder, which will be discussed below, though it can also open directly via the tool menu. Activities can be edited, previewed, copied or created as the need arises.

As illustrated in FIGS. 4-5, representative features associated with the activity builder include a button bar, an instructional design mode, a layout mode, a content mode, a test mode, components, content elements, properties, variables, ratings, an expression evaluator, notes, a component magnifier, runtime issues, an XML parser, and error prevention. In an instructional design mode, the activity builder allows a designer to choose which components should appear within the activity. In one embodiment, activities scale themselves automatically to any height and width, with a fixed aspect ratio specified in the layout. The aspect ratio is always maintained, and the components in the activity are always scaled proportionally. Content elements gather content dynamically from the content database, and then supply this content to a component of the activity for display.

B. Adaptive Path Builder

The adaptive path builder tool allows instructional designers to develop the sequence of activities for learning a task or concept. It also allows designers to organize test items to assemble a test, set the timing of questionnaire items, determine which concepts precede other concepts, such as via a drag and drop interface.

Figure 6:
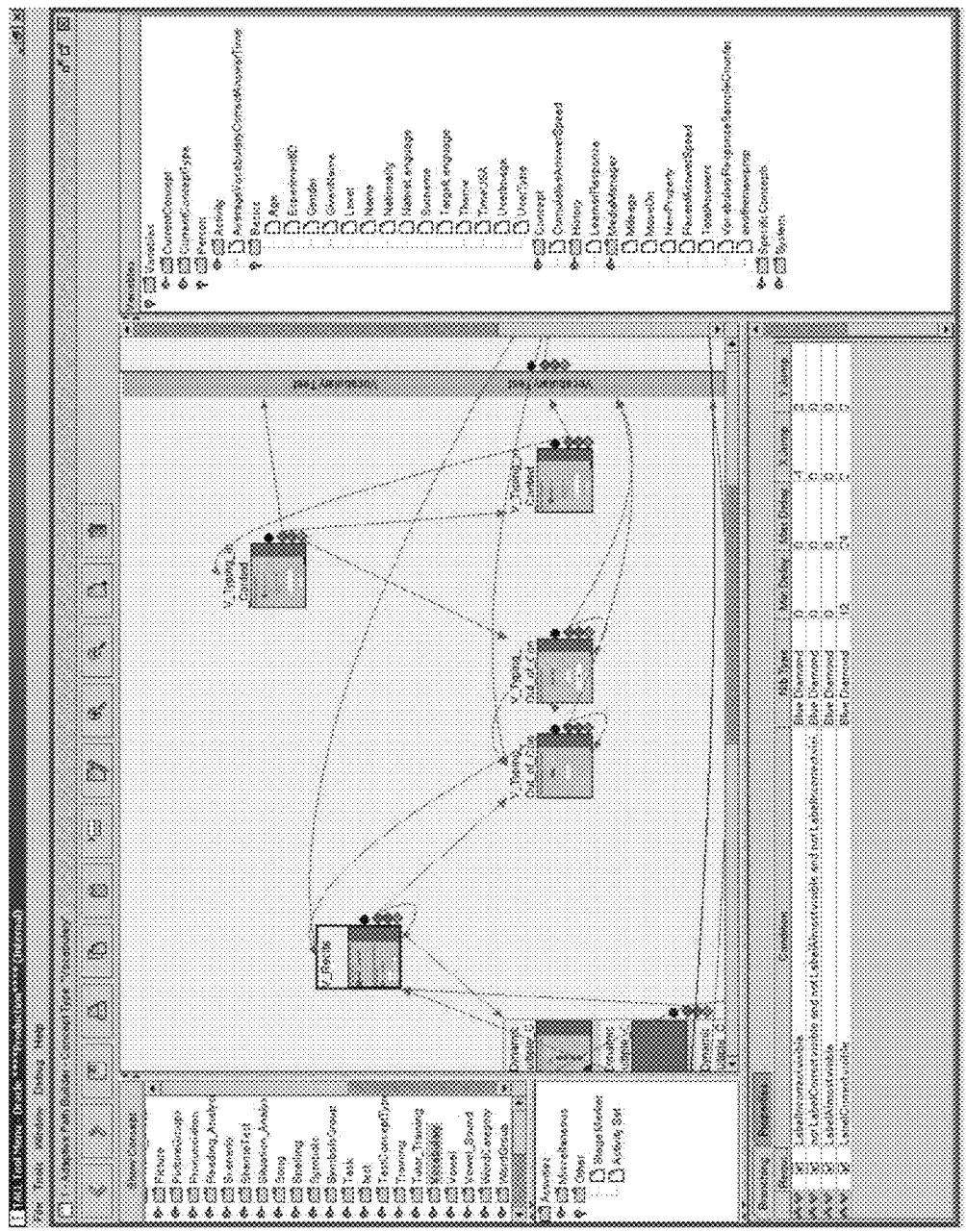
FIG. 6 illustrates a representative user interface in association with an adaptive path builder tool.

With reference now to FIG. 6, a representative user interface in association with an adaptive path builder tool is illustrated. In FIG. 6, the user interface includes selectable content, variables, concepts, properties, and an adaptive path editing window. The adaptive path editing window is where the current adaptive path can be seen. It depicts the flow of activities used to teach a certain concept. The concept is what is being learned, while the adaptive path is how it is learned. Also, an adaptive path depicts which concepts should be learned before other concepts.

Accordingly, an adaptive path builder allows an instructional designer to specify how a given concept should be learned and/or tested. An adaptive path can be a linear sequence of activities or a more adaptive sequence with individualized branching and repetition, such as a computer-adaptive test. To achieve systematic spaced review, activities are separated by delays (e.g., minutes, hours, days, etc.). Also, an adaptive path indicates which concepts should be learned or tested before others. Branching and properties are based on the individual's learning context, which includes any known characteristics of the learner. For automated experiments, the branching conditions and/or learning context may include experimental variables defined by the designer or researcher.

Tests and questionnaires are created as adaptive paths. To get learner feedback on a particular activity, a questionnaire activity is placed after the activity within the adaptive path. By indicating branching conditions, the questionnaire activity is activated a certain percent of the time for a group of learners, or only when a learner has struggled with a previous activity.

An instruction engine (in concert with a learner guidance system) uses the information in the adaptive paths to recommend what the learner should learn next. The learner may skip any activity in any adaptive path. When an activity is skipped, the learner guidance system automatically asks the learner why he/she skipped the activity. The learner's reasons may include that it was "too easy," "too hard," "too boring," "too confusing," "to repetitive," "I already mastered this concept" or "the activity is not working right." This feedback appears as ratings for the activity and adaptive path, and can lead to improvements made in the instruction.

Property values in an adaptive path may be part of an experiment created in research organizer. The learning optimizer optimizes and sets experimental variables that are defined in an adaptive path based on analyses of previous experiments.

For efficiency, a relationship between concepts of the educational content may be first defined in a relationship linker tool. (The relationship between the concepts can be referred to as a concept link.) A relationship linker (discussed below) allows the instructional designer to link or otherwise relate concepts together so that they are listed together in the concept list of the adaptive path builder, and displayed together on the adaptive path. Concepts can be related both hierarchically and in predecessor-successor pairs, with any number of levels desired in the hierarchy, both upward and downward, and with any number of concepts on either side of a relationship.

For purposes of discussion herein, the hierarchy includes one or more concepts that are presented in the adaptive path before one or more subsequent concepts of that same adaptive path. Accordingly, the prior concepts can be referred to as "predecessor concepts" and the subsequent concepts can be referred to as "successor concepts" to establish the relationship of the concepts in the adaptive path.

The reports builder, which will be discussed below, draws upon data that is tracked automatically as the learner uses adaptive paths. For example, this includes data such as: time spent in the adaptive path, time spent completing an activity of each adaptive path, time spent in a stage of each adaptive path, idle time in all the above areas, and whether a given activity is completed or skipped.

An adaptive path is tied to a single concept or concept type. Accordingly, two concepts do not share the same adaptive path, unless the designer copies and pastes it from one concept to the other. A concept type can have an adaptive path that all of its concepts use or point to by default.

Learner guidance system concepts, which determine the menus the learner will see at login and will be discussed below, can have an adaptive path. Different learners may get different learner guidance system activities, such as a progress list and a to-do list. This is determined by the branching conditions within the adaptive path. The learner guidance system also allows individuals to schedule activities with each other, which implies that there are global adaptive paths that can be used to conduct these spontaneously scheduled events.

As illustrated in FIG. 6, features of the adaptive path builder include a button bar, an adaptive path editing window, a concept list, an activity list, a branching window, a properties window, a variables window, ratings, notes, an activity preview and an error prevention. In one embodiment, all of the tools are multilingual. Accordingly, when an individual runs the instruction builder, it prompts the individual to login. Each user has a primary native language, and this native language is used by default throughout the tools.

In the illustrated embodiment, the adaptive path may be edited for a different concept by clicking on any concept or concept type in the concept list and then clicking on the edit button in the button bar. If a concept has more than one adaptive path, the designer will be prompted to choose one to edit.

In FIG. 6, activities are arranged left to right, from beginning to more advanced. Adaptive paths begin and end with stage markers, such as "Introduction" and "Mastery". The stage markers can be given any name, and any number of stage markers may be created.

The stage markers break the activities up into meaningful stages of learning. The first stage marker branches to any number of activities within the adaptive path, which means that the first activity actually encountered by the learner could be anywhere within the adaptive path. In the illustrated embodiment, the adaptive path can be scaled to any size, so that the entire path can be viewed all at once if desired. Further, in at least some embodiments of the present invention, the designer can copy and paste entire sections of activities and branching from one adaptive path to another. This is performed by selecting any section of an adaptive path (e.g., by clicking and dragging a selection box around the area you want to select). A placeholder activity box or adaptive path box may be used that can be defined later.

A designer can indicate that an activity or concept link is required in the branching window. In one embodiment, optional branches are depicted with dashed arrows, whereas required branches are depicted with solid arrows. When branches are added, they are set to 'required' by default. To some extent, the exact placement and appearance of icons in the adaptive path layout is automatic. For example, icons always snap to a grid. Within certain constraints, a designer can move, insert, and delete activities and other icons within the adaptive path.

In FIG. 6, when an icon is moved, all branches in and out of the icon are maintained since the arrows move to the icon's new position. A designer can indicate which activities branch to other activities in the adaptive path. A branching arrow is automatically drawn between two activities and a new text entry line appears in the branching window. The curvature, path, and line style of arrows is automatic. In FIG. 6, the diamond shapes represent branching decision points. A designer can click and drag from a diamond to another activity to make a connection, or can just click on the diamond and then on an icon to make a connection. If the designer clicks on a diamond and then changes his/her mind, the designer can click the background so that no branch is created.

Multiple parallel activities can be scheduled for a learner after an activity is performed. In the illustrated embodiment, when a designer wants several concept links or activities to occur after a certain concept link or activity, the designer uses a circle instead of a diamond to designate the relationship. Many branches can be taken from a circle, whereas only a single branch can be taken from a diamond.

A trailing arrow appears while adding a branch. When a concept link is added to an adaptive path, the thumbnail of its adaptive path is inserted in the adaptive path that is being edited. When the designer adds a concept link to an adaptive path, a relationship is automatically formed between the two concepts if it does not already exist. When an adaptive path is opened, a check is made for concepts that have a "part/whole" relationship with the current concept. These relationships may have been created by the designer in a relationship linker, which will be discussed below. Concept links for child concepts are added automatically to the adaptive path, if they do not already exist.

In establishing relationships between concepts, a branch may be formed automatically or added manually. The relationship can indicate that a particular concept link is optional. Any infinite loops that exist between concept links are reported to the designer.

As new content layers are created in the activity builder, they appear by default. (A content layer is any activity whose concept property is set to a specific concept.) A designer can double-click an activity to edit it using the activity builder.

If a designer adds one or more activities to an adaptive path, wherein dynamic content elements are required in the adaptive path that the concept doesn't support, then the designer is notified. For example, a red slash appears over the activity to inform the designer that the activity is not functional. Also, activities that are missing content are highlighted with a red slash over the activity thumbnail. If an activity is non-functional for any reason, the red slash appears.

A designer can add activities with content layers from concepts other than the current concept. For example, this may be done by dragging the activity from the activity list, and then changing the content layer property of the new activity icon. Further, a designer may add to the adaptive path any activities that are missing content layers, and then add the content layers later. Thus, just because an activity requires a content layer to function, this doesn't mean a content layer must be included before the adaptive path can be saved.

Activities or concept links can be grouped into a set. This feature is particularly useful when the designer wants the learner to randomly get one of several activities at a certain point in the adaptive path. Activity sets have their own special properties that govern which activities will actually be given to the learner. The set of activities is enclosed in a box. Activity sets have two properties associated with them: "All-Required," which indicates that all of the activities in the set must be completed before the learner is allowed to proceed, and "NumberRequired," which indicates that a designated number must be completed before the learner can proceed.

To rotate systematically through a pool of questionnaire items, a designer can instruct the set to give the first n questions the first time through the adaptive path, the second n questions the second time through, and so on. Accordingly, a bookmark may be kept that keeps track of which activity the learner received most recently from the set.

For efficiency, a designer can define activities that apply to sub-concepts. For example, right beneath an activity thumbnail, the designer can indicate to which sub-concepts the activity applies. A designer can name a single sub-concept, or indicate that "all sub-concepts" should get the activity. In one embodiment, when the "all sub-concepts" option is selected, the activities are mixed close together in time so that the learner doesn't necessarily know which sub-concept is currently being utilized. In at least some embodiments, activities of sub-concepts can be entirely defined in the adaptive path of a parent concept. Additionally, the sub-concepts can have their own adaptive paths.

In one embodiment, the designer indicates that a given single-person activity should be done by the tutor, supervisor or proctor instead of the learner. In this way, a tutor-initiated task practice can be assigned to a tutor automatically when a learner reaches a certain point in his or her adaptive path. Also, a "proctor unlock" activity can be created and placed at the start of an adaptive path. This activity will prompt the proctor to unlock the test (i.e. unlock an adaptive path which contains the test) for the learner.

An activity list is a list of all activities defined in activity builder, described above. A designer can drag and drop any activity into the adaptive path editor at any point within the adaptive path.

In a branching window, a designer can set how branching will occur from a given activity. (This applies to any icon in the adaptive path, such as stage markers, sets, concept links, etc.) The most recently selected icon has the corresponding branches displayed from this icon. A branch is defined by seven parameters, namely nib type (diamond or circle), whether it is required, a condition, an X destination (horizontal jump), a Y destination (vertical jump), a minimum delay, and a maximum delay.

The nib type parameter is used to control how various branches proceeding from a given icon relate to each other. In one embodiment, a black circle nib is selected to indicate that each and every branch is to be followed in parallel, provided each condition is true, whereas a blue diamond nib allows only the first branch to be taken, whose condition evaluates to true. Green and magenta diamond nibs behave like blue diamond nibs. Multiple diamond nibs are used in cases where there are multiple branching decisions to be made, resulting in taking multiple branches in parallel.

A particular branch may be set to a 'required' status if the corresponding learning activities are considered essential to learning a particular concept. Otherwise, the branch may be set to optional status, in which case the branch is represented graphically with a dotted line instead of a solid line in one embodiment. During the learning process, the instruction engine will give the learner the option to take these optional branches, provided the branching conditions evaluate to true.

The branching conditions from an icon are listed together in the branching window, each on a separate line, one for each possible branch. Branching conditions are Boolean expressions that may include any combination of variables and Boolean operators. In this way, a designer can establish branches based on how well the learner completed the previous activity, or any number of other characteristics of the learner.

The X destination parameter controls the horizontal distance of the branch. Generally, the adaptive paths are oriented to progress from left to right. Thus, the further the branch jumps to the right, the more learning progress the learner appears to be making. For computer-adaptive testing and related applications, the X destination may be set to an expression having performance variables and arithmetic operators, to make the branching even more dynamic and concise.

The Y destination parameter controls the vertical jump of the branch. Generally, the vertical orientation of the adaptive path is arbitrary. What is important is that the X and Y destinations are set such that a given branch leads from one icon to another, resulting in an appropriate instructional flow based on the learner's performance, background, and interests.

The minimum delay parameter controls the amount of time the learner must wait, before proceeding to the destination of the branch, from the time the decision was made to take the branch.

The maximum delay parameter controls the amount of time the learner may elect to wait, before taking the branch becomes urgent instructionally. For example, in the case of a vocabulary adaptive path that includes systematic spaced review, a minimum delay may be set to 12 hours, with a maximum delay set to 20 hours. The minimum delay ensures that the learner does not cram the learning material. The maximum delay ensures that the learner reviews the vocabulary concept before forgetting it completely.

In at least some embodiments, backward branching is allowed. This is a useful way to ensure long-term retention. Thus, even after reaching a mastery stage marker, a backward branching condition may provide periodic review for that concept at increasing intervals. Specifically, the designer may include a variable (e.g., "PredictedDaysofRetention") in the expression that establishes a delay. This applies to a given concept and may be based on the longest period between reviews where the learner has been able to remember a particular concept.

In some embodiments, global navigation buttons allow a learner to override branching. Accordingly, the learner can selectively skip to the next activity, go back to a previous activity, jump to a concept explanation activity, return to the main menu, exit the program, or the like.

In some embodiments, a single branching arrow represents multiple branching conditions that lead to the same activity. A number is displayed with the arrow to identify the number of branches represented.

A properties window of the adaptive path builder is analogous to a properties window in activity builder, discussed above. Like the branching window, the properties window applies to whichever activity has the focus. An activity magnifier shows an enlarged thumbnail of the activity that has the focus to allow the designer to more easily read the contents of a given activity.

C. Theme Designer

The theme designer makes the system aesthetically pleasing and appealing to learners, and provides an environment in which media artists can quickly customize the look and feel of the environment to a particular audience. A theme includes the underlying interface metaphor for the buttons, text boxes, scrollbars, etc., a color scheme, a font scheme, a graphic scheme, and a sound scheme. In at least some embodiments, each theme in the system has the same number of elements as each other theme, even though the visual and audio presentation of the elements between themes may be extremely diverse. For example, a designer could create a university theme, with formal, academic graphics, sounds, and colors or use the same functionality to create a parallel beach theme, with informal graphics, sounds, and colors. Because these items are dynamically presented via a database at runtime and there is a one-to-one relationship between the elements in the two themes, the theme can be instantly changed on demand.

Figure 7:
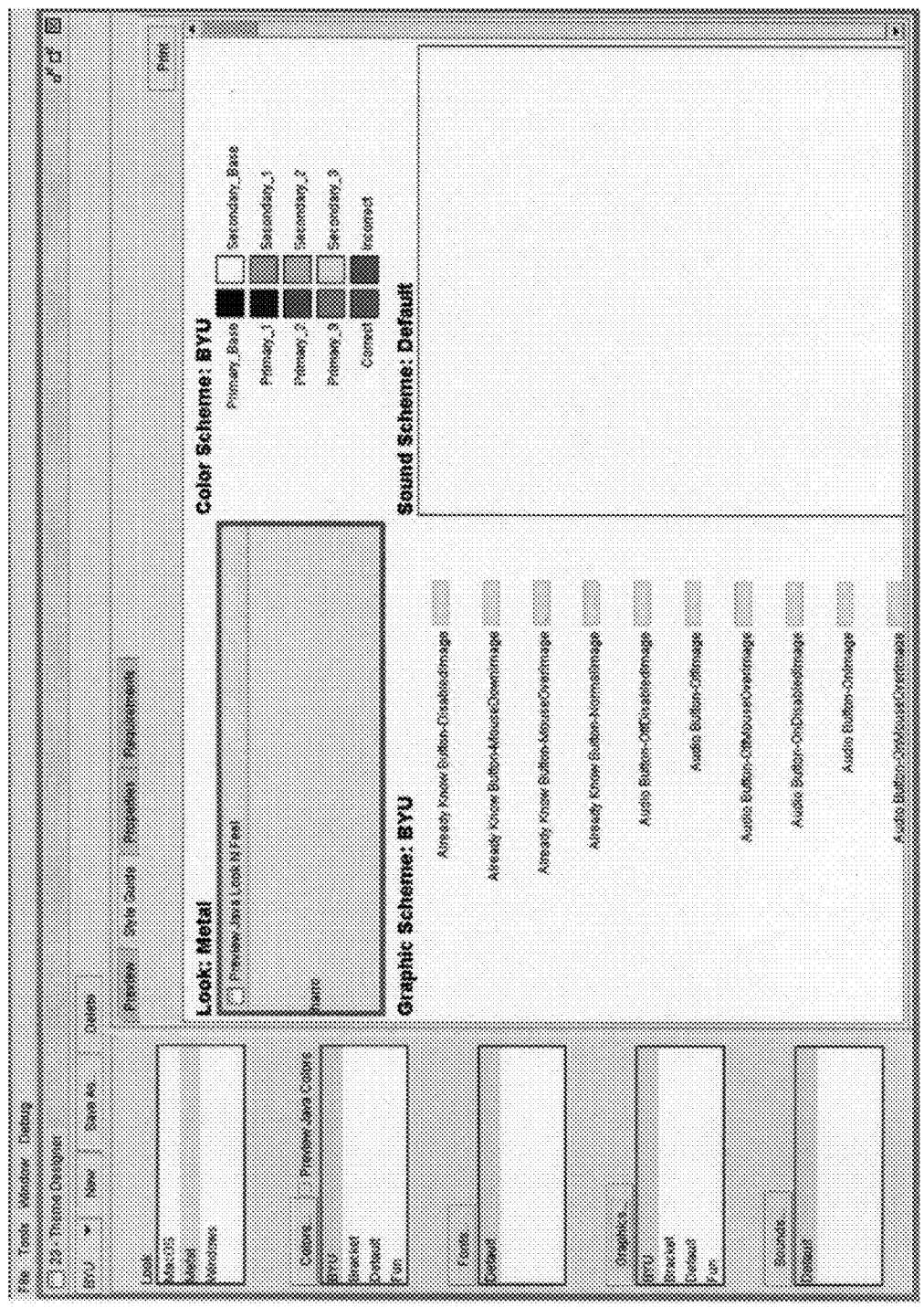
FIGS. 7-8 illustrate a representative user interface in association with a theme designer tool.
Figure 8:
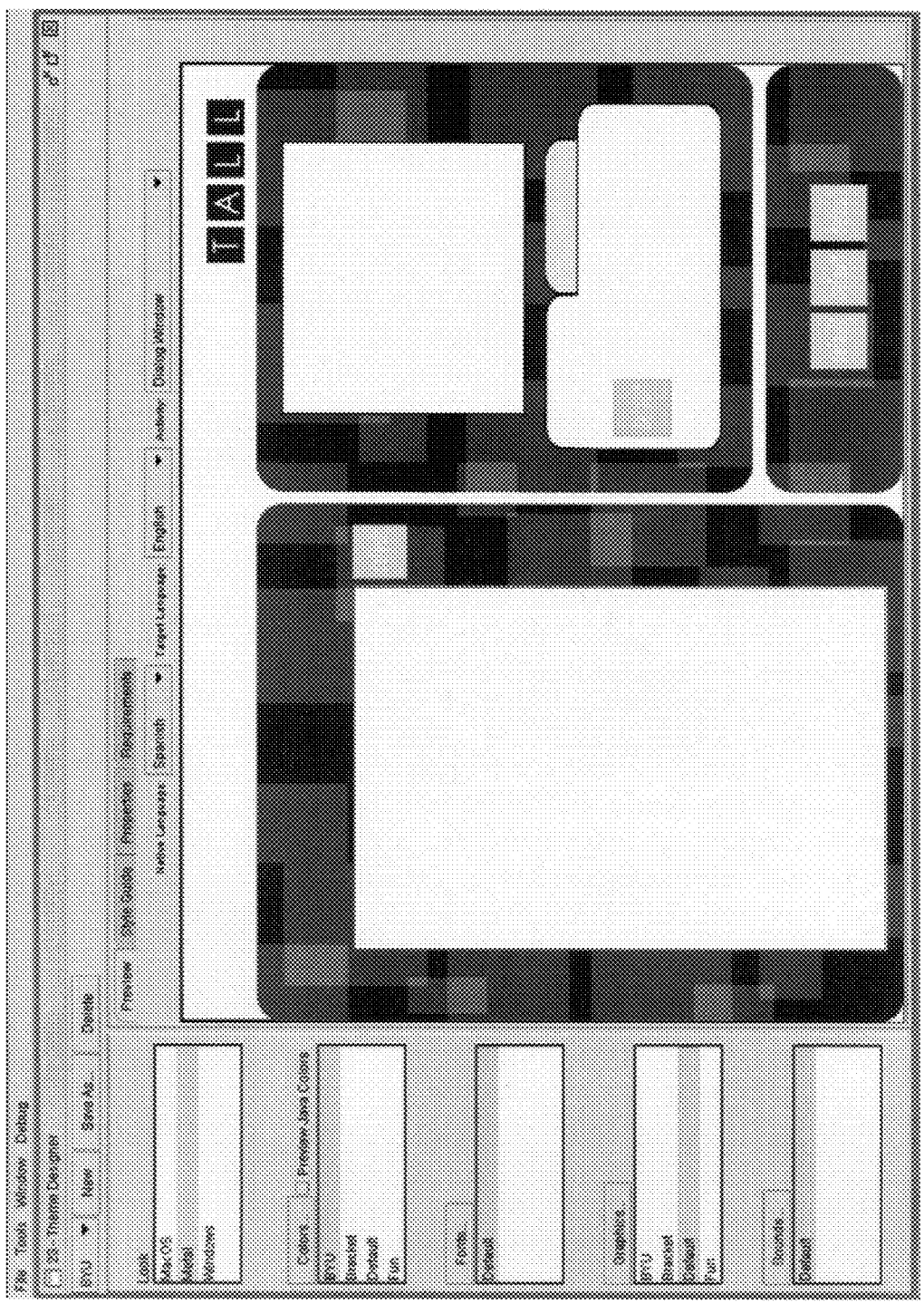

With reference now to FIGS. 7-8, a representative user interface is illustrated that corresponds to a theme designer tool in accordance with the present invention. As illustrated, the theme may correspond to school colors or another particular scheme. The theme designer includes a variety of components. For example, an author tool bar includes a tool selector dropdown to navigate to the theme designer, a new button, an open button, a save as button, and a print button. A look selector is utilized by a graphic artist to develop the look and feel. A color scheme selector/editor allows a graphic artist to select an existing color scheme or create a new color scheme. A font scheme selector allows a graphic artist to choose an existing font scheme. A font scheme editor allows a graphic artist to create or modify a font scheme. A graphic scheme selector allows a graphic artist to select an existing graphic scheme. A graphic scheme editor allows a graphic artist to upload a new graphic scheme. A sound scheme selector allows an audio artist to select an existing sound scheme. A sound scheme editor allows an audio artist to upload a new sound scheme. A preview tab is used to apply a scheme to an activity. A style guide tab displays a sample of each graphic, color, look, font, and sound in a particular theme. A requirements tab is where the naming conventions for graphics and sounds are specified along with any other policies regarding themes.

A variety of tools interact with the theme designer or otherwise influence the look and feel of the environment. For example, the adaptive path builder allows instructional designers to select the themes used in the path according to learning context. The activity builder allows graphic designers to define multiple layouts for a given activity and allows a designer to specify a background to be used with a given layout.

D. Audio Cutter

Figure 9:
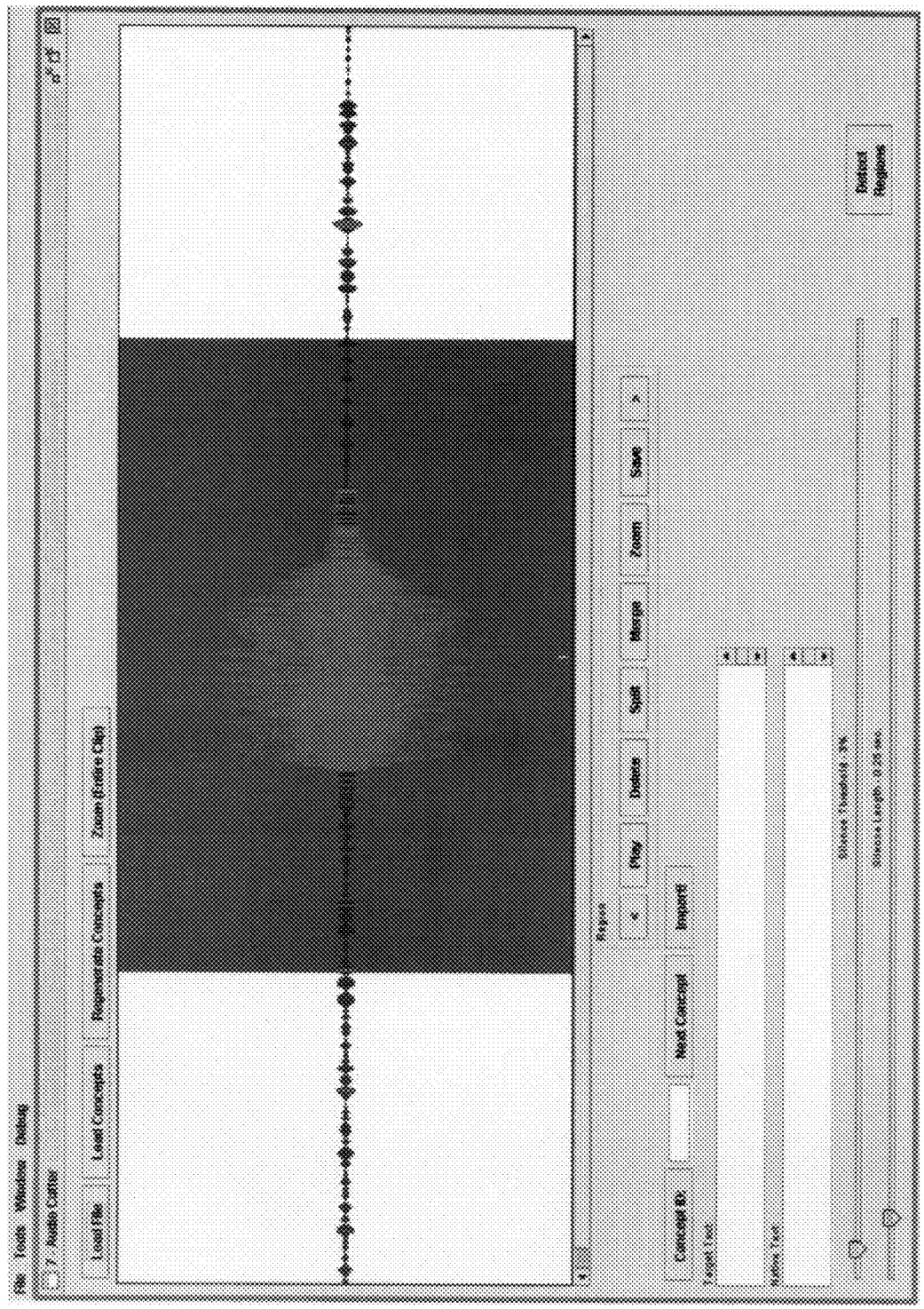
FIG. 9 illustrates a representative user interface in association with an audio cutter tool.

An audio cutter tool cuts a long audio file into smaller files by automatically detecting the gaps of silence between audio segments. The user can adjust the silence sound threshold and then automatically apply it to the entire file. Manual cutting and adjusting of the audio file is also possible. The audio cutter tool further names a new file, saves the name of the file under the correct concept property value, saves the file in the correct file folder, automatically inputs metadata, and the like. With reference to FIG. 9, a representative user interface is illustrated that is associated with an audio cutter tool. This allows a large quantity of concepts' audio to be cut up and processed in a fraction of the time in would normally take using traditional techniques.

E. Audio Start and End

An audio start and end tool allows instructional designers or content developers to modify the start and end positions of a selected audio file for static content purposes.

F. Concept Type Definer

Figure 10:
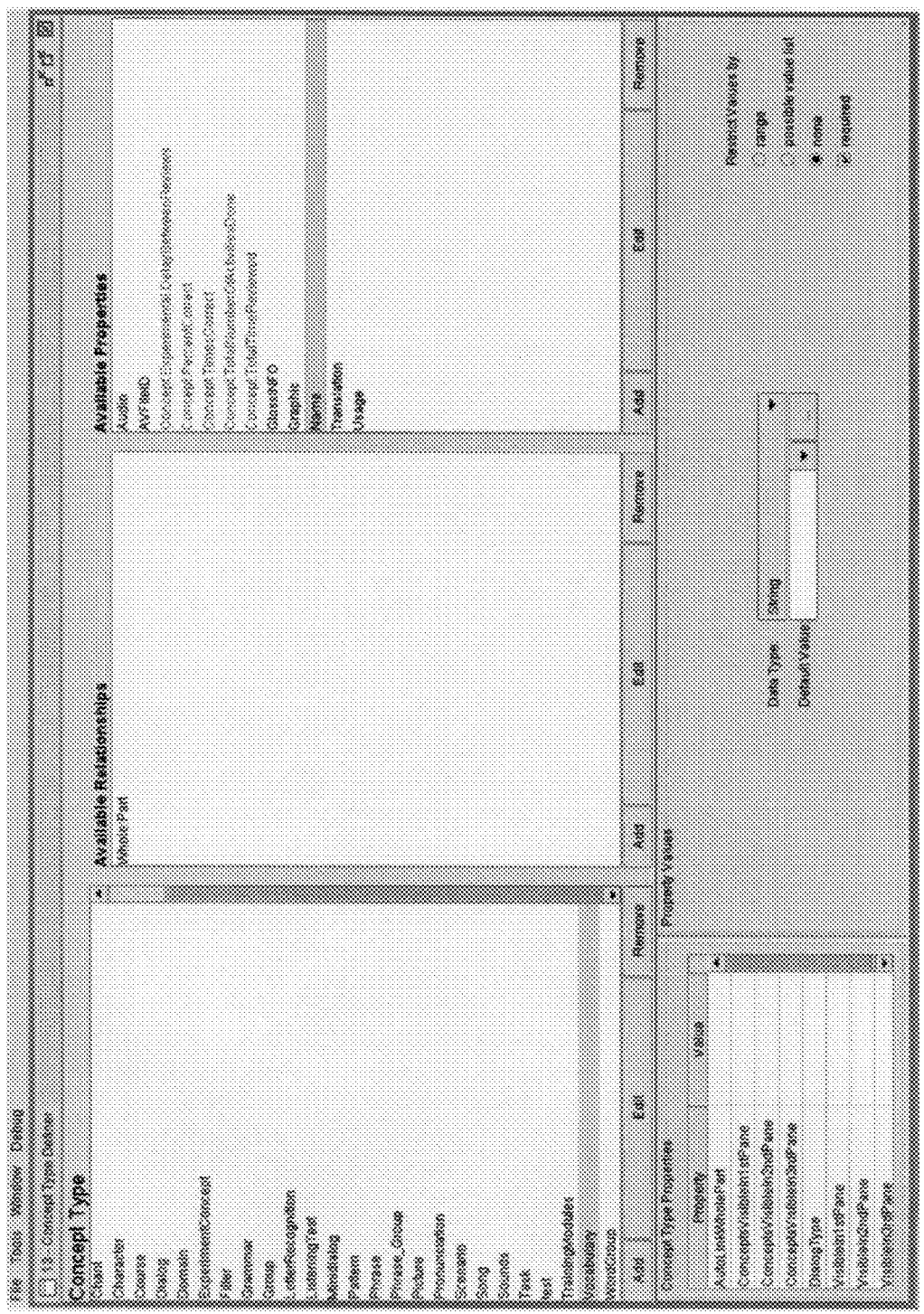
FIG. 10 illustrates a representative user interface for use in association with a concept type definer tool.

A concept type definer tool organizes the main areas (i.e., concept types) of a course allows designers to associate concept types with relationship types and properties that become available for defining concepts of that type. In addition, properties can be assigned directly to concept types that allow special functionality to assist in rapid development. (e.g. automatic linking in adaptive path builder for certain concept types). As provided herein, "concepts" are what is taught and "concept types" are categories of concepts. (e.g., concept type is "vocabulary" and the concept is "family"). This applies to every granularity of content. Concept types include everything from domains of learning and complete courses, to words and phrases. (e.g., concept type is "course" and concept is "Basic English"). Concepts have attributes that are called properties (e.g., audio file, translation, etc.). Concepts also have relationships that define how they are the same, different, or part of another concept (e.g., synonym, antonym, etc.) With reference now to FIG. 10, a representative user interface is illustrated that corresponds with a concept type definer tool. As illustrated, the concept type, available relationship and available properties are provided. The concept types may be selectively used to develop educational content.

G. Concept Entry Tool

Figure 11:
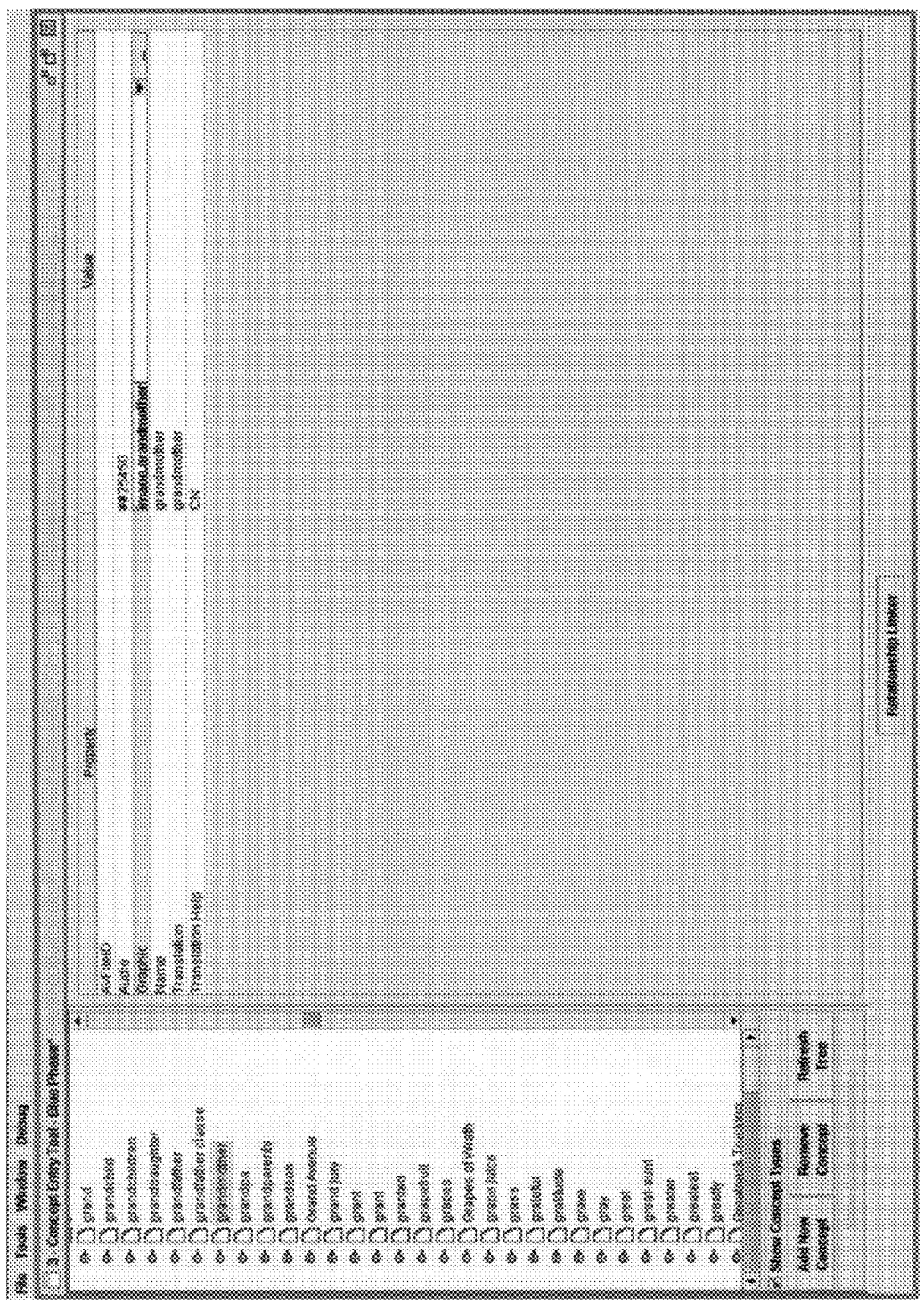
FIG. 11 illustrates a representative user interface in association with a concept entry tool.

A concept entry tool allows instructional designers or content experts to input and link concepts to a concept type. It further allows users to attach properties values (e.g., audio files, graphic files, etc.). To speed up the filling in of property values, tools are made to automatically facilitate the process. (e.g., audio cutter, translation editor, etc.) To further assist rapid design property values of concepts are used in activity builder to build dynamic activities. With reference now to FIG. 11, a representative user interface is illustrated that corresponds to a concept entry tool. As illustrated, a listing of concepts is provided and may selectively be used in designing educational content.

H. Component Manager

A representative component manager tool provides control or management over components of the system.

I. Content Checker

Figure 12:
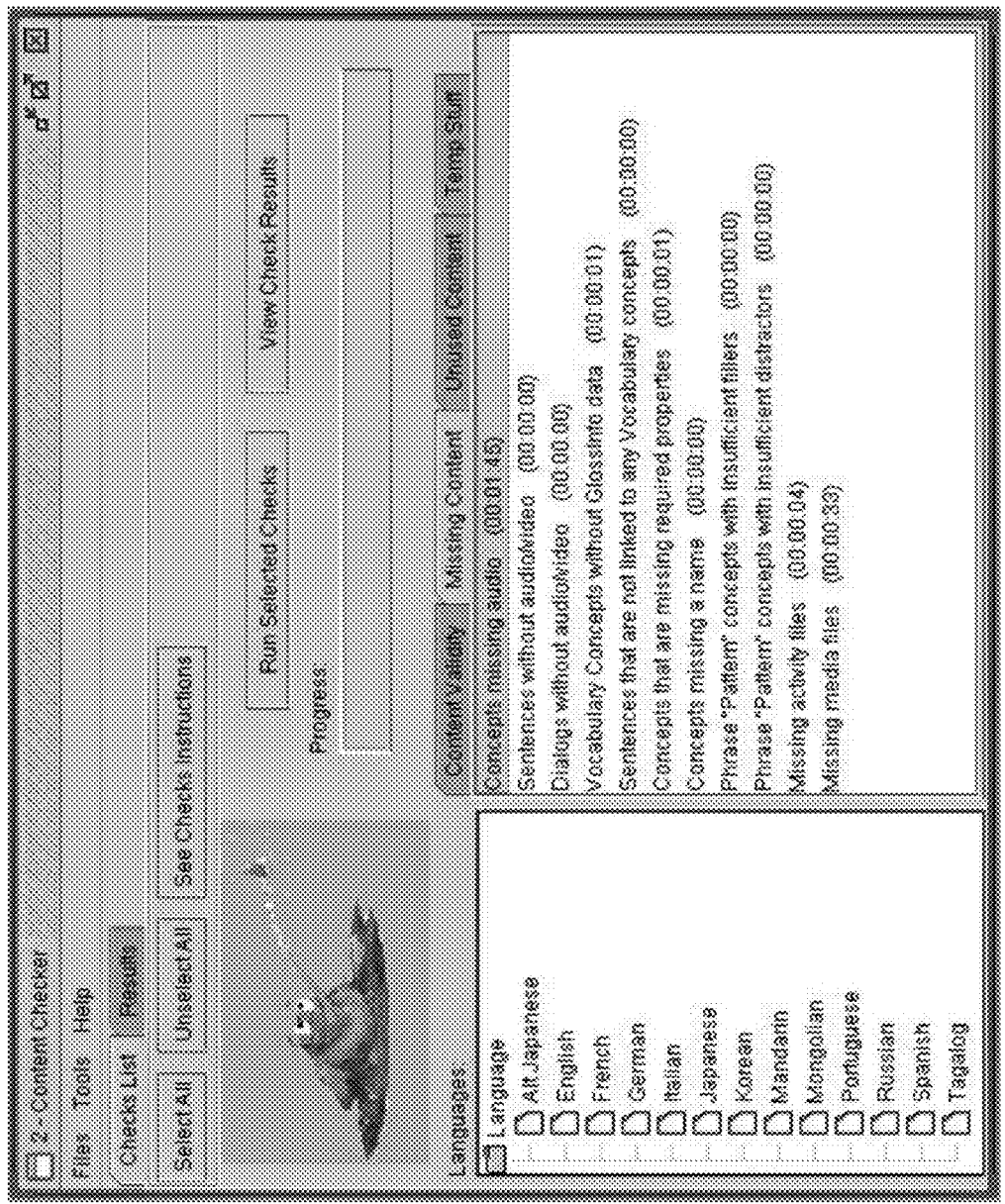
Figure 13:
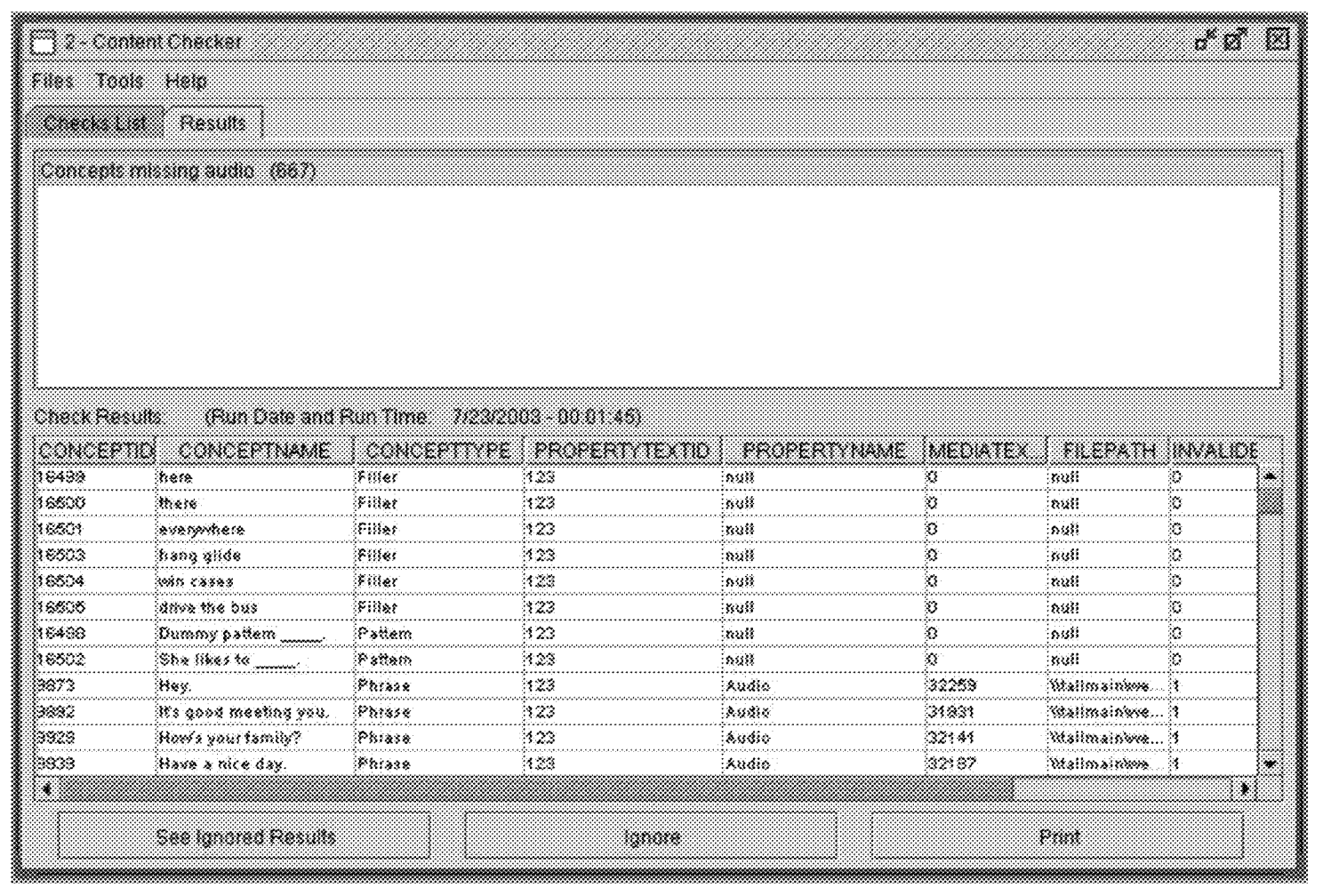

A content checker tool identifies potential problems corresponding to content (e.g., missing content in an adaptive path or activity, unused content, temporary content, etc.) and gives the user instructions on how to solve the problems. The content checker tool also identifies content development priorities. With reference now to FIGS. 12-13, a representative user interface that corresponds with a content checker tool is illustrated.

J. Course Extractor

A representative course extractor tool selectively exports content to run a resource. In at least one embodiment, rather than all of the content being exported, the only content extracted is the relevant content. Accordingly, the system speed is enhanced.

K. Example Tagger

Figure 14:
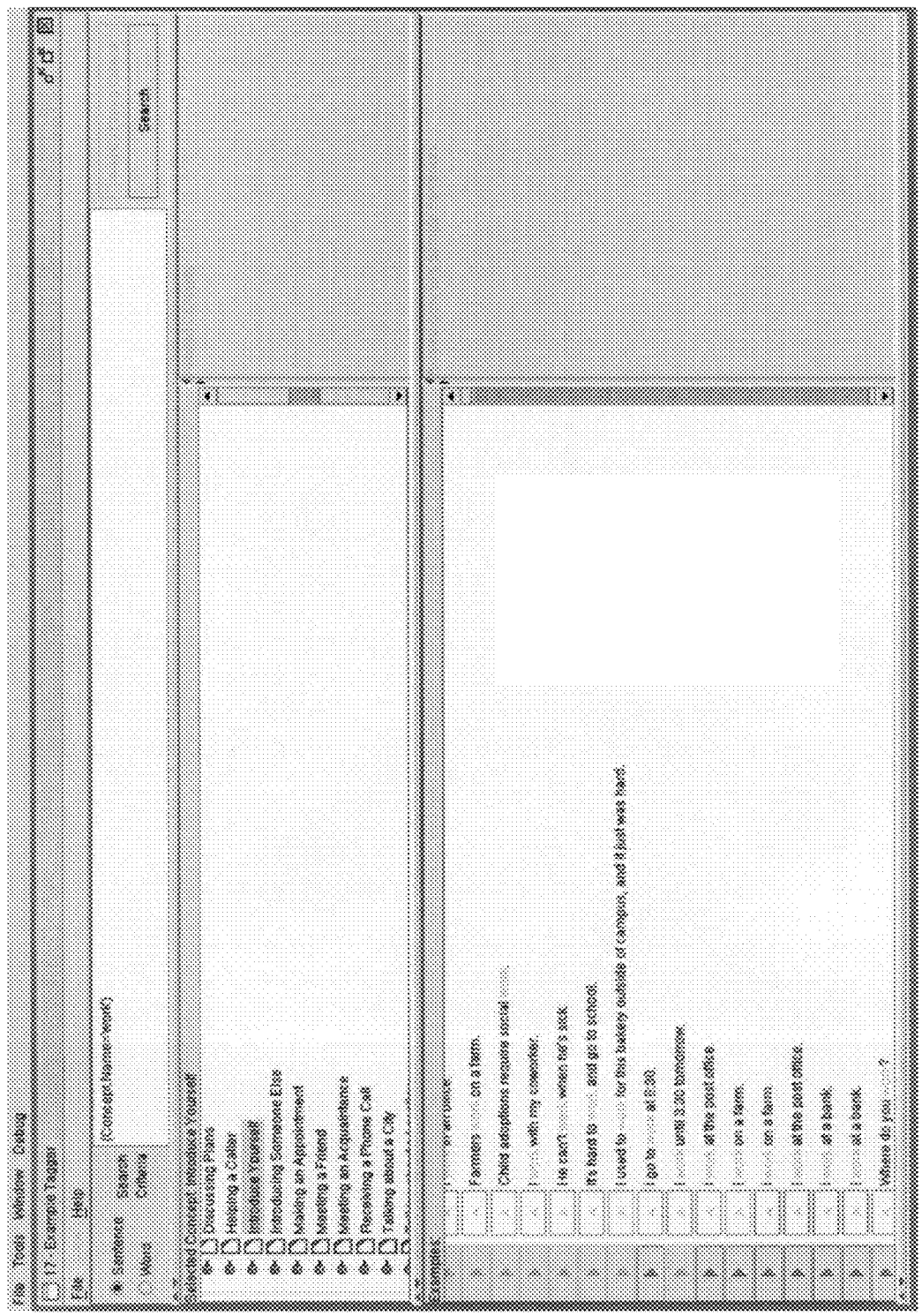
FIG. 14 illustrates a representative user interface for association with a tagger tool.

An example tagger selectively tags sentences and words as examples of concepts to be used dynamically in activities. The example tagger utilizes property values, relationships, and text in the search criteria. With reference now to FIG. 14, a representative user interface is illustrated that corresponds to an example tagger. In the illustrated embodiment, "work" is tagged and thus is provided in various concepts and is identified in a variety of sentences.

L. Gloss Linker

Figure 15:
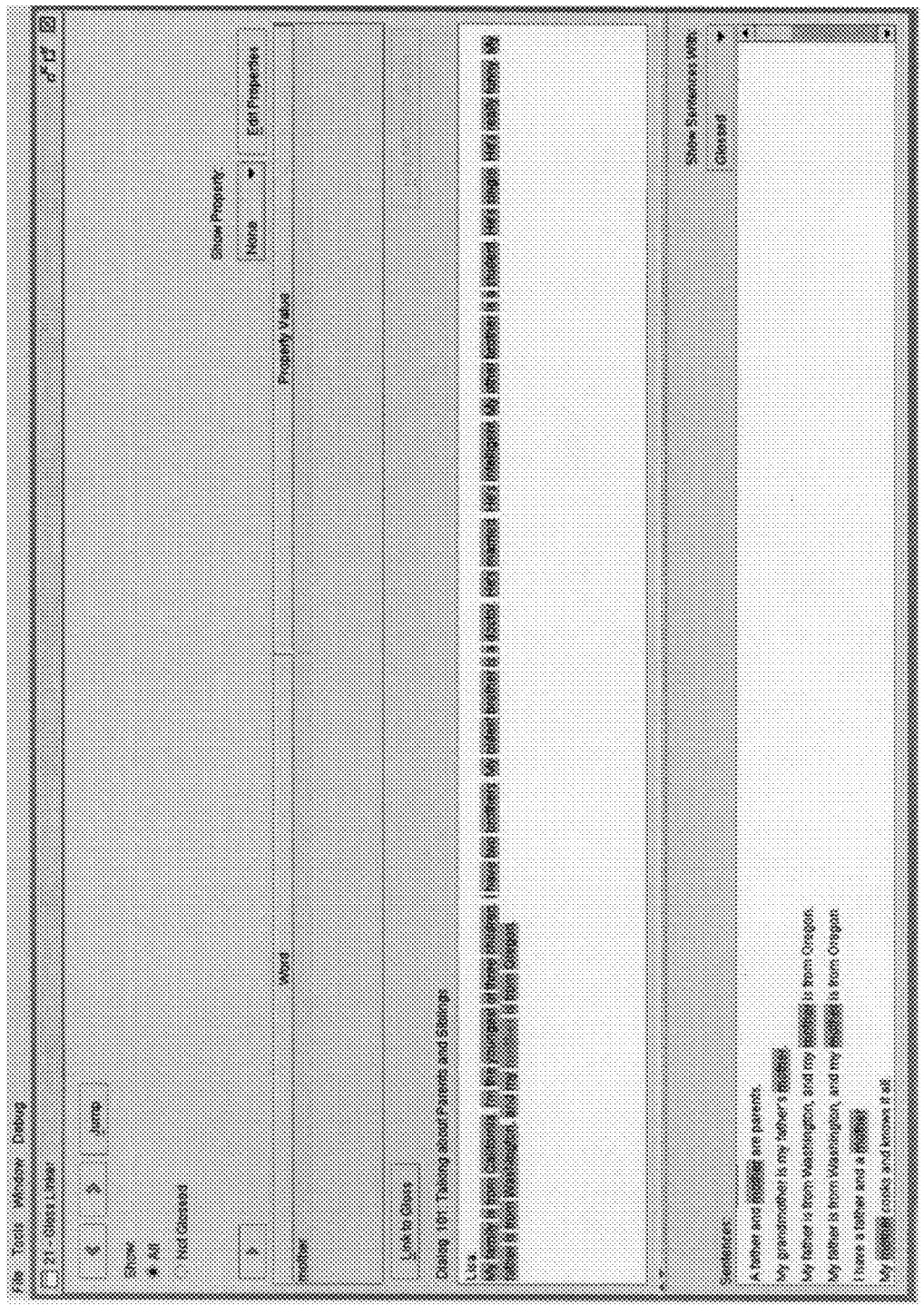
FIG. 15 illustrates a representative user interface in association with a gloss linker tool.

A gloss linker tool enables a designer to assign a gloss to a word in a sentence through a view of a given dialog or individual sentences. The designer decides whether the meaning or function of a word is so different that they want it separated into a new gloss (e.g., match can be a noun or a verb). If the designer wants to make a distinction, the gloss linker is used to assign the correct gloss to a word in a given sentence. With reference to FIG. 15, a representative interface that relates to gloss linker is shown. When a dialog or sentence is imported the gloss is automatically assigned where possible. The gloss linker provides a place for the designer to control the gloss assignment and manually assign remaining un-glossed words. The different colored highlighting helps the designer know what work needs to be done on a given dialog or sentence. The resulting gloss information can then be dynamically used in activities to help the learner know the exact meaning of a word in any dialog or sentence. This information can also dynamically be used to provide example sentences for a variety of vocabulary building activities. Gloss functions to highlight the word highlights in the sentence. The use of the gloss can provide emphasis on the word and/or can identify to the user a use of the word in the sentence.

M Media Manager

Figure 16:
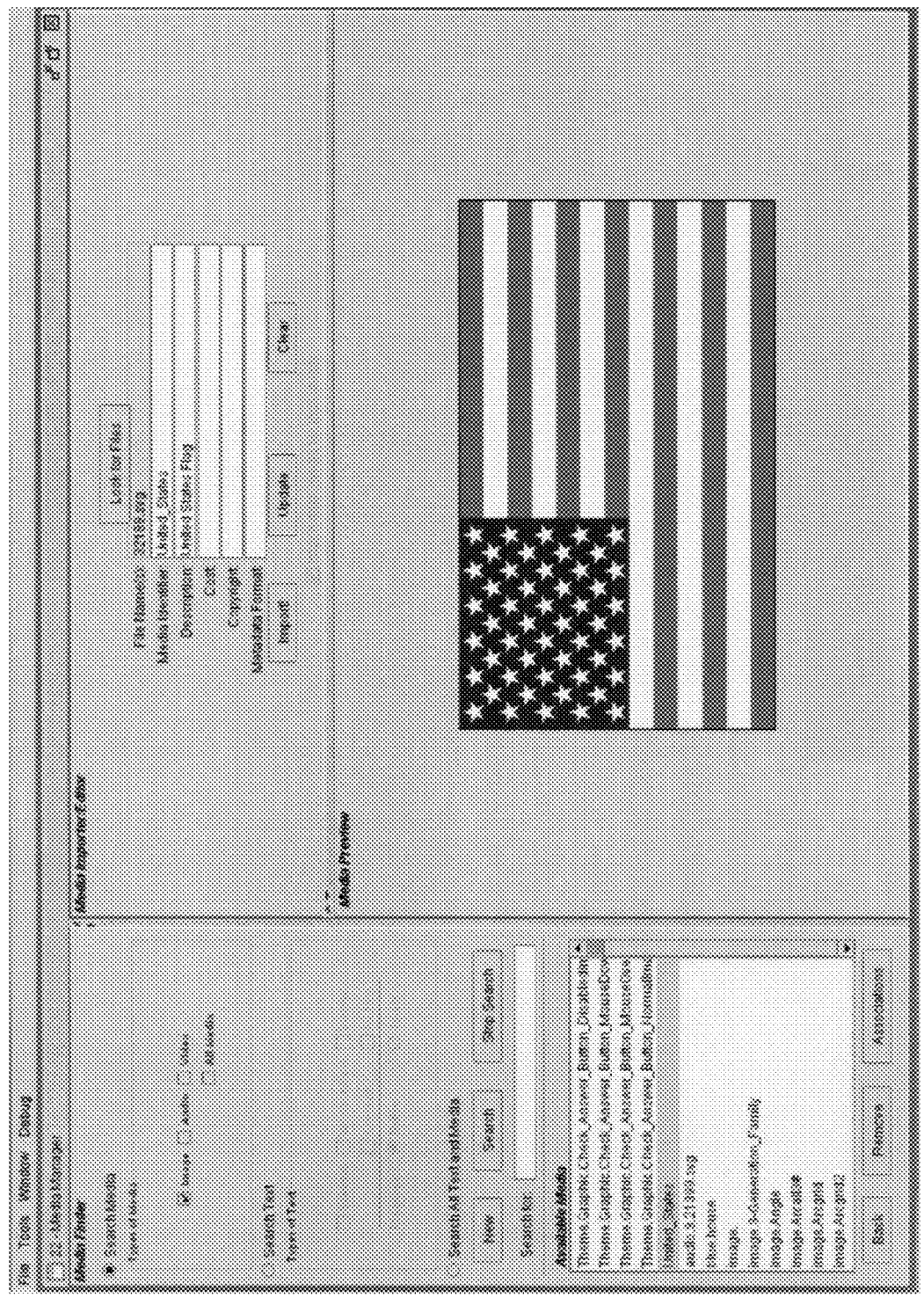
FIG. 16 illustrates a representative user interface for association with a media manager tool.

A media manager tool enables a designer to search for and select media objects or text for use in the activity builder and facilitates the reuse of content. With reference to FIG. 16, a representative user interface for association with a media manager tool is illustrated. A designer/user may utilize a media manager too to selectively search text by concept, example sentence, scenario, dialog, etc., or similarly search media objects by image, audio, video, or the like. Accordingly designers/users are able to selectively use media or other stored files from a library. In FIG. 16, a media manager tool is utilized to obtain a graphical representation of a flag of the United States of America that may be used in educational content.

N. Object Manager

A representative object manager is user to manage groups, users, user roles, locations and/or stage markers within the system. By way of example, an object manager tool enables the following tasks to be performed: (i) defining the properties of an object, including creating, editing and deleting object properties; (ii) creating new objects; and (iii) editing existing objects.

O. Relationship Linker

Figure 17:
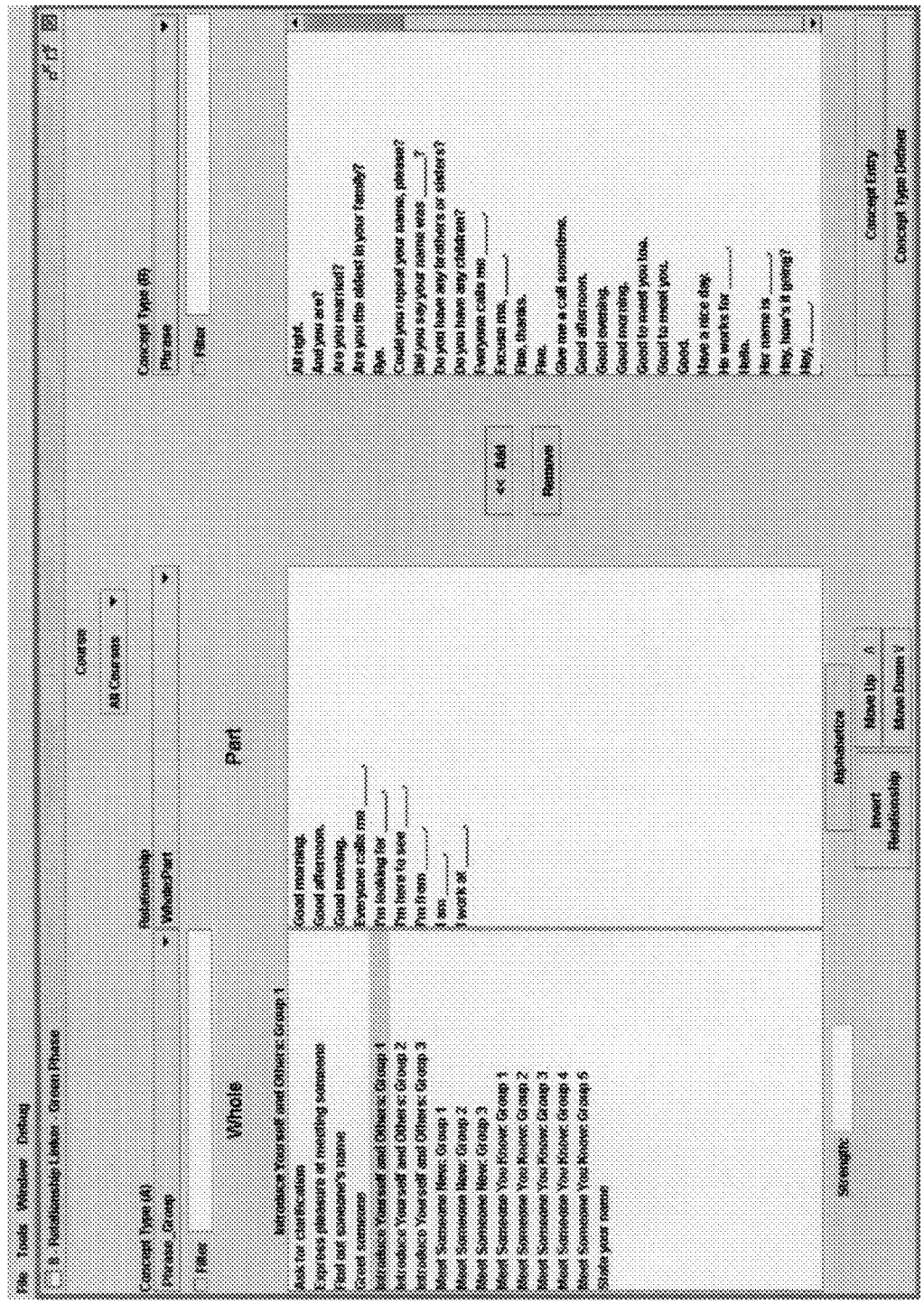
FIG. 17 illustrates a representative user interface for association with a relationship linker tool.

A relationship linker tool identifies a relationship shared by two educational concepts. With reference to FIG. 17, a representative user interface that relates to a relationship linker is illustrated. In FIG. 17, the relationships are selectively identified. In one embodiment, relationships that may be identified include "same as", "different than", "part of" or another relationship. The relationships available to the designer for a given concept type are defined in a concept type definer, thus allowing the designer the capability of adding any relationship needed for a given course. These relationships can then be used dynamically in activities to speed up development. Some relationships can have special functionality that is the same for any given course that help to display menus, and the like.

P. Rights Manager/Rights Management System

In accordance with embodiments of the present invention, a rights manager or rights management system may be associated with development module 82 and/or implementation module 84. A representative rights manager is used to control user access. For example, access may be controlled for such objects as activities, concepts, adaptive paths, media, themes, concept types, etc. The control may be exercised in a variety of ways. Rights manager may be used to set each user's permission to read, write and/or use system objects as well as controlling ownership of objects. Each user's permission to use system tools in order to perform tool operations, such as using activity builder to build activities, may be controlled by rights manager.

Q. Sentence Synchronizer

Figure 18:
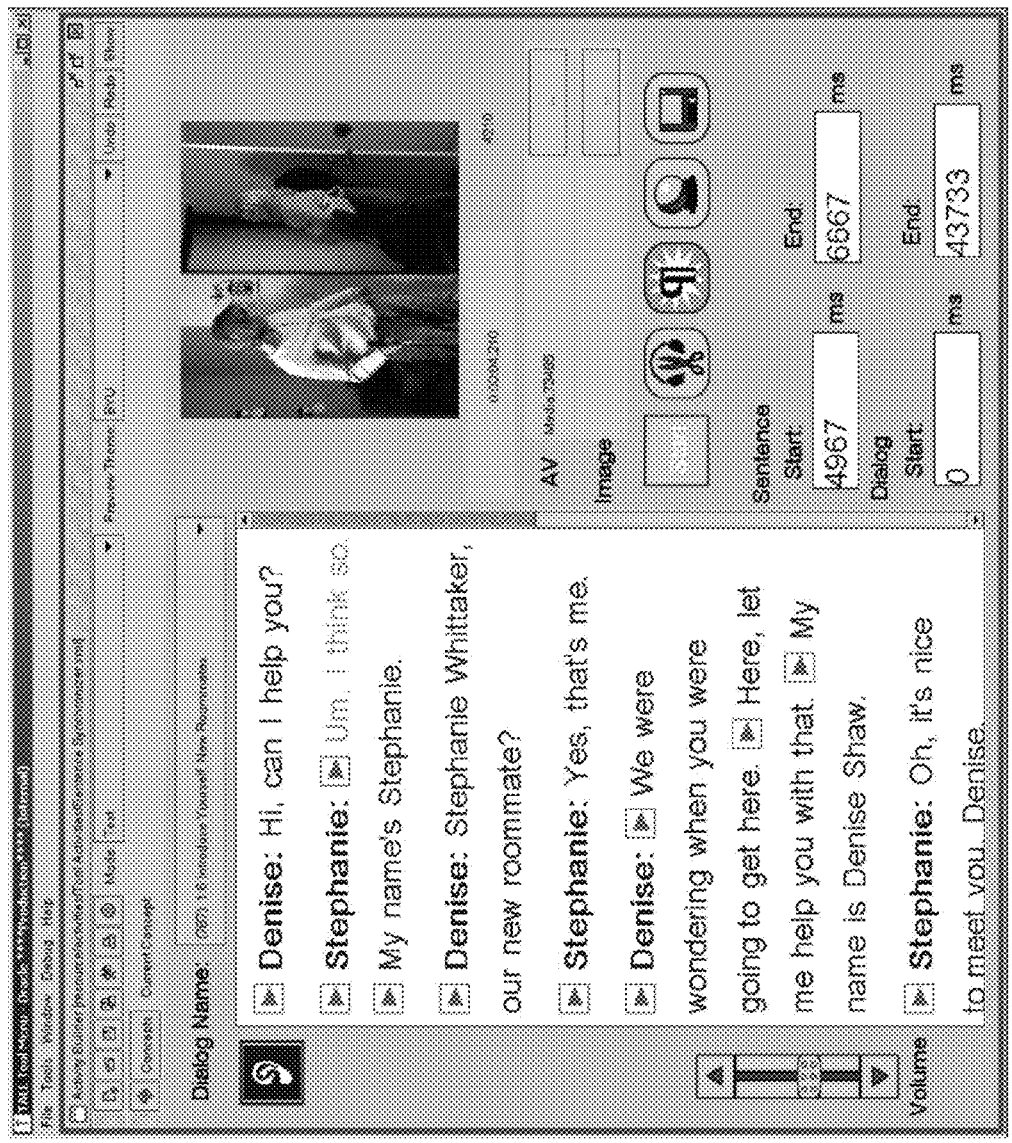
FIG. 18 illustrates a representative user interface for association with a sentence synchronizer.

A sentence synchronizer tool provides an efficient way to attach an audio file to a dialog and identify audio starting and ending points of the dialog, paragraphs, and sentences. A representative user interface associated with the sentence synchronizer is illustrated in FIG. 18. The tool allows the user to select a dialog to work on, allows the user to attach an audio-video file to the dialog, automatically assigns start and end points for the dialog, allows the user to manually identify the end of every sentence, allows the user to manually modify the start and end points, and/or allows the user to link a graphic with any sentence in the dialog.

R. Text Importer

Figure 19:
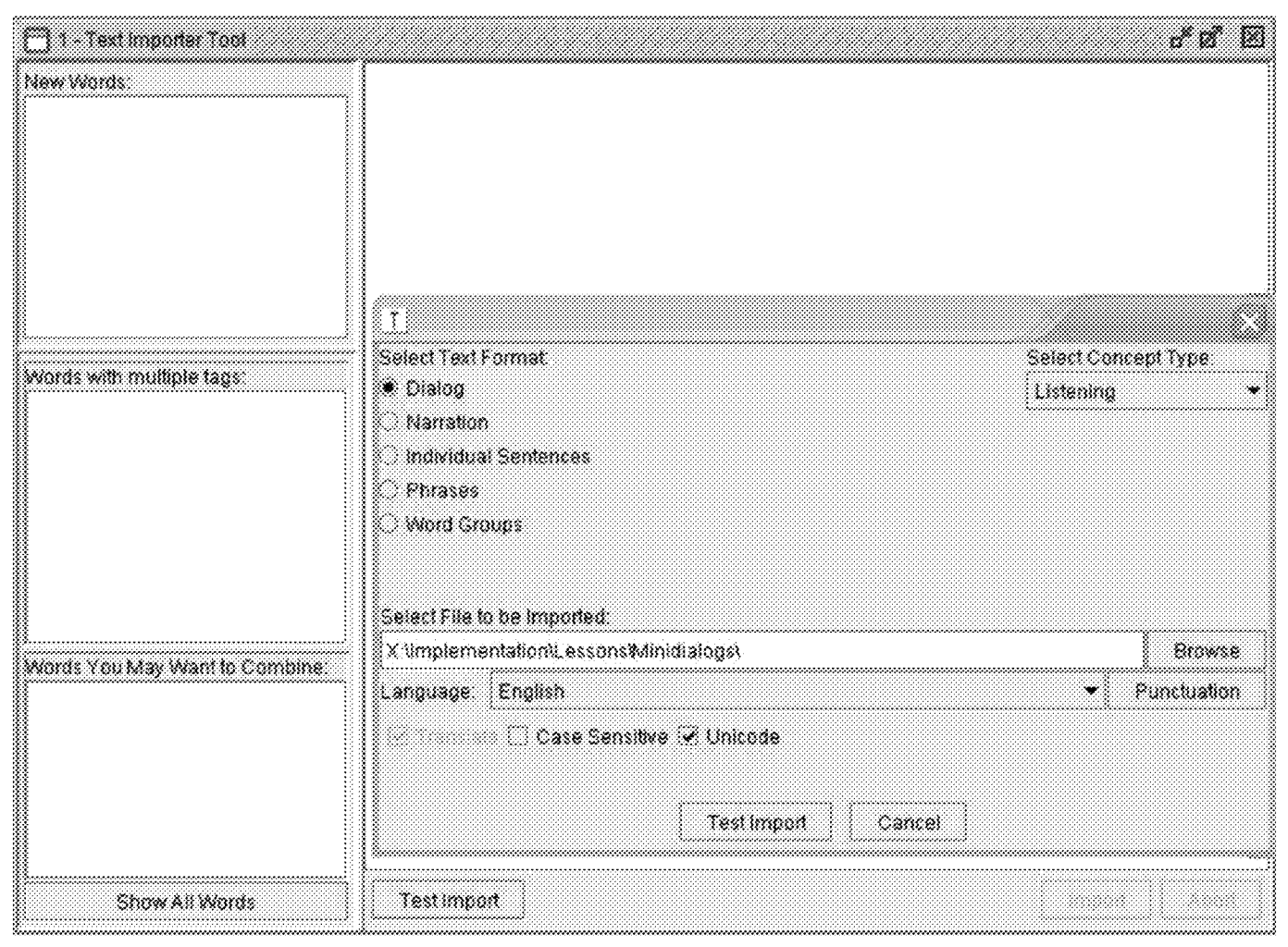
Figure 20:
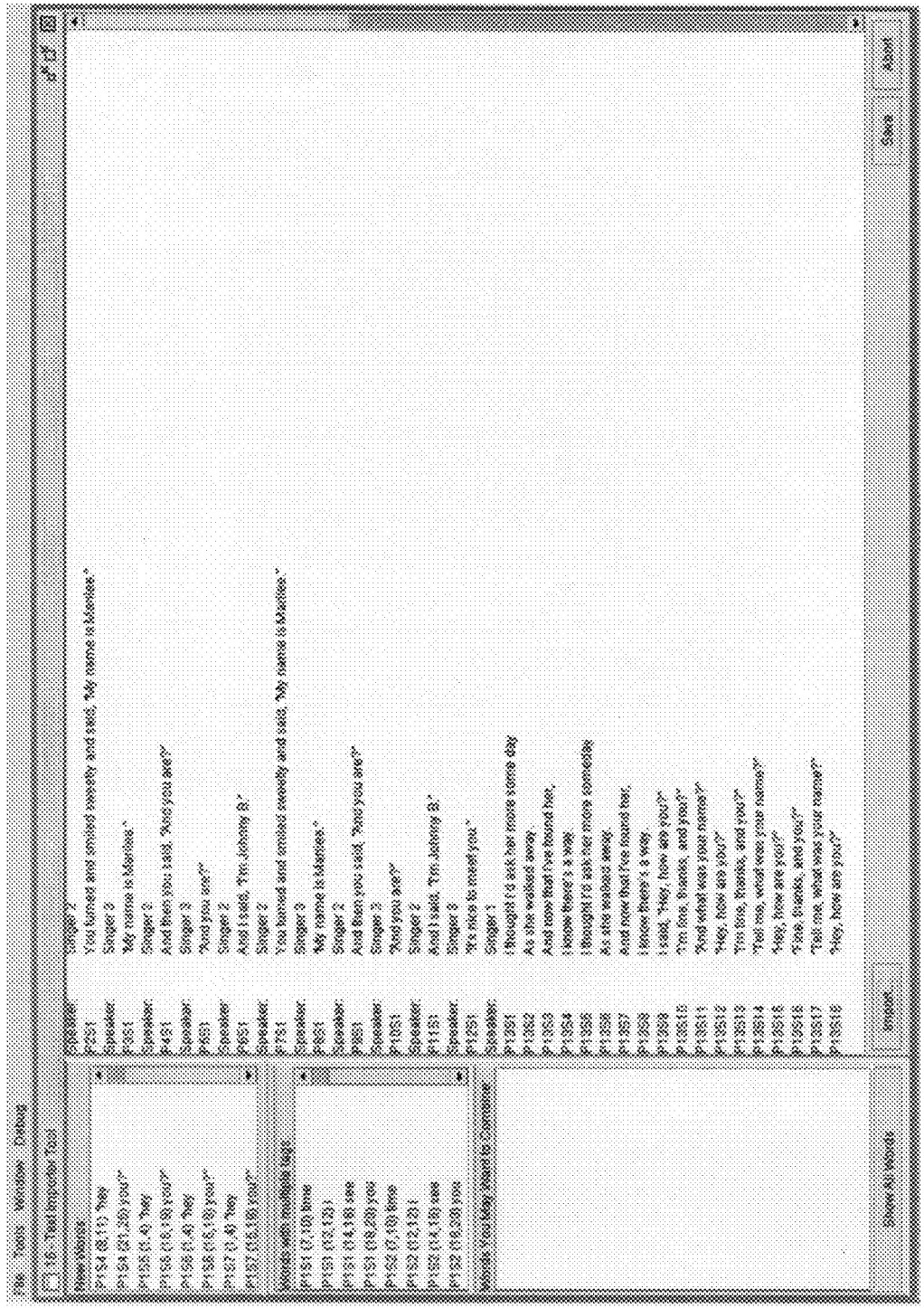

A text importer tool imports content intended for dynamic use. FIGS. 19-20 illustrate a representative user interface giving the designer/user choice over types of content to import, characteristics of content (i.e., needs translation and/or audio), and what to filter or ignore while importing (i.e., case-sensitivity, punctuation, etc.) In accordance with the illustrated embodiment, the text importer tool loads dialogs, sentences, and words into appropriate database tables, establishes links between words and their respective sentences, identifies and adds new words introduced by imported sentences, suggests words that should be combined and/or allows the user to combine words that have been combined in the past.

S. Tools Menu

A representative tools menu allows a user (e.g., an instructional designer) to selectively obtain or launch the one or more tools needed to perform a task.

T Translation Editor

Figure 21:
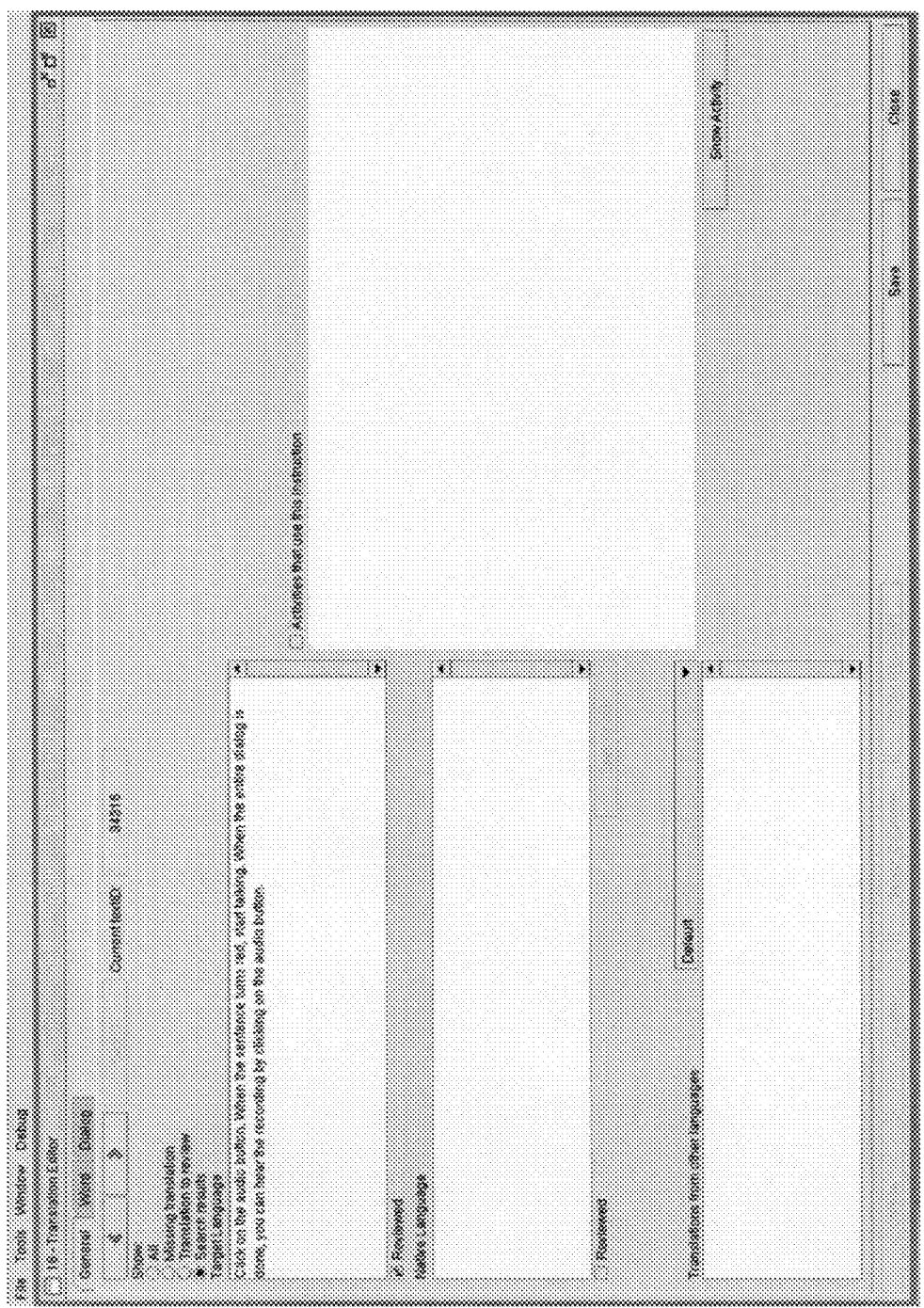
FIGS. 21-23 illustrate a representative user interface for association with a translation editor tool.
Figure 22:
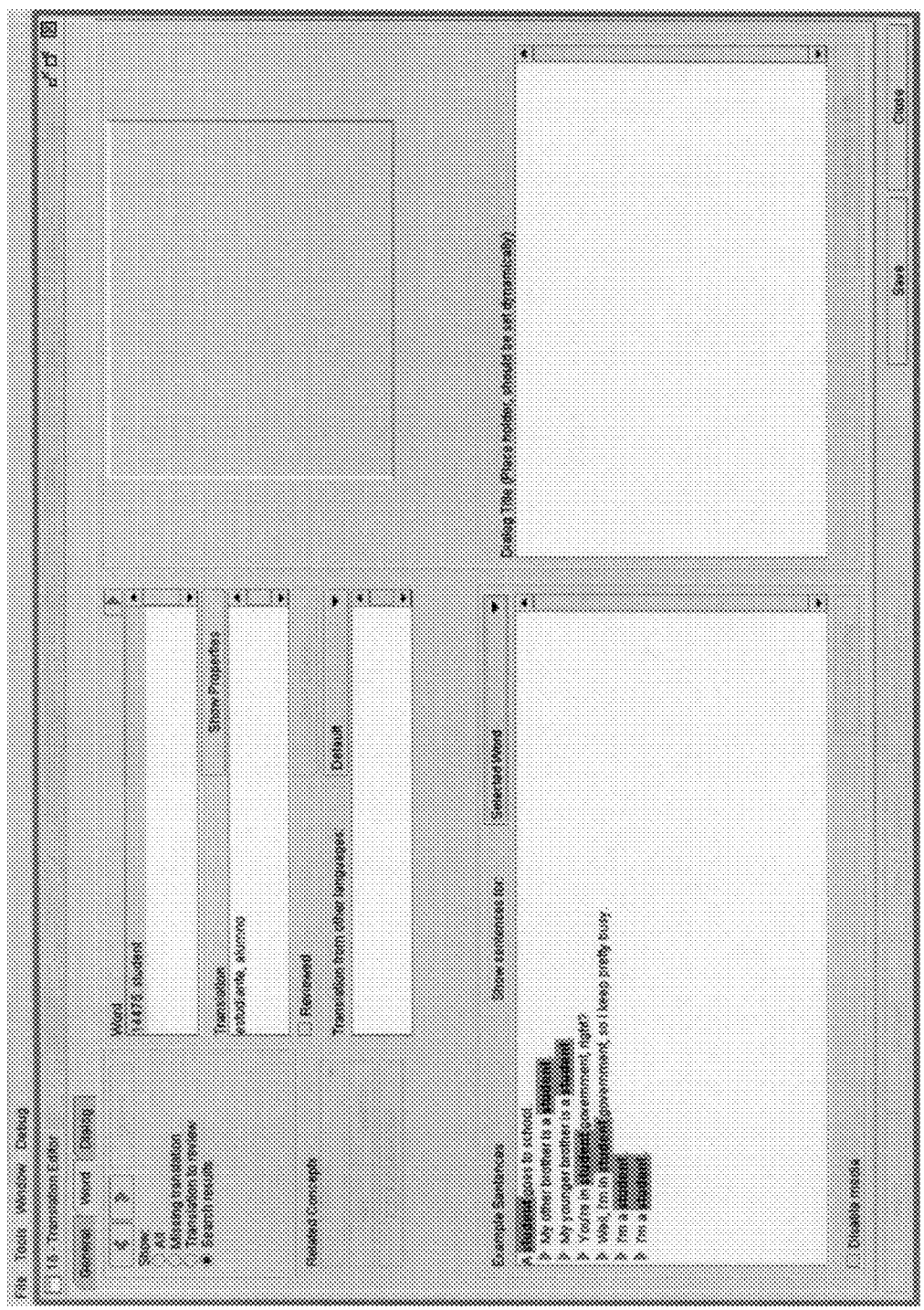
Figure 23:
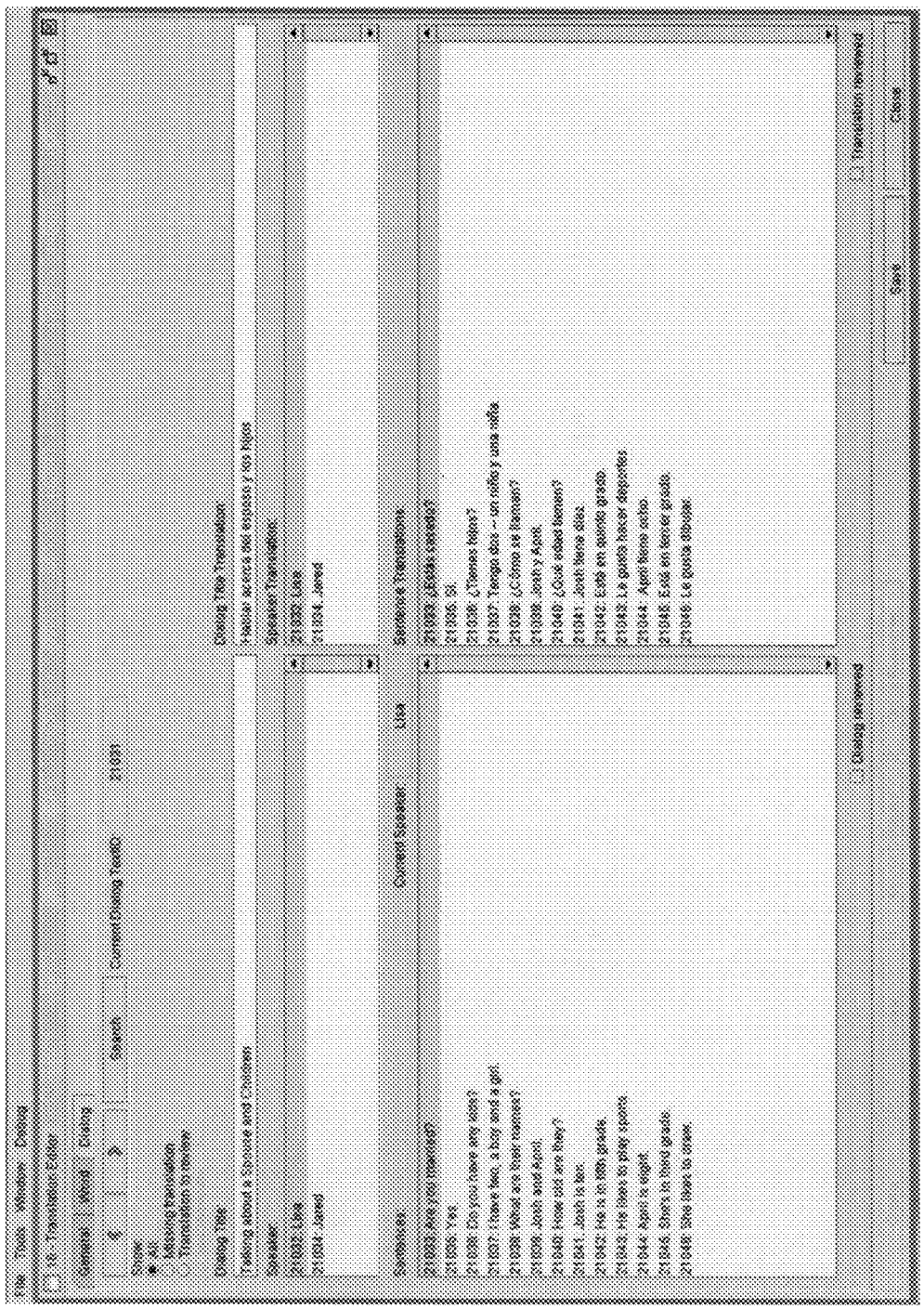

A translation editor tool provides translators and content editors with text that is ready for translation and review. The text is identified and categorized automatically when text is imported in text importer, saved in activity builder, and/or input in concept entry tool, etc. The translator is presented with the necessary information and context to permit high quality translation (e.g., shows activities, media assets, larger contexts, and associated concept properties). A representative user interface associated with a translation editor is illustrated in FIGS. 21-23.

U. Other Development Tools

Figure 24:
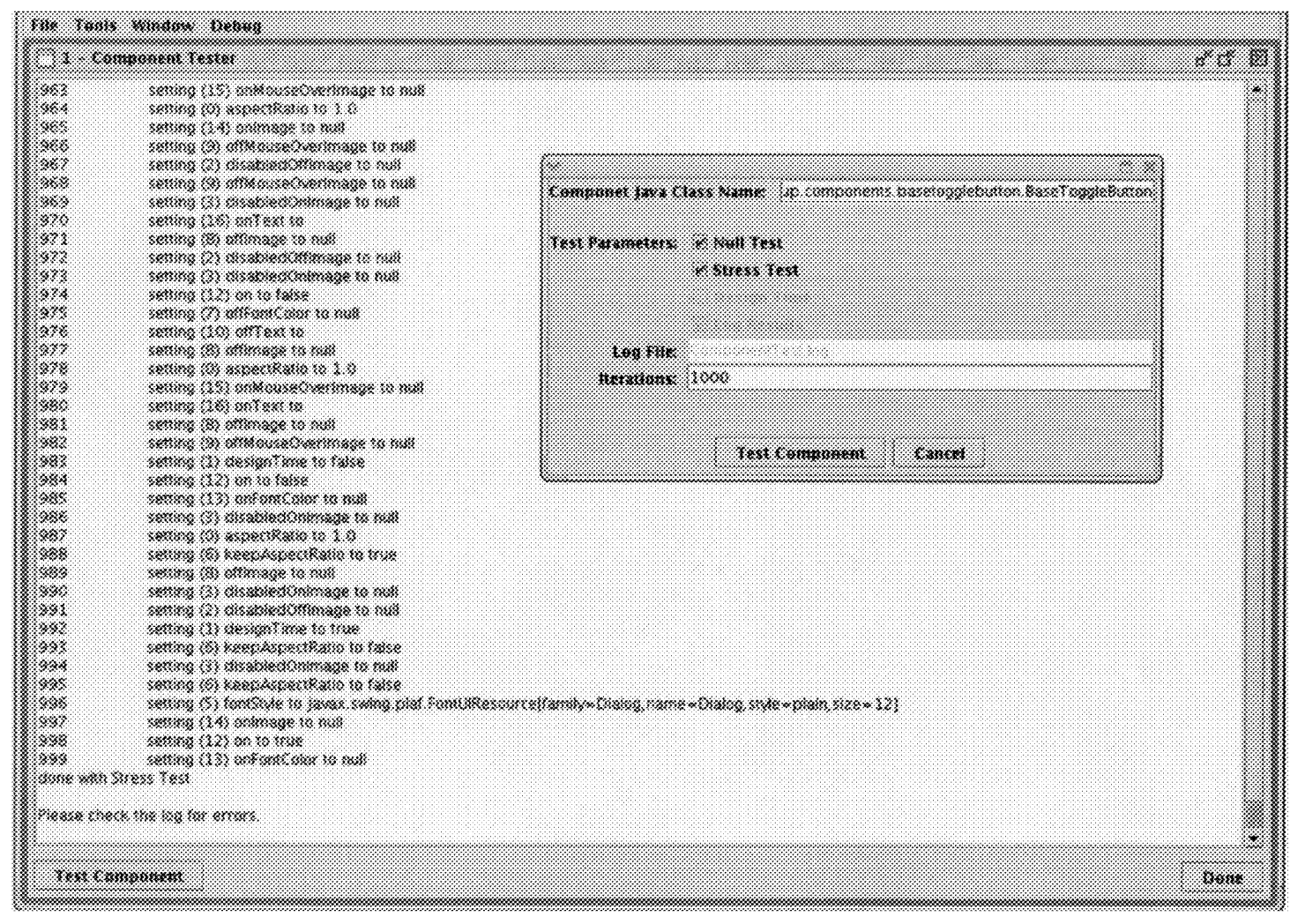

Those skilled in the art will appreciate that the development tools provided herein are representative of tools available for use by a designer to develop educational content for a dynamic continual improvement educational environment. Accordingly, embodiments of the present invention embrace other development tools. An example of another tool is illustrated in FIG. 24, which illustrates a representative user interface that is associated with a component tester tool, which executes automated tests on components to ensure that they function properly and selectively diagnoses or otherwise notifies a user of an error or problem. Those skilled in the art will appreciate that embodiments of the present invention embrace other tools that enable a designer to develop educational content for a dynamic continual improvement educational environment.

Thus, in accordance with embodiments of the present invention, an instructional designer selectively develops instructional/educational content for a learner/student. As provided herein, the development of the educational content is dynamic and efficient and is facilitated by not requiring that the educational content be modified at the code level by a computer programmer. Instead, a method (e.g., object oriented method, drag-and-drop method, etc.) is employed that enables an instructional designer to quickly, dynamically and customizably create educational content for a student/learner/tutor/administrator, or group of students. As discussed above, a variety of tools are available for use by the instructional designer to develop the content. Examples of such tools include an activity builder, an adaptive path builder, a theme designer, an audio cutter, an audio start and end, a concept entry tool, a concept type definer, a content checker, an example tagger, a gloss linker, a media manager, a relationship linker, a sentence synchronizer, a text importer, a translation editor, and/or other such tools that enable a designer to quickly, dynamically and customizably create educational content for one or more students/learners in a dynamic continual improvement educational environment.

II. Implementation Tools

Once the instructional/educational content is developed, the content is selectively implemented in the dynamic continual improvement educational environment. In at least some embodiments of the present invention, implementation of the educational content includes customizably and dynamically instructing individual students/learners and selectively gathering data. A variety of tools (e.g., instruction engine, learner guidance system, learning optimizer, collaborative activity manager, user/group manager, positive feedback generator, remote document feedback, rights management system, research organizer, reports builder, etc.) are available for use. Accordingly, the following is a discussion relating to representative implementation tools available for use in providing educational content in a dynamic continual improvement educational process.

A. Instruction Engine

Figure 25:
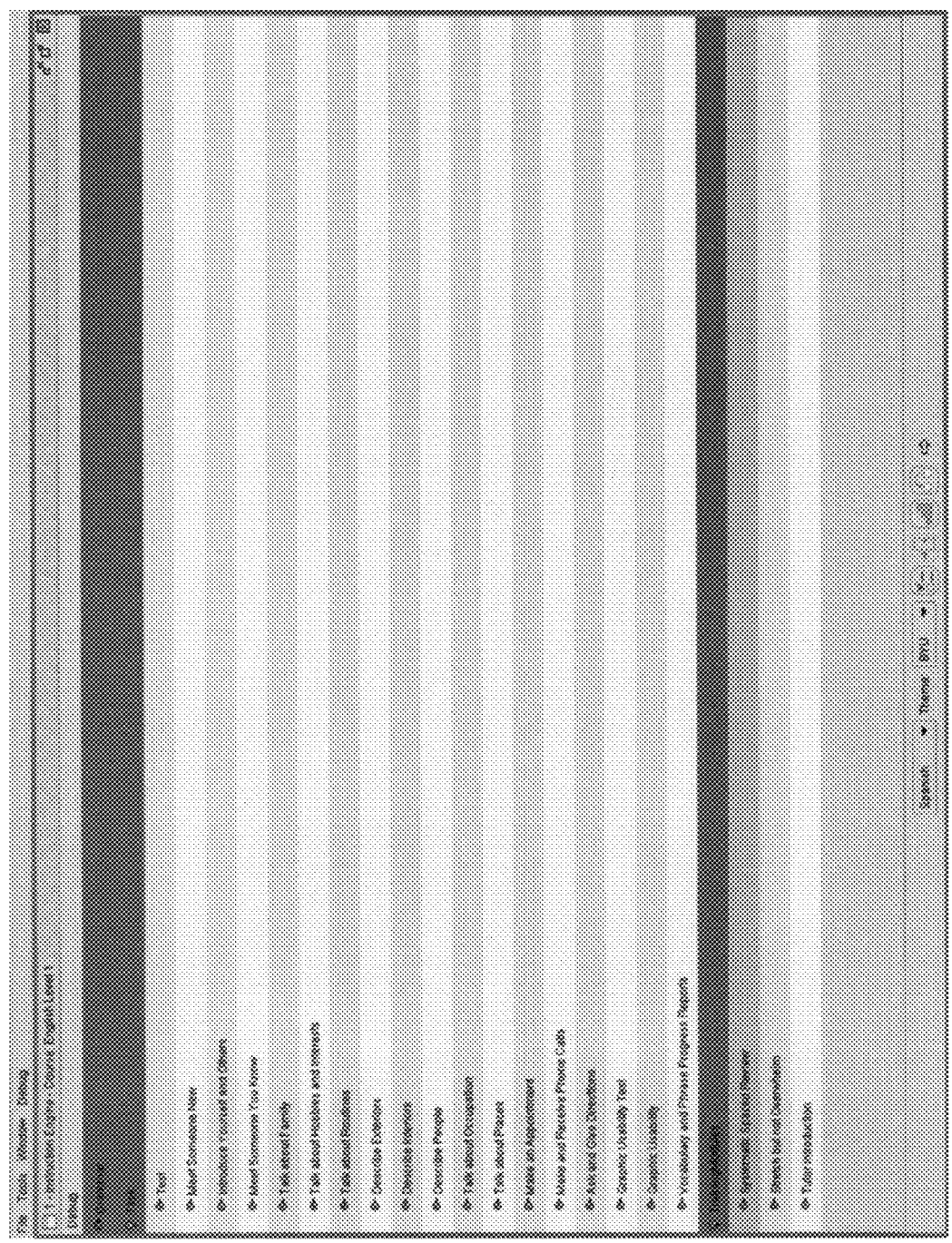

An instructional engine identifies which activities/lessons are currently available to the learner, and recommends or decides which activities/lessons to present next. With reference now to FIG. 25, a representative user interface associated with an instruction engine is provided. In some embodiments, the learner guidance system provides the visual interface instead, and the instruction engine works in the background to provide the learner guidance system information it depends on.

The instruction engine keeps track of the learner's progress in learning concepts and initiates the instructional activities that are needed to further the learning progress. In some embodiments, when an activity becomes available to the learner according to the branching of an adaptive path, the activity is added to the list of all available activities for that learner. In some embodiments, the role property of the activity may be set to someone other than the learner. Accordingly, activities or the results thereof are made available to another individual or system, such as a tutor, instructor, manager, proctor, etc.

In some embodiments, an instruction engine supports multi-user activities. Accordingly, interactive activities between multiple users or a user and an instructor or tutor may be provided in the dynamic continual improvement educational environment.

In some embodiments, an instruction engine is used for purposes other than instruction. For example, there is a decision tree that a developer must use to choose the part of speech property of English word concepts. This decision tree can be defined as an adaptive path—a series of questions and branches. The instruction engine can thus execute the adaptive path, even though it's not related to the learning of a particular concept.

In some embodiments, tutors utilize the instruction engine for other purposes. For example, when conducting a task practice the tutor will be guided through several activities that comprise the adaptive path for task practices.

An instruction engine enables all of the features defined by an adaptive path. Examples include branching conditions, delay ranges, etc. An instruction engine also invokes activities defined by Activity Builder. A learner guidance system works in harmony with an instruction engine by providing the learner with prioritized options for what to learn next. Once the learner chooses an option, the instruction engine starts the activities related to that option, one at a time until the learner finishes all activities related to the chosen option, until there are more activities but they are all delayed, or until the learner voluntarily returns to the main menu (learner guidance system) or exits the program.

In at least some embodiments, an instruction engine does not have its own user interface. Instead, it invokes menu activities which can invoke other activities. The instruction engine maintains a list of available activities, chooses which activity to do next, and/or keeps track of progress. In addition, the instruction engine attends to issues related to learner control, multi-user activities, mid-stream changes to instructional content, positive feedback, optimization, and/or providing lists of related concepts for multi-concept activities.

Once a learner registers for a course, the first stage marker on the course's adaptive path automatically becomes available to the learner. The first time the learner logs in after registering for a new course, the Instruction Engine evaluates the conditions of the branches emanating from this stage marker. In this way, any number of activities or concept links can be made available to the learner from day one.

In evaluating branching conditions, as soon as any activity is completed or skipped, the instruction engine evaluates the branching conditions for the branches emanating from the activity. Likewise, as soon as any stage marker is reached, the instruction engine evaluates the branching conditions for the branches emanating from the stage marker. However, in at least some embodiments, branching conditions of branches emanating from concept links are evaluated only after the learner reaches the specific stage of the concept from which the branches emanate. In one embodiment, the branching conditions are evaluated immediately once a concept link is encountered. In another embodiment, an instruction engine tracks the trail of the learner so that it will only evaluate the branches for the concept link from which the learner originated.

In some embodiments, an instruction engine allows multiple concept links to the same concept within an adaptive path and keeps track of which concept link led to a given activity. That way, when an exit branch is encountered for a concept link upon the learner reaching an underlying stage marker, the instruction engine knows which concept link branching conditions to evaluate. Furthermore, in at least one embodiment and as a simplifying constraint on the system, it is presumed that a given exit point will only be used once within an adaptive path. That way, if there are two concept links to the same concept within an adaptive path, only one of the two concept links have a branch exiting its second stage marker, and only one has a branch exiting its third stage marker, and so on.

In some embodiments, the branching conditions of branches emanating from sets (e.g., activity sets, concept link sets, etc.) are evaluated after the learner has fulfilled the completion criteria defined by the set.

Branching can take place based on how the learner answered the previous question. For example, after a multiple choice question the branching might in essence be: "If option=A then . . . elseif option=B then . . . elseif option=C then . . . " and so on. Menu activities function in a similar manner. Branching can also be based on whether the previous question was answered correctly or not. Accordingly, corrective feedback activities may be provided.

In some embodiments, if a learner has already mastered a concept then its adaptive path is not repeated just because the concept is encountered again in some adaptive path. However, in some embodiments, the concept is encountered again because the instructional designer specified the need for repetition. Branching can also be based on overall performance of the learner on a certain sub-concept.

Optionally, when branches feed into a stage marker, the activities after the stage marker cannot begin until the learner has completed all branches feeding into the stage marker. This is a property of a stage marker.

In at least some embodiments, the instruction engine ensures completion of branches feeding into a stage marker by checking to see if the activity, concept link or set preceding each branch is complete. In some embodiments, the instruction engine records whenever each branch has been taken into the stage marker. When all branches are ready, the stage marker is considered "reached". This stage marker ID is recorded in a table as the highest stage marker reached for that concept.

In another embodiment, the branching approach is probability-based branching, which enables assigning a certain relative probability that each branch be taken. At runtime, the instruction engine essentially rolls dice and picks the highest number.

Branches can be optional or required. In at least some embodiments, the instruction engine keeps track of this so that only required activities are automatically initiated. Optional activities are initiated by the learner. And, if a learner chooses to do an optional concept link that leads to required branches, those branches are still considered optional since the entire concept is optional.

Several branches can emanate from a single icon in an adaptive path. If these branches emanate from a black circle nib or if they emanate from more than one nib, then multiple activities or icons may become available to the learner. On the other hand, if the branches all emanate from a single diamond nib, then only one branch can be taken—the first one whose branching condition is true.

Relating to a delay range, a minimum delay and a maximum delay are included in the branching criteria of each branch. When an icon is added to the list of available activities, the date of availability is recorded as well. Specifically recorded are: (i) the absolute date and time that the icon will first become available, and (ii) the absolute date and time that the icon will become urgent, meaning the max delay has been exceeded. These are calculated by adding the min and max delays to the current date and time at the moment that the branching conditions were evaluated.

In generating a to-do list that presents to the learner a few, high priority learning choices based upon the learner's previous performance and upon learning sequences and priorities set, analyzed, and updated by the system, the instruction engine performs a lot of behind-the-scenes work to make the learner guidance system function. The learner guidance system is mostly a user interface, whereas the instruction engine is primarily underlying intelligence that drives the user interface. This information is accessible via special activity components that supply this information to the learner guidance system's user-interface components.

The to-do list communicates with the instruction engine in order to get the items that are to be displayed. The instruction engine replies with a series of "MenuItem" objects, each of which hold information needed to display the object, as well as a series of objects that allow the instruction engine to derive a series of available activities from it. For example, the to-do list may contain a "Test" row, which represents a "MenuItem" that contains every stage marker of type "Test".

Relating to generating a progress bar list, the instruction engine knows how to measure the learner's progress on every concept. This information is then used by the learner guidance system to display a progress bar for each concept. Measuring depends on whether the adaptive path in question contains concept links. If the adaptive path contains concept links, the instruction engine takes into account the extent to which the linked concepts have been mastered and then adds all of the weighted percentages to get a total percentage for the concept. (Concepts are weighted according to the estimated average time that it would take for a typical learner to complete all the activities in its adaptive path.)

If the adaptive path just contains activities, then the percentage of progress is equal to the percentage of activities completed, weighted by their completion time estimates.

A progress bar list component communicates with the instruction engine in order to determine what should be displayed in its list. Each row in the progress bar list represents a MenuItem object, which holds information needed to display the object, as well as a series of objects that allow the instruction engine to derive a series of available activities from it. For example, if the progress bar list shows the concept "Banana", then the MenuItem containing that particular concept would be passed to the instruction engine when selected by the user so that the instruction engine could evaluate the adaptive path for that concept in order to derive one or more available activities.

In some embodiments, each MenuItem object provides a method that allows it to tell other objects the text that should be used when displaying it. A MenuItem can hold any combination of one or more concept types, concepts, stage markers and activity instances. The MenuItem also contains a RecordUserData property, which indicates whether or not user data resulting from use of the MenuItem should be recorded in the database. Each time the instruction engine receives a new MenuItem object it generates a new sub-available activities list, which has its own current available activities list, previous available activities list, and working pool. Each sub-list determines whether or not user data gets recorded, as determined by the corresponding MenuItem property. Each sub-list acts as a logical grouping of available activities. Once a sub-list has been exhausted the learner will be returned to the previous sub-list. Once the learner has exhausted all sub-lists he or she will be returned to the progress bar list or to-do list.

Regarding a representative process of choosing which activity to do next, the instruction engine sorts available activities at the moment a new available activity is added to the list, according to urgency date (first) and the distance of the available activity from the originally selected concept (second)

Regarding a process of filtering by what the learner chose, after logging in the learner is presented with the menus of the learner guidance system. These menus (e.g., a to-do list and progress bar list) allow the learner to choose a particular concept and optionally stage or concept type to work on next. The learner picks a concept type from the to-do list. Before deciding which activity to do next, the instruction engine honors the learner's request by ruling out activities that are not related to what the learner just chose.

To be considered 'related', the candidate activity comes directly from the selected concept's adaptive path or indirectly from one of its concept links any number of levels away. If the learner chose a particular stage, then the activities or concept links are within that stage or are descendants of concept links within that stage.

In at least some embodiments, preference is given to activities coming directly from the adaptive path of the concept originally selected by the learner. In other words, activities that are related through one or more levels of concept links are less favored.

Regarding immediately available activities, the first step for the instruction engine in choosing which activity to do next is to see if there are any activities or icons that just became available as a result of the preceding activity with a delay range of 0-0 (meaning the min and max delay are both set to "immediately"). These activities are added to the top of the available activities list in the order in which they were encountered.

For activities where the urgency date is in the past, the working pool is filled if possible and the instruction engine proceeds with the activity even if it can't be filled. As provided herein, term "working pool" refers to a set of concepts being learned together, similar to the flash cards approach to memorizing multiplication tables, where the learner works with a small set of flash cards at a time instead of the entire stack. In one embodiment, as soon as an activity is selected to be launched by the instruction engine, if a working pool doesn't exist yet, the instruction engine attempts to create one. If the instruction engine fails to create a working pool, and there are no activities remaining with sufficient working pools that are related to the learner's original choice from the to-do list or progress bar list, and the learner hasn't had a chance to spend much time on the selected option, then the instruction engine asks the learner whether to continue anyway, even though the working pool is incomplete.

The working pool continues until the instruction engine can no longer refill the working pool and no urgent concept remains. The instruction engine discontinues the working pool if the learner has spent enough time with the current activity (e.g., the ideal concepts before activity transition value has been reached). As soon as the working pool has been discontinued, the instruction engine looks for the next available activity.

A working pool includes several concepts with the same activity. In at least some embodiments, concepts are kept in the working pool until the branching conditions (subsequent to the activity) no longer requires repetition of the activity. In other words, if the same activity instance is available, then the concept remains in the working pool. Otherwise, the concept leaves the working pool, which creates a vacancy. This is true even if a different instance of the same activity becomes available immediately for a given concept.

In some embodiments, the working pool is shuffled (randomly re-sequenced) after every concept in the pool is seen (meaning the activity is invoked for that concept). This auto-shuffling behavior only occurs if the activities AutoShuffle property is set to True. Otherwise, shuffling only occurs when the navigation controller is told to shuffle, such as via a shuffle button. (The navigation controller is a special activity component that allows the activity to communicate with the instruction engine.) Right before reshuffling, the instruction engine tries to fill any vacancies in the working pool with additional concepts that are ready for review with the current activity.

The number of concepts that should be in the working pool can be defined for a given activity in an adaptive path. The default working pool size is defined at the activity level but the activity instance in a given adaptive path can override this setting. The instruction engine finds all available concepts that are ready for that activity with the same working pool size. If there are enough to fill out a working pool, it will start the activity. As concepts exit the working pool, the instruction engine continues to refill the working pool as long as more concepts are available for the current activity. In one embodiment, when one activity leads to several other activities, and all branches could be taken immediately, the sequence of the subsequent activities is intentionally randomized by the instruction engine.

At runtime, when a component or an activity fails the instruction engine moves on to the next activity. The error causing the failure is logged and uploaded to the central server. In some cases, it is helpful to let the user know about the error, but in other cases it is better to just move on to the next activity without the user knowing.

While waiting for user input on the current activity, the instruction engine pre-loads anticipated activities in the background for the sake of speed. When an activity gets pre-loaded it's possible that it could make use of concepts that are not as relevant at the moment the activity is given to the learner. As such, in cases where an available activity makes use of one or more related concepts just before the activity is given to the learner, the related concepts for that available activity are compared against the concepts in the working pool. If it is found that more than two-thirds of the related concepts are different from what is found in the working pool then the activity is re-loaded in order to make use of the concepts in the working pool.

In at least some embodiments, backward branching is allowed. This is a useful way to ensure long-term retention. Even after reaching the mastery stage marker, a backward branching condition may provide periodic review for that concept at increasing intervals. Specifically, the variable "PredictedDaysofRetention" can be included in the expression that establishes a delay. This would apply to a given concept, and could be based on the longest period between reviews where the learner has been able to remember a concept.

In some embodiments, the instruction engine automatically keeps a backup of the user data. If user data is lost or corrupted, the instruction engine detects this and automatically restores the user data from the backup. This backup is stored, for example on the local hard drive or on another storage device. In some embodiments, several backups of the user data are kept to minimize the risk of data loss.

As part of designing an activity, the instructional designer designates what the learner should do to complete it. For example, the learner might have to remain on the activity for a certain minimum number of seconds, click certain buttons, or fill certain text boxes. To accomplish this, the instructional designer sets the NextActivityEnabled property of the navigation object to be equal to the values of properties of other components in the activity.

While the learner is doing an activity, global navigation buttons allow the learner to override branching. Accordingly, the learner can skip to the next activity at any time or go back to a previous activity, jump to the concept explanation activity (or any activity), return to the main menu to work on something else, or exit the program. In some activities, the learner can click on a next concept button to advance to the next concept in the working pool.

In at least some embodiments, the learner can defer items in the to-do list. Deferred items appear at the bottom of the to-do list. The learner can click on deferred items and do them any time, even though they are marked deferred. In one embodiment, once the deferment date is passed, the item is no longer considered deferred. Instead, it shows up as normal in the to-do list.

In at least some embodiments, optional activities are provided. The learner is given the choice of whether to do optional activities. If an optional branch is encountered while the learner is progressing along an adaptive path, the instruction engine asks the learner whether he/she would like to do the activity or not.

In accordance with embodiments of the present invention, the designer may change the instruction even after it has been distributed to learners for use. The instruction engine identifies whether this has occurred. Thus, for example, when a designer deletes an activity instance or concept any related available activities are deleted as well. When a concept gets moved in the concept hierarchy, this movement has no immediate effect on the instruction engine. However, the next time the learner encounters that concept will be different from the last time it was encountered by the user. If an activity instance or concept link is added to an adaptive path then the learner would simply encounter that activity instance as he/she normally would, assuming the activity instance is not added to a location the learner has already passed. If the criteria for an activity set is changed then the new criteria is used the next time the activity set is encountered.

In at least some embodiments of the present invention, the instruction engine interacts with a positive feedback generator to produce positive feedback after activities, according to certain criteria, as will be further discussed below.

Thus, as provided above, the instruction engine keeps track of the learner's progress in learning concepts and initiates the instructional activities that are needed to further the learning progress. In some embodiments, when an activity becomes available to the learner according to the branching of an adaptive path, the activity is added to the list of all available activities for that learner. In some embodiments, a property of the activity may be set to someone other than the learner (e.g., a tutor, an instructor, etc.). Accordingly, activities or the results thereof are made available to another individual or system, such as a tutor, instructor, manager, proctor, etc.

B. Learner Guidance System

Figure 26:
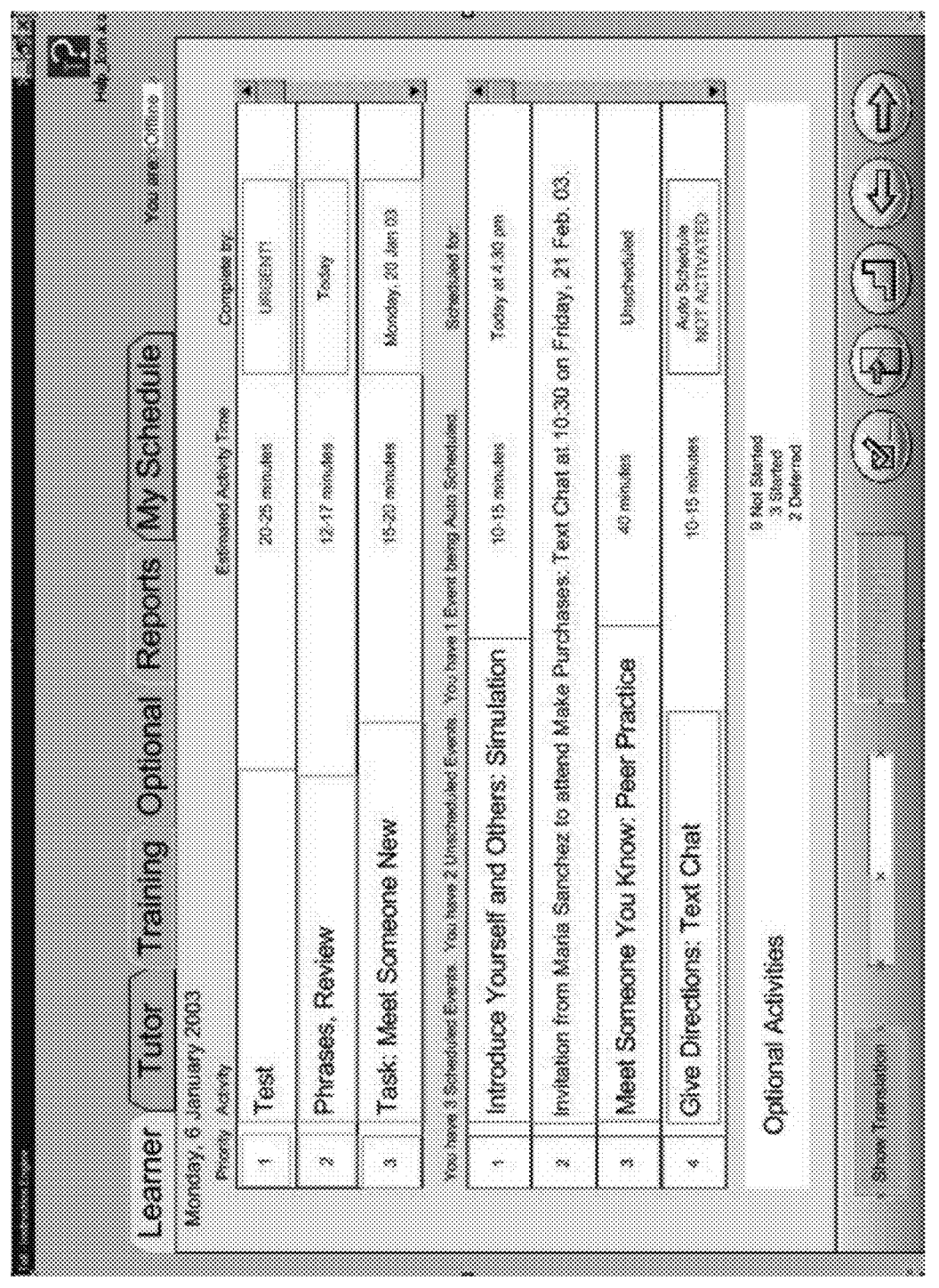
Figure 27:
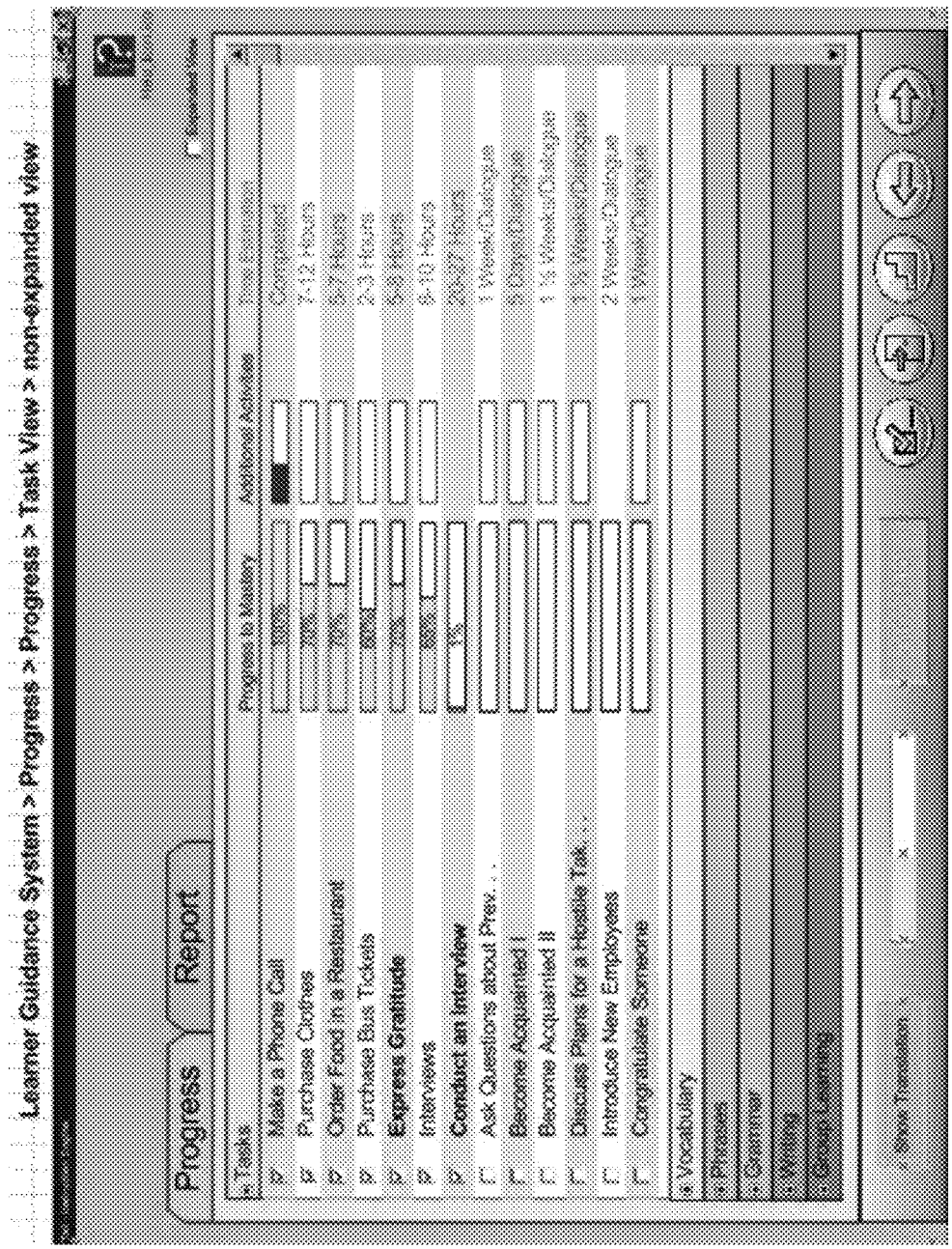

A learner guidance system helps the learner and tutor to develop a personal learning plan for the learner, reports the learners' progress, guides the learner in what to focus on next, lets learners schedule task practices with tutors and peers, allows learners to set personal preferences, and provides links to training regarding how to use the system and learn effectively. The learner also receives an automatically generated report depicting his/her own level of implementation fidelity to a variety of features of the program. The learner may receive suggestions or links to on-line training on how to improve. At least in some embodiments of the present invention, the learner guidance system may be built via activity builder and adaptive path builder. With reference to FIGS. 26-27, a representative user interface in association with a learner guidance system is illustrated.

In at least some embodiments, a guidance system is divided into two areas: (i) a learner guidance system ("LGS") and (ii) a tutor guidance system ("TGS"). Both guidance systems typically have a to-do list to facilitate easy access to high priority items. The following describes the representative appearance and functionality of both to-do lists.

The LGS to-do list is divided into sections or panes representing the three main types of activities a learner has access to: individual, collaborative, and optional. Relating to the individual, the required pane includes the following types of activities: test, review, new, and optional activities that have been started. Everything a learner needs to be tested on is grouped by concept type and displayed on the to-do list under the heading "Test." The concept type with the greatest average urgency date is tested first, and so on. All material that needs to be reviewed is listed on the to-do list separately by concept type (e.g., phrases review, vocabulary review). The concept type with the highest average urgency date has the highest priority, and so on.

New material may be displayed by task name or function. (e.g., Meet Someone New [task], Aphabet [function]) In cases where an item is neither a task nor function, the item's concept type followed by either its concept name or another name is displayed. (e.g., Grammar: Modals, Pronunciation: Short Vowels) Material that a learner selects from an optional pane will also be displayed with new material. New material that is most urgent has highest priority, and so forth. Items listed in the first pane (individual) also have a designated completion date. This date is found under the "Complete by:" column heading.

The collaborative pane includes all collaborative events, such as peer practices and simulations, which are scheduled or need to be scheduled. This pane is prioritized according to the following hierarchy: (i) items scheduled for today, (ii) unscheduled items, (iii) auto scheduled items, and (iv) items scheduled for future dates. All events are displayed according to their task name, such as "Introduce Yourself and Others: Simulation." A header makes the user aware of the amount of collaborative activities that fall into each of the categories listed above. The following header is displayed above the collaborative pane: "You have x scheduled events." "You have y unscheduled events." "You have z events being auto scheduled." Items in the collaborative pane are also organized by when the event takes place.

A link to optional activities is displayed in the third pane of the to-do list. The link has a status bar which displays the number of activities a learner has started, deferred, and not started. When the link is selected, the learner is taken to a separate list of optional activities. In at least some embodiments, the optional activities are prioritized according to the following hierarchy: (i) not started, (ii) items that are most recently available are displayed first (today before future), and (iii) deferred, started.

C. Learning Optimizer

In accordance with at least some of the embodiments of the present invention, a learning optimizer tool is associated with implementation module 84 and/or analysis module 86. The learning optimizer will be discussed below in association with analysis module 86.

D. Collaborative Activity Manager

A collaborative activity manager tool manages the initiation of collaborative activities by sending invitations to candidates who meet certain criteria. In at least some embodiments, there are three main methods used by the collaborative activity manager to arrange collaborative activities among multiple users. The instructional designer assigns one of these methods to each collaborative activity he/she creates. The first method is used when the instructional designer wants two or more learners to join in an activity once they have all reached that activity in their adaptive paths. In this case, the collaborative activity manager keeps a list of all the learners that have reached that activity, in the order they are received. Once the collaborative activity manager finds a sufficient number of available learners to do the activity, who meet the criteria given by the instructional designer, the collaborative activity manager invites each of them to join. The learners receive instant pop-up messages inviting them to join. If any decline, then the manager continues to the next available person who is also waiting for this activity. This continues until all the invitations are accepted, at which point the instruction engine starts the collaborative activity and then records the completion of the activity. The collaborative activity manager then removes the participants from the queue for that activity.

The second method of arranging collaborative activities is used in cases where a learner reaches a collaborative activity that can be done with other learners or tutors, regardless of whether the others have reached the same activity. In this case, the collaborative activity manager makes an immediate search for available participants, who meet the criteria given by the instructional designer for each role in the activity. The collaborative activity manager compiles a list of resulting candidates, ordered in descending order of preference, according to additional sorting criteria given by the instructional designer. Note that both the filtering criteria and sorting criteria are expressions that may refer to any combination of properties of the potential users, such as level of achievement, experience as a tutor, age, native language, background, sponsoring institution, learning team, and so on. These can also be weighted in an arithmetic expression by scaling any of the factors with a numeric constant. All of these are set by the instructional designer when creating the collaborative activity. For collaborative activities employing this second method, the instructional designer may also specify whether the initiating learner should have the option of selecting the other participants from a list of qualified candidates. In this case, the collaborative activity manager presents the initiating learner with the names of the top candidates (the instructional designer prescribes the maximum number of names to display). Otherwise, the top candidates are automatically chosen by the collaborative activity manager. In either case, invitations are sent to the participants. If any decline, then the next-most preferred candidates are invited, and this process continues until the activity can start.

The third method of arranging a collaborative activity allows the participants to schedule a time for the activity in advance. In some cases, this may be preferred over the first and second methods, if the potential participants are not often online using the software at the same time. In this case, the collaborative activity manager provides the initiating participant with a view of the schedules of other potential participants, limited by filtering criteria set by the instructional designer. The initiating participant may then send invitation(s) to join in the activity at a certain date and time. Upon receiving the invitation, the invitees may respond by accepting, declining, or proposing a new date and time. The invitee may optionally type a message to be sent along with the reply. The initiating participant receives the replies and can reply in similar fashion. This process continues until a date and time for the activity has been set. Reminders are sent automatically by the collaborative activity manager before the engagement. The collaborative activity manager sends a final confirmation just before the activity is to begin. Participants may accept, decline, or defer for a few minutes. If any decline, the others are informed, so that the activity can be rescheduled. If any defer, all are informed of the need to wait, and a count-down timer is displayed. Otherwise, the instruction engine starts the activity. As with other activities, all the user interaction can be tracked for collaborative activities.

E. User/Group Manager

Figure 28:
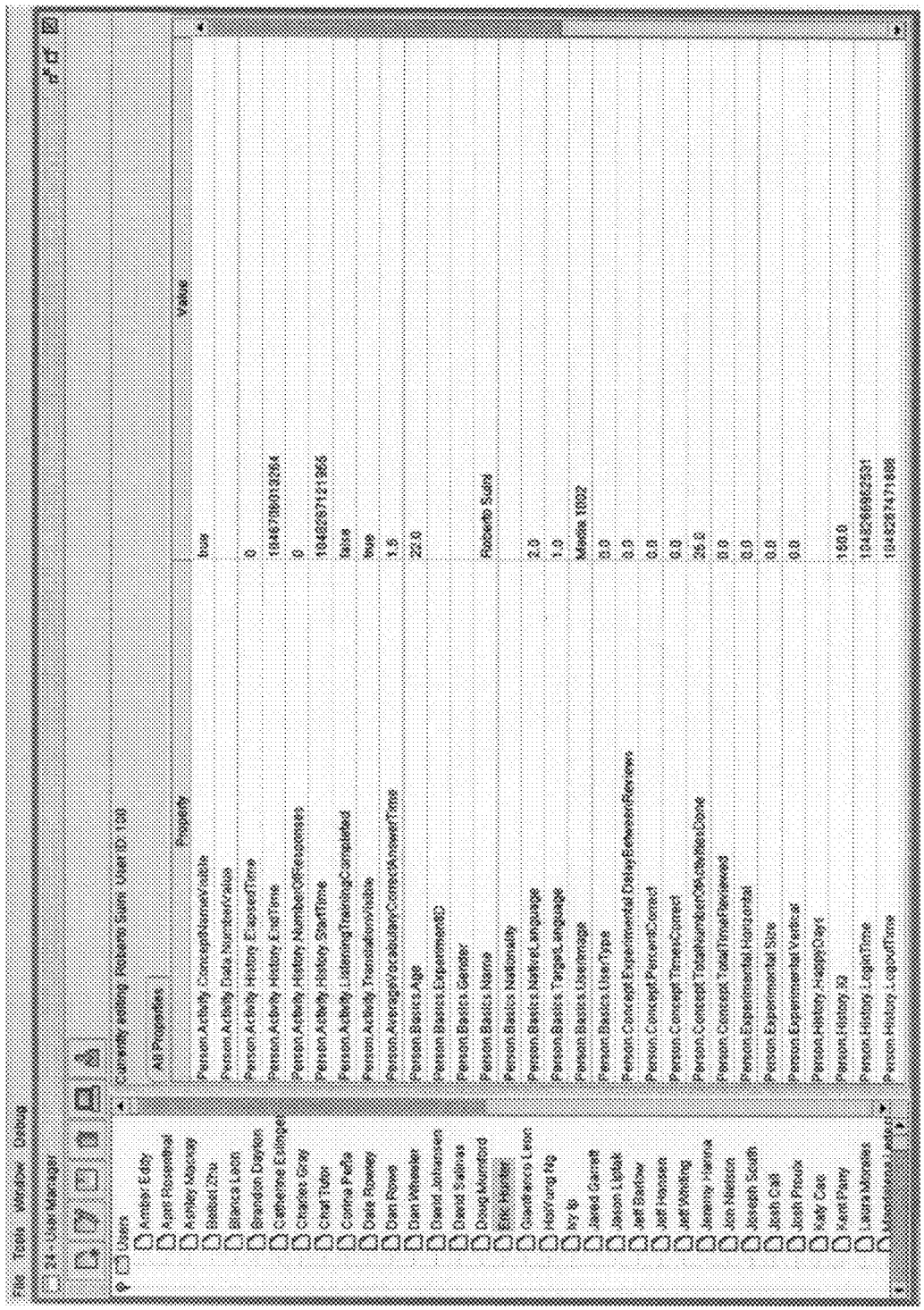
FIG. 28 illustrates a representative user interface in association with a user manager tool.

In at least some embodiment, the system is used by many different types of users. Accordingly, a representative group manager is used to place individual users into specialized groups in order to manage user accounts more easily and efficiently. A user/group manager tool allows users, tutors, and administrators manage team structure or other groups within an organization. Specifically, the group manager tool is used to create, edit and delete user groups. It is also used to create new users, define user information and then place users within an existing group. Group and individual user information, including pictures and all specific properties of the group or individual, can be viewed using the group manager. It is also used to edit user information, as well as disable, enable and delete users. With reference to FIG. 28, a representative user interface corresponding to a user manager tool is illustrated.

Figure 29:
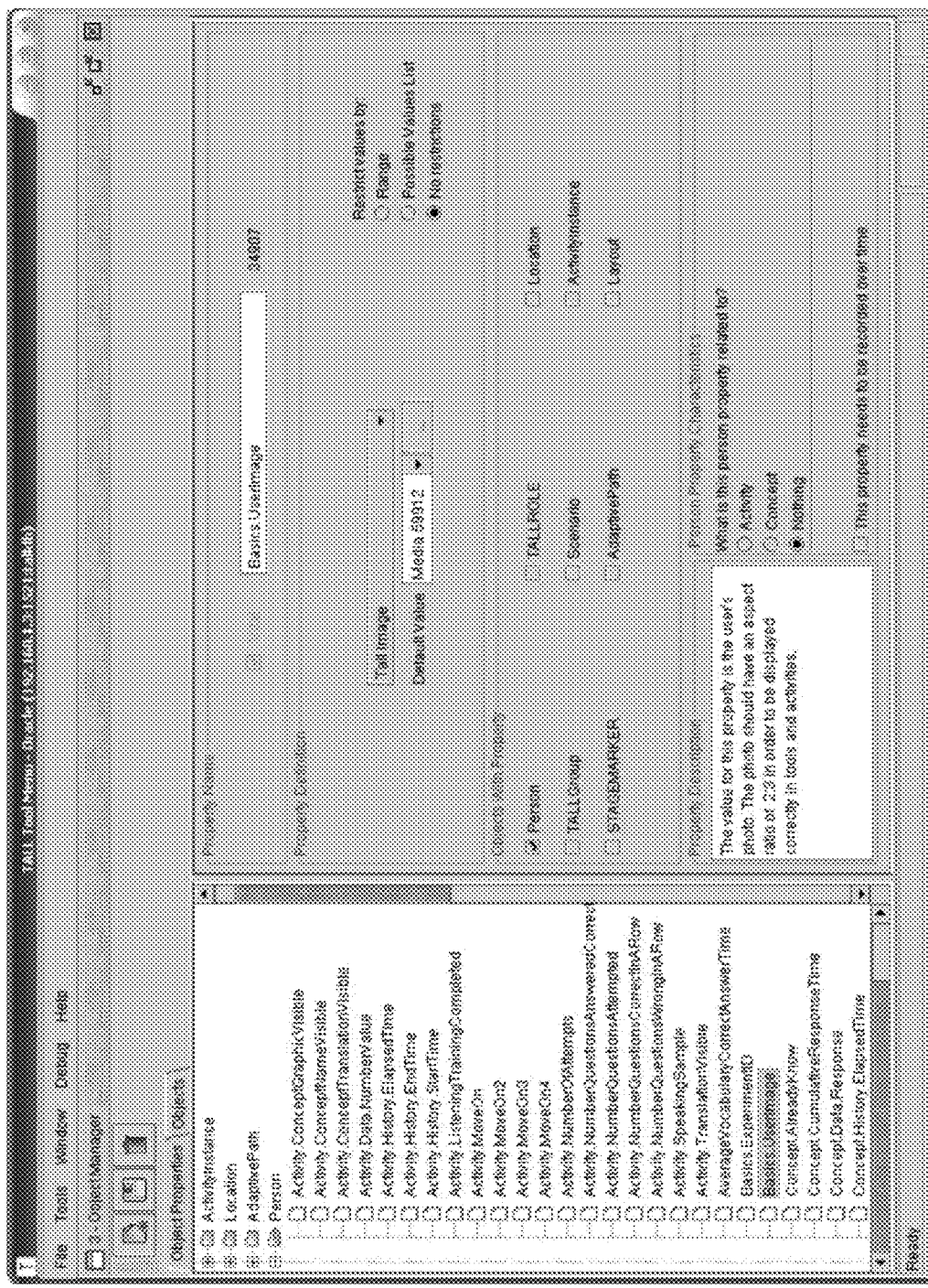
FIGS. 29-30 illustrate a representative user interface in association with an object manager tool.
Figure 30:
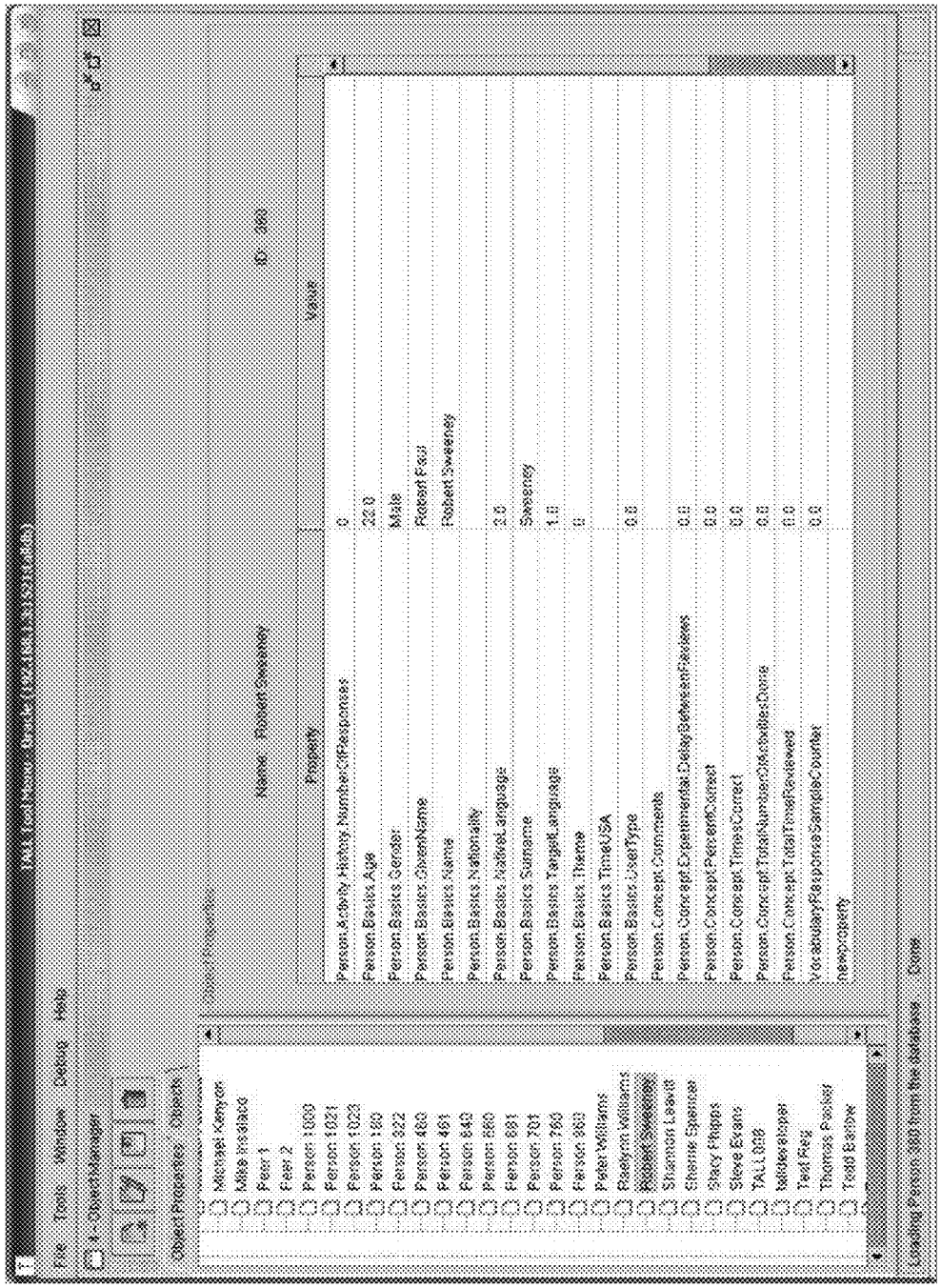
Figure 31:
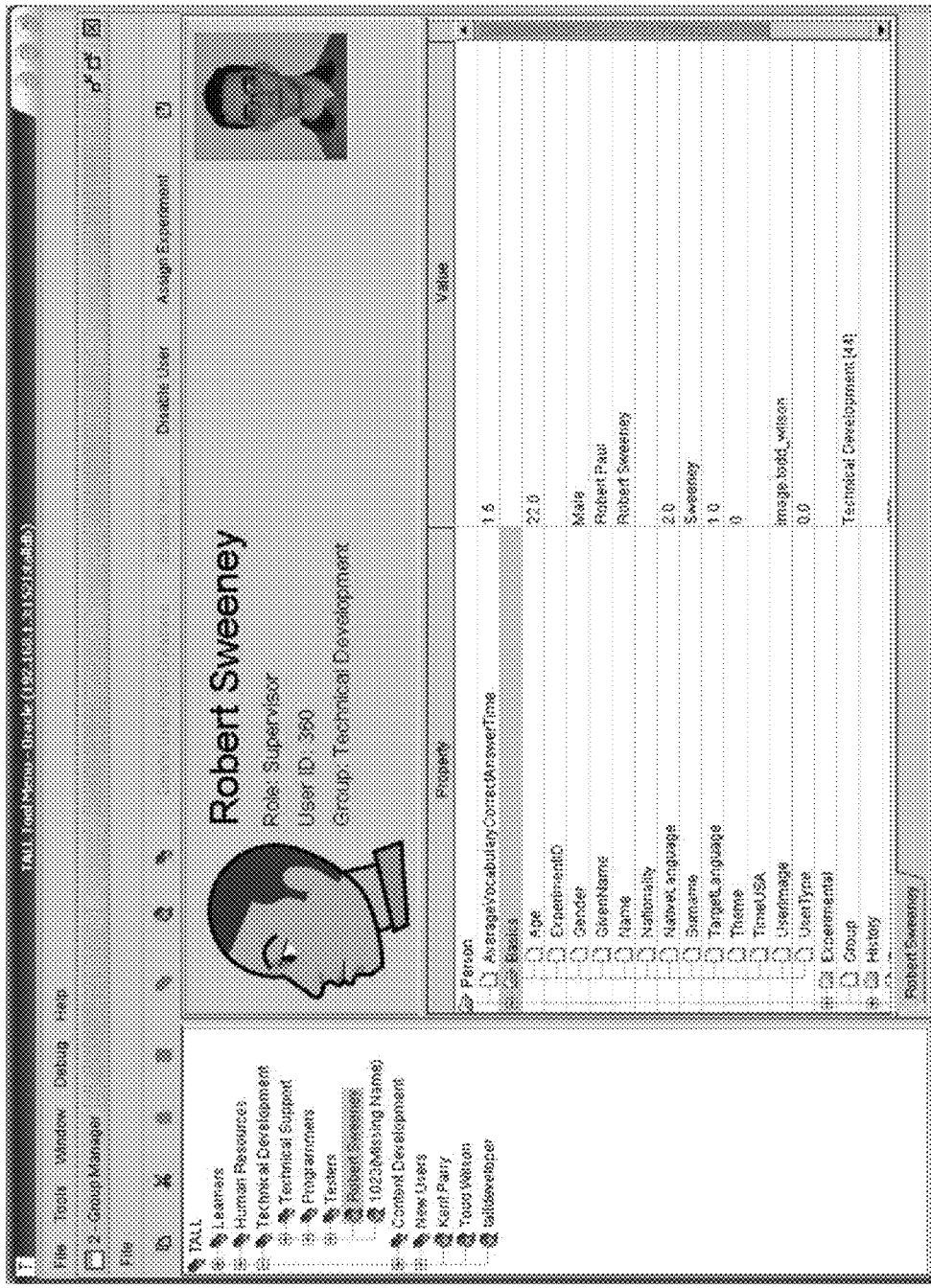
FIG. 31 illustrates a representative user interface in association with a group manager tool.

As provided above, embodiments of the present invention embrace other types of managers. For example, FIGS. 29-30 illustrate a user interface corresponding to an object manager tool. FIG. 31 illustrates a representative user interface corresponding to a group manager.

F. Positive Feedback Generator

As learners are presented with and respond to educational content, a positive feedback generator tool automatically provides encouraging feedback to learners according to periodic reinforcement algorithms optimized for maximum motivation. The algorithms, in the simplest sense, comprise tallying correct answers for a particular amount of time and then providing positive feedback when a particular number of correct answers are reached. However, the algorithms and reward systems can be quite complex. For example, some representative circumstances of "payoffs" include: a learner does x things of type a correctly (or increases their average number correct) a particular number of times in a row, in a session, or in a time period; a learner does x, y, and z things correctly t times; a learner masters a particular body of material comprising a significant milestone in learning; etc.

Another area of variation is the ability to pull from pools of reward graduated according to desirability. This allows for meta-algorithms that could say, for example, if a learner meets the requirements for algorithm a once, pull the reward from pool 1, if the learner meets the requirements for algorithm a again within t time (or t times in a row, or decreases their average time of fulfilling requirements by t time), then pull the reward from pool 2, etc.

Of course, the rewards themselves can vary widely and include any variation of text, graphic, sound, animation, movie, game, song, etc. divided into the various pools based on the degree of perceived reward for the learners.

G. Remote Document Feedback

Figure 32:
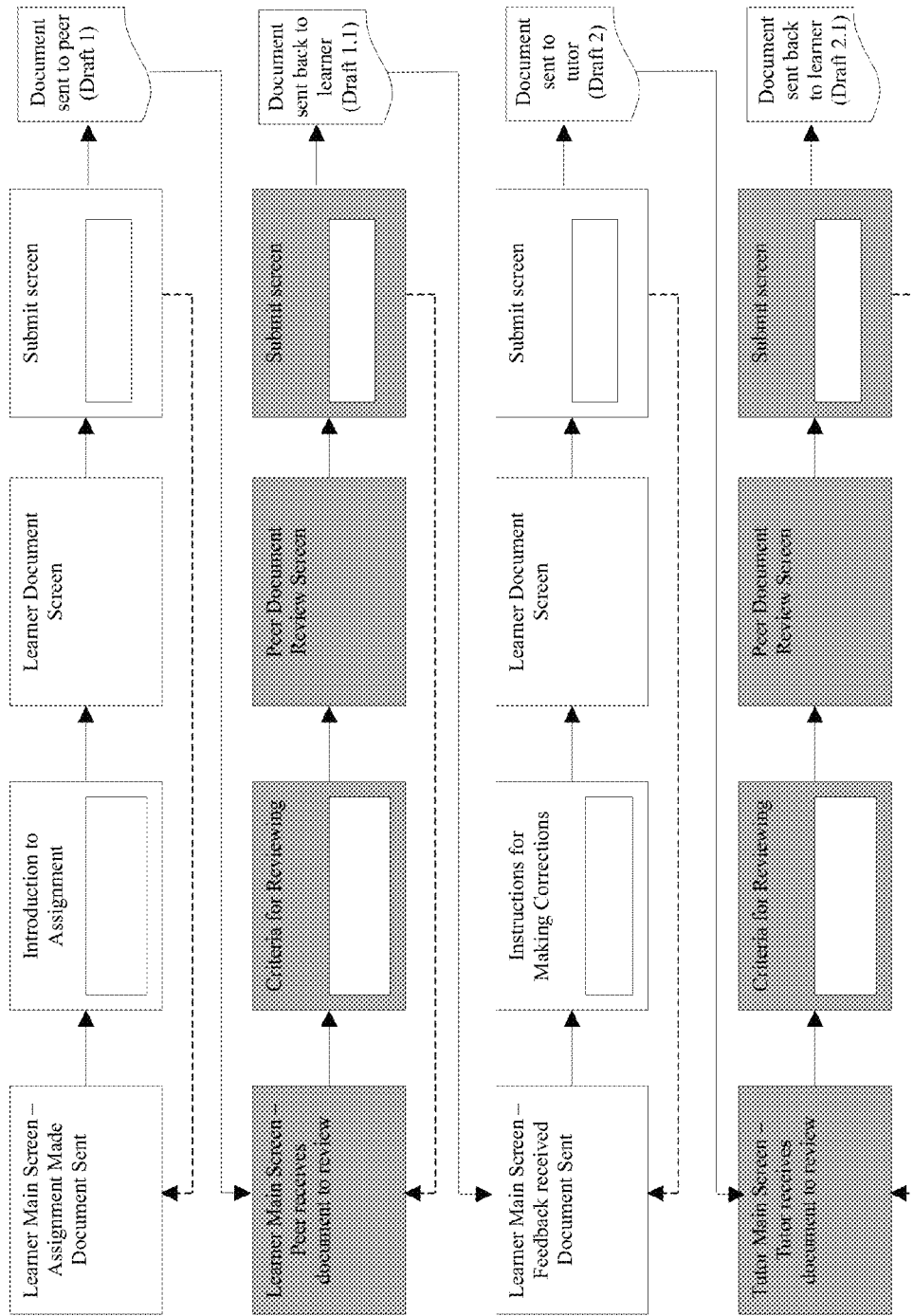
FIG. 32 illustrates a block diagram in association with a storyboard of remote document feedback program.

The TALL software includes a set of components which can be combined to create a powerful document-creation, editing, and feedback system. This system starts with a basic word processor (i.e., rich-text formatting) with spell-check capabilities. It allows learners to complete writing assignments and then send them to peers and tutors for feedback in a systematic way. Reference is now made to FIG. 32, which provides a storyboard of remote document feedback program as a representative example. As the author writes and the others review, criteria for both the author and reviewers are made visible to encourage implementation fidelity. Receiving feedback is made possible by an email-like system that produces a list of peers and tutors that are qualified to provide feedback for a particular writing assignment and level. Once the draft is sent, peers or tutors are able to use a commenting functionality to make suggestions for revisions. Comments are organized into categories to make the feedback easier for the learner to understand. The document can then be returned to the author or sent on to a more qualified peer or tutor. When the author receives feedback, the document system dynamically creates and names new drafts. This system of drafts is meant to help the author use feedback to make improvements to the document. Once the author makes revisions, the document is sent back to peers and tutor for further feedback. They can comment on subsequent drafts and help the author continue refining the writing until it meets necessary standards.

H. Rights Management System

Figure 33:
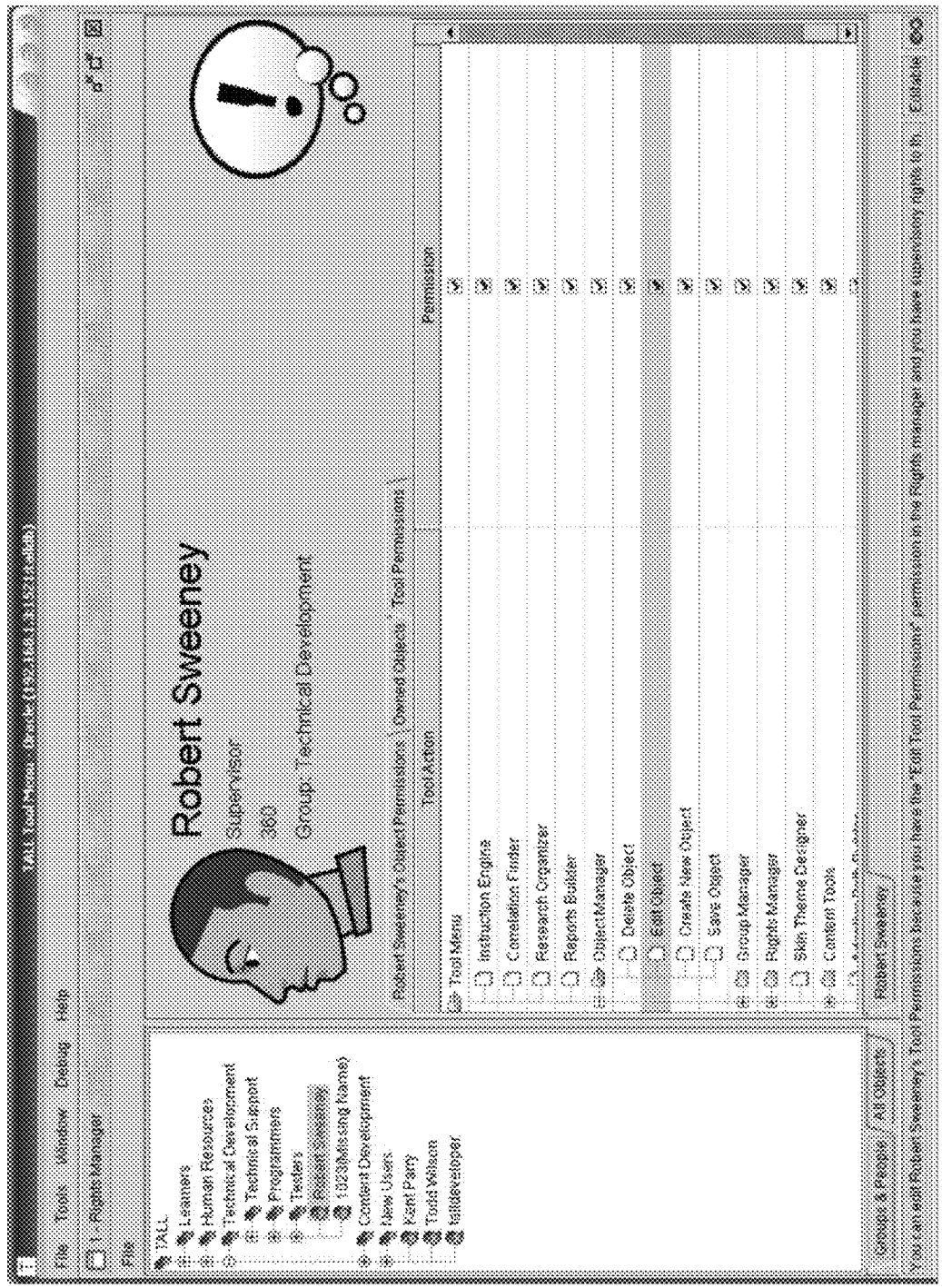
FIG. 33 illustrates a representative user interface in association with a rights manager tool.

A rights management system tool manages the availability of tools and features in tools to specific users. FIG. 33 illustrates a representative user interface that corresponds to a rights manager tool.

I. Reports Builder

A reports builder tool enables the instructional designer to design reports to be included in the reporting system as well as in the course. The reports builder tool defines reports, questionnaires, tests, and other items about which data is gathered in the database and reported in the reporting system. The data is collected from several different sources. Such sources include via software application(s), observation, another tool of the system, questionnaires, examinations, etc.

Figure 34:
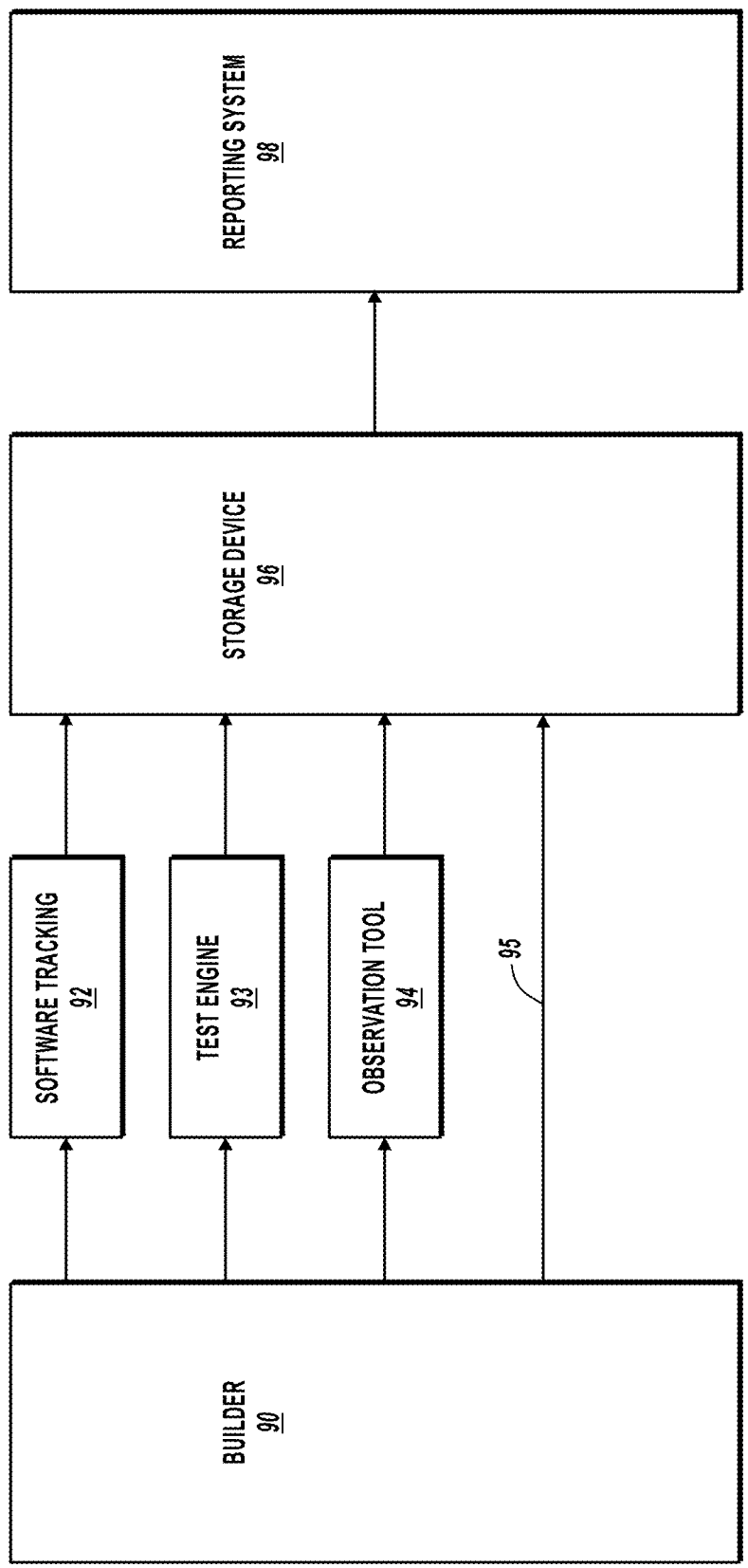
FIG. 34 illustrates a block diagram and provides a representative association between a builder and a reporting system.

With reference now to FIG. 34, a block diagram is illustrated that provides a representative association between a builder and a reporting system. In FIG. 34, information is provided from builder 90 in a variety of manners. For example, the information may pass through a software tracking procedure 92, a test engine 93, an observation tool 94, or be sent directly (as represented by arrow 95) to a storage device 96. The information preserved in the storage device 96 is accessible by a reporting system 98, which selectively manipulates or otherwise processes the information and provides reports.

In one embodiment, the main screen of the report builder is divided into two sections: the "outline" on the left-hand side of the screen, and "edit" on the right-hand side of the screen. The outline screen is organized into two major categories: (i) critical features and (ii) outcomes. Within each of these major categories lie two sub-categories: (a) components and (b) questions/items. Creating components is optional for both features and outcomes, however users cannot mix questions and components on the same level.

The following options are available at all levels (e.g., outcome, feature, component, and question): (i) choosing a complete name, (ii) choosing a short name, (iii) defining a frequency, (iv) defining a group, and (v) choosing whether to enable or disable a particular attribute. If the user changes the frequency of an item, all subsequent items underneath that item will change accordingly (unless they are directly assigned an individual frequency). For software tracking only, the default may be daily and the options are daily, weekly, monthly, and annually. All other levels are user-defined based on the "frequency sentence." Users have the option to (1) choose a frequency that is already created from a drop down list box or (2) define a new frequency.

The default group(s) is based on the group of the direct parent item. If the user changes the group(s) for an item, all subsequent items underneath that item will change accordingly (unless they are directly assigned an individual group(s)). Users have the option to (1) choose a group(s) from a drop down list box or (2) define a new group(s).

The following options are available at the question level: (i) defining the default chart type, (ii) indicating the units, range, and axis labels, (iii) establishing the minimum and ideal standards, (iv) choosing a start date, and (v) establishing accessibility. The default chart type can be one of various chart formats, such as pie chart, bar chart, line graph, table, etc. In one embodiment, all items under this question are set to this chart type by default. The units may be hours, minutes, number of concepts, and the like. The range controls the X and Y bounds of the chart. The axis labels indicate what is being reported. Typically, the Y axis label indicates the measurement, while the X axis label indicates the group and/or time period involved. The minimum and ideal standards are displayed on the chart as colored lines or regions, so that performance data can be easily compared against standards. The start date indicates when the questions will start to be sent to the learners, tutors, or others. The accessibility defines who should receive the questions, based on criteria.

The following options are available at the item level: (i) choosing a name (optional) and (ii) choosing a source of data gathering—tests/questionnaires, an observation tool, using an automatic software tracking of user data, and other sources of data.

Figure 35:
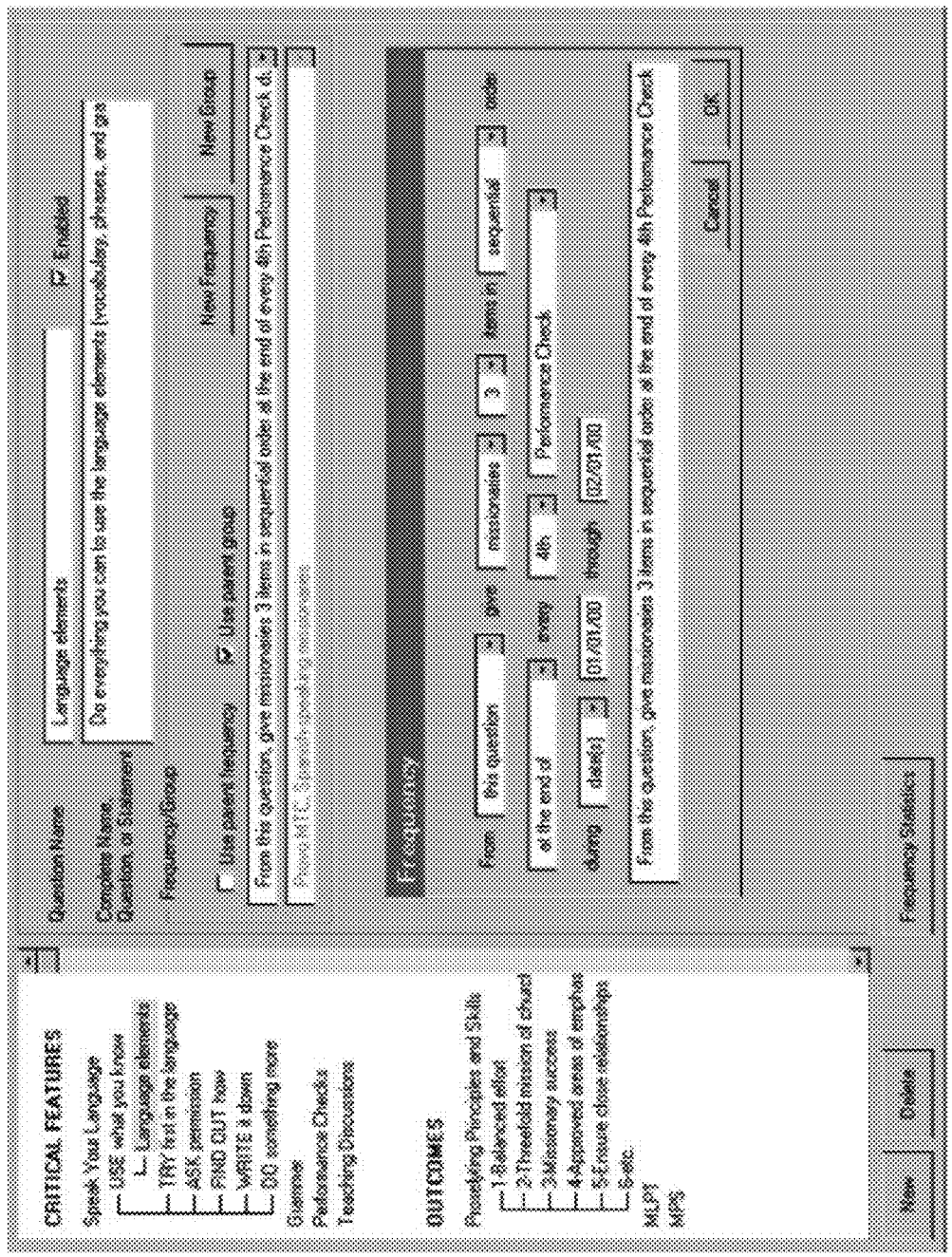
FIG. 35 illustrates a representative user interface having an edit screen associated with a reports builder tool.
Figure 36:
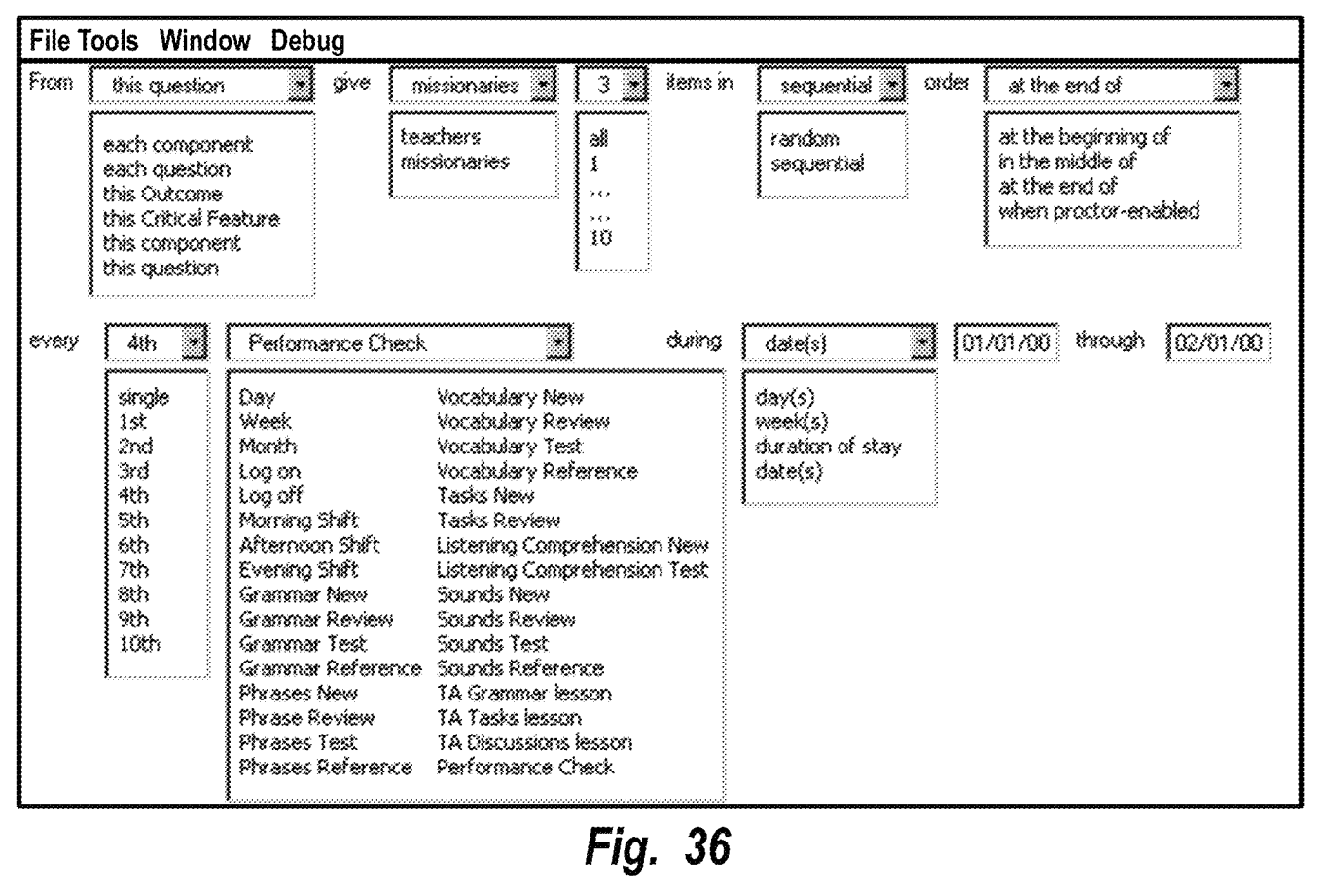
Figure 37:
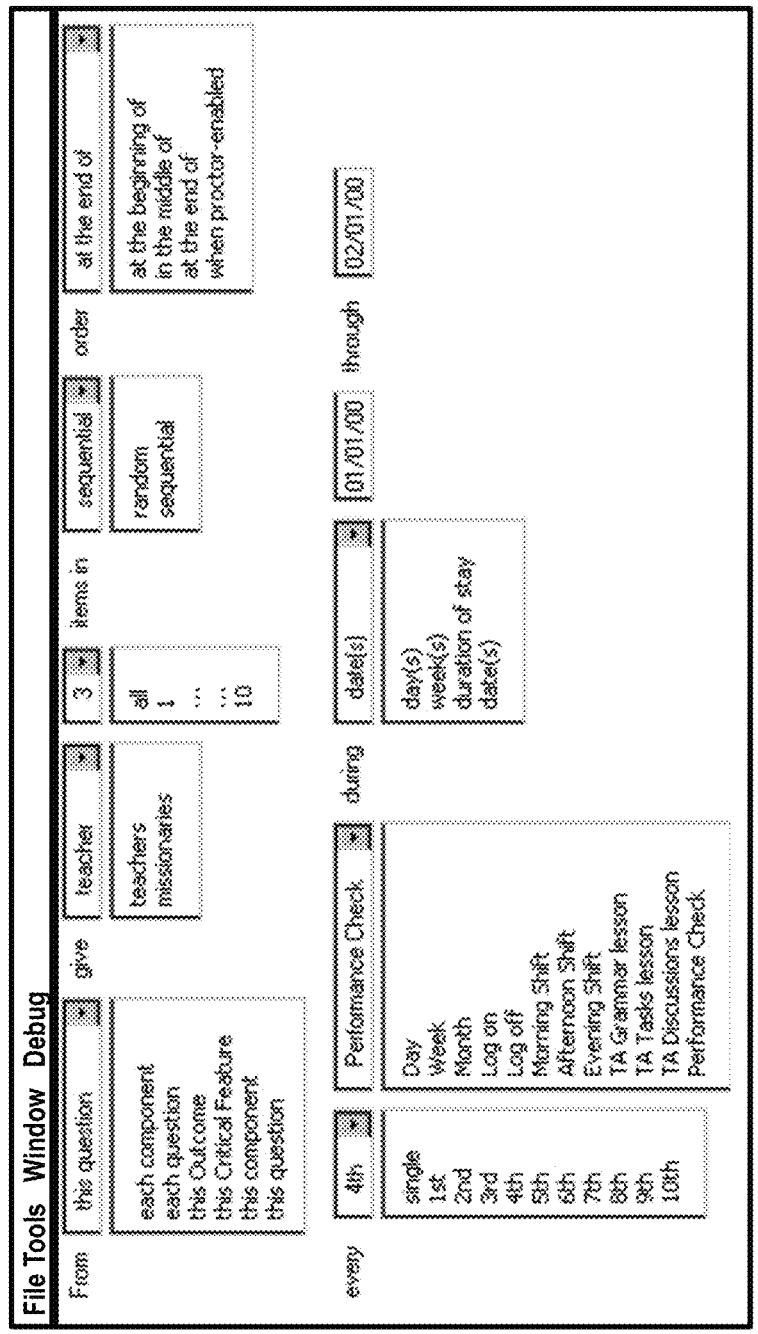
FIG. 37 illustrates another representative user interface in association with a frequency screen of a report builder tool.
Figure 38:
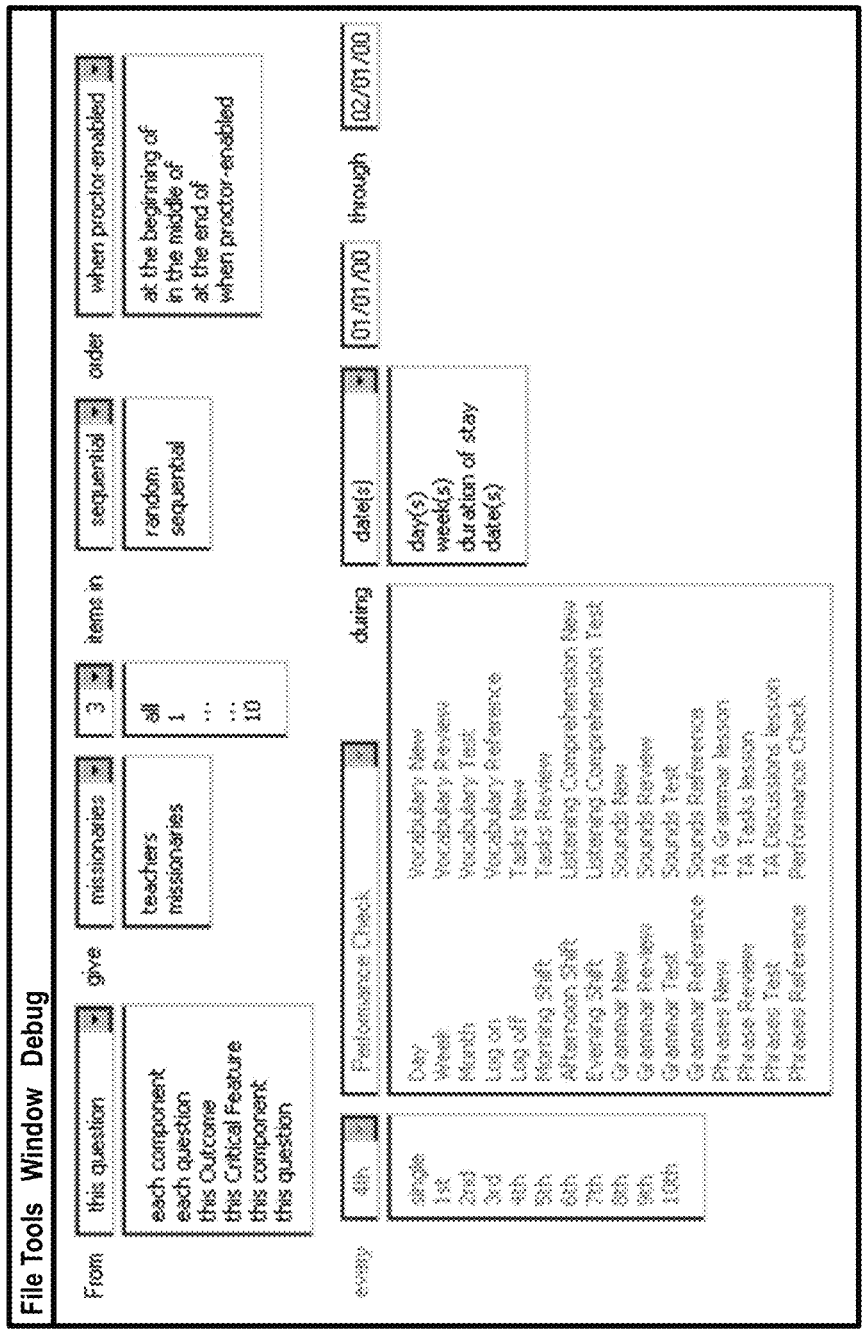
FIG. 38 illustrates another representative user interface in association with a frequency screen of a reports builder tool.
Figure 39:
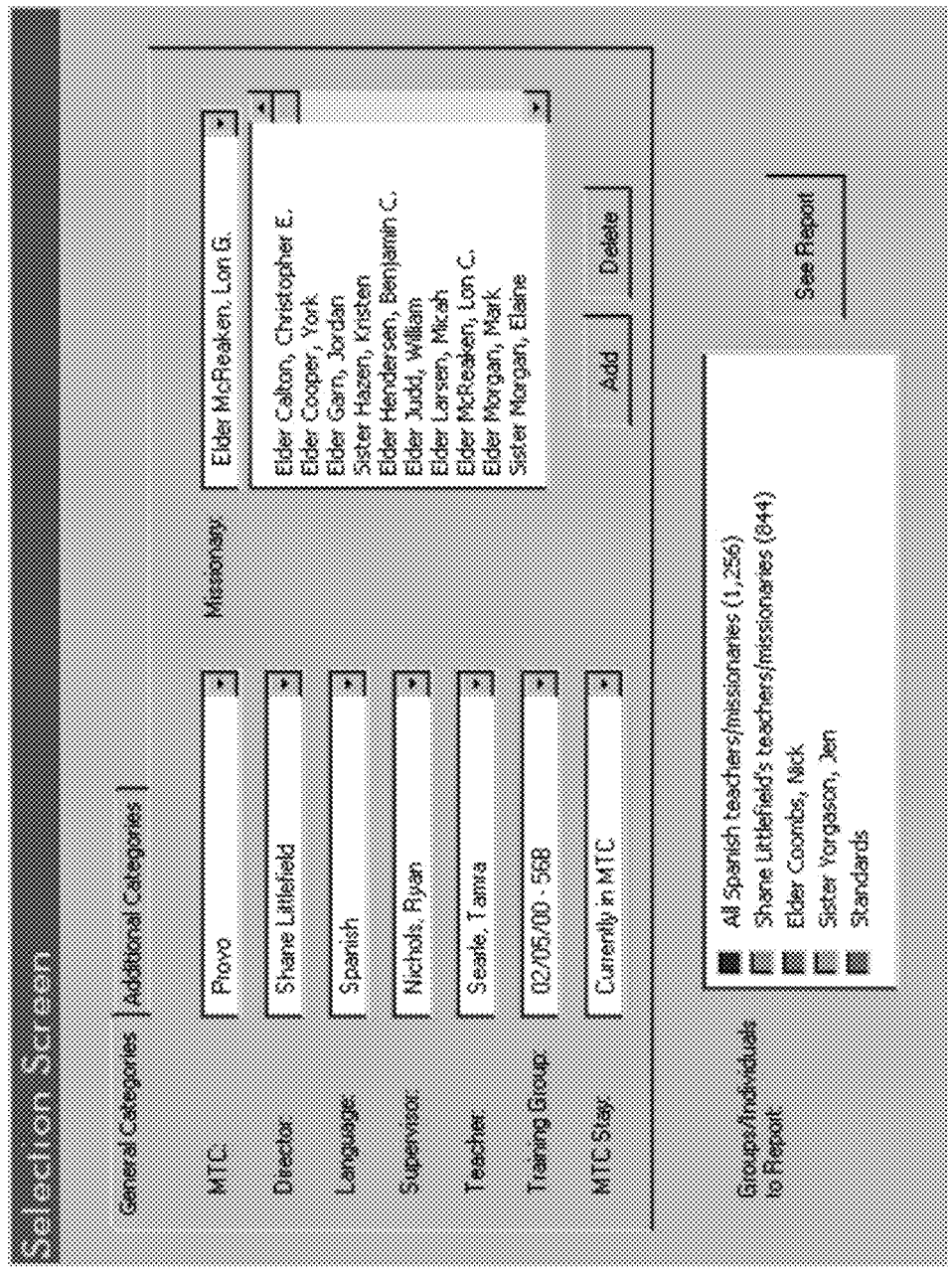
FIG. 39 illustrates a representative user interface relating to a group screen in association with a reports builder tool.
Figure 40:
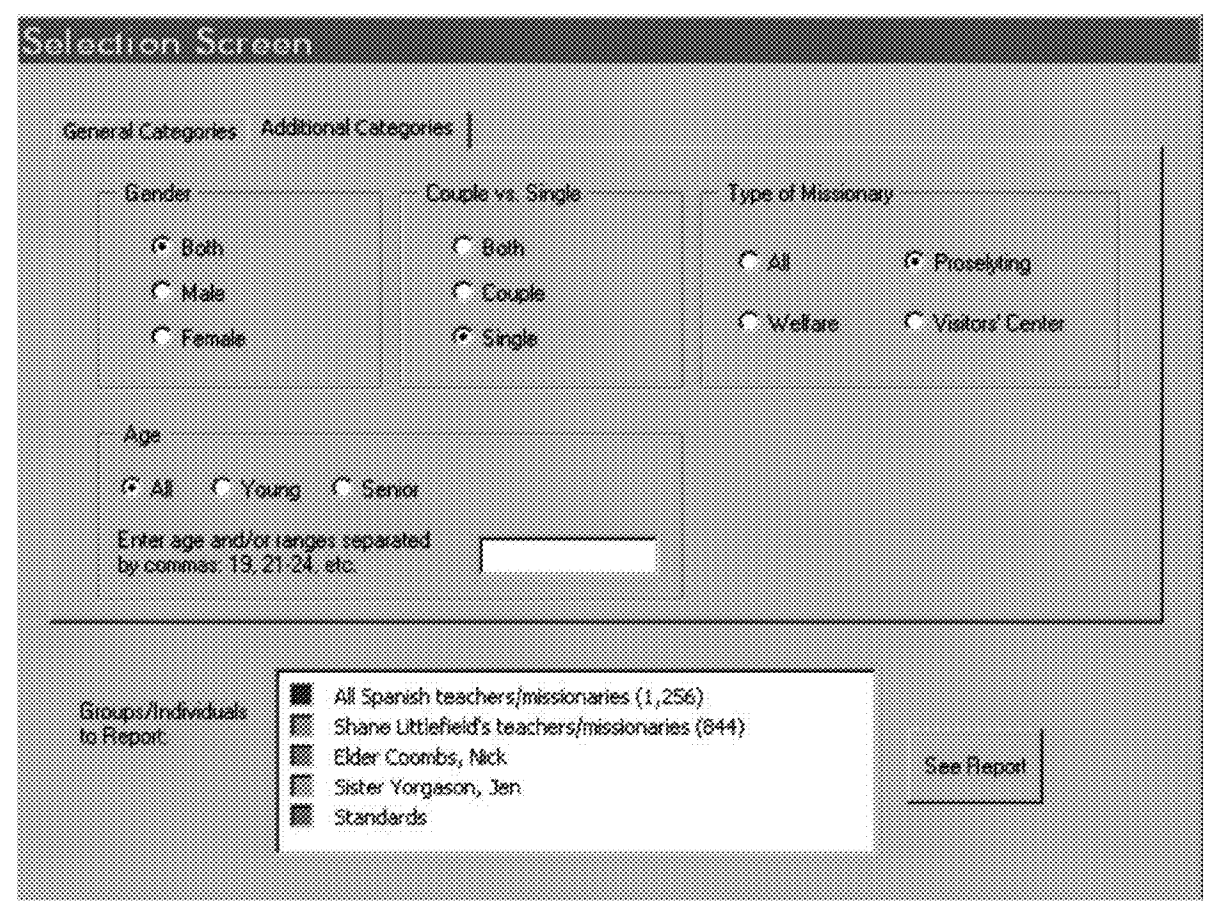
Figure 41:
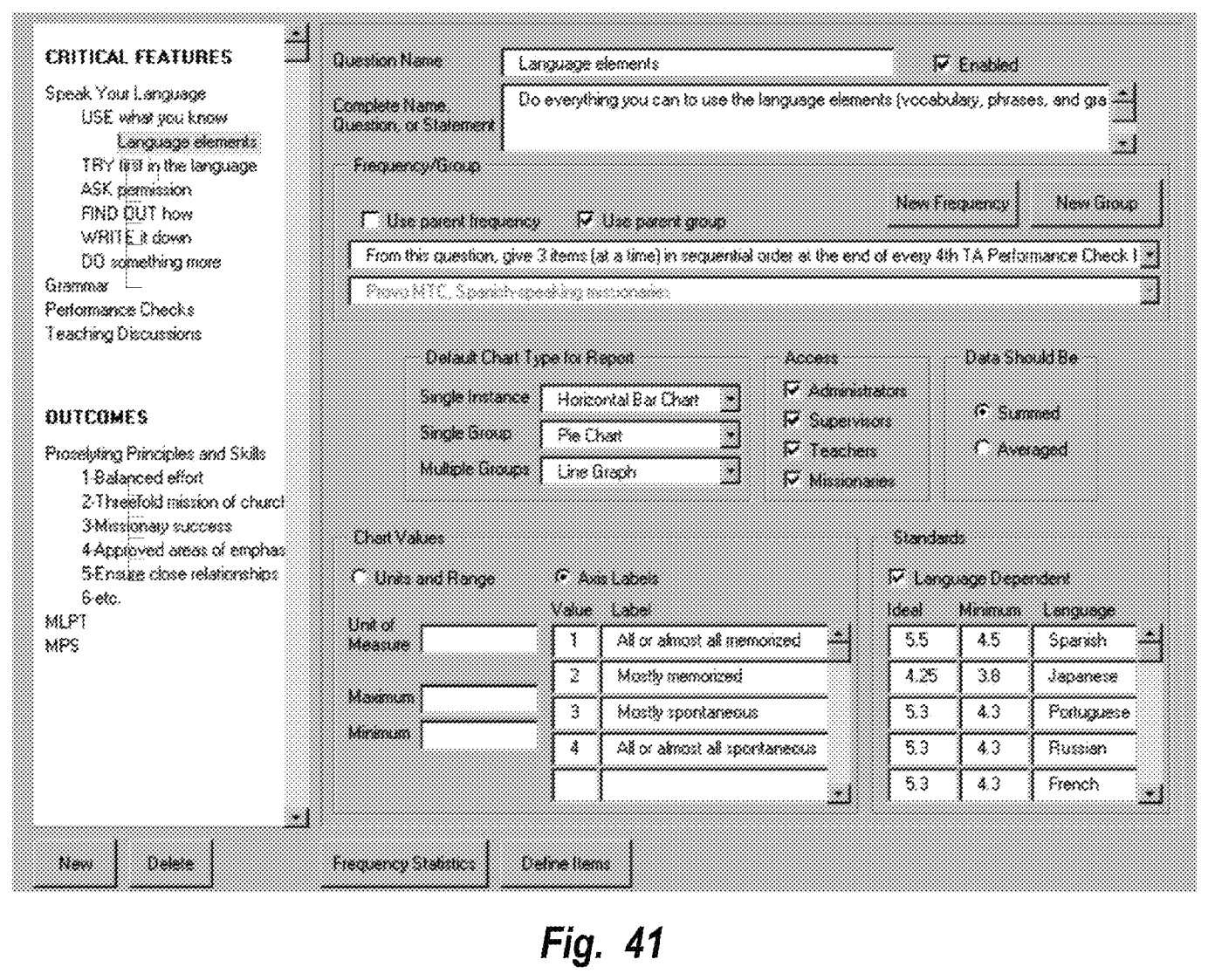
Figure 42:
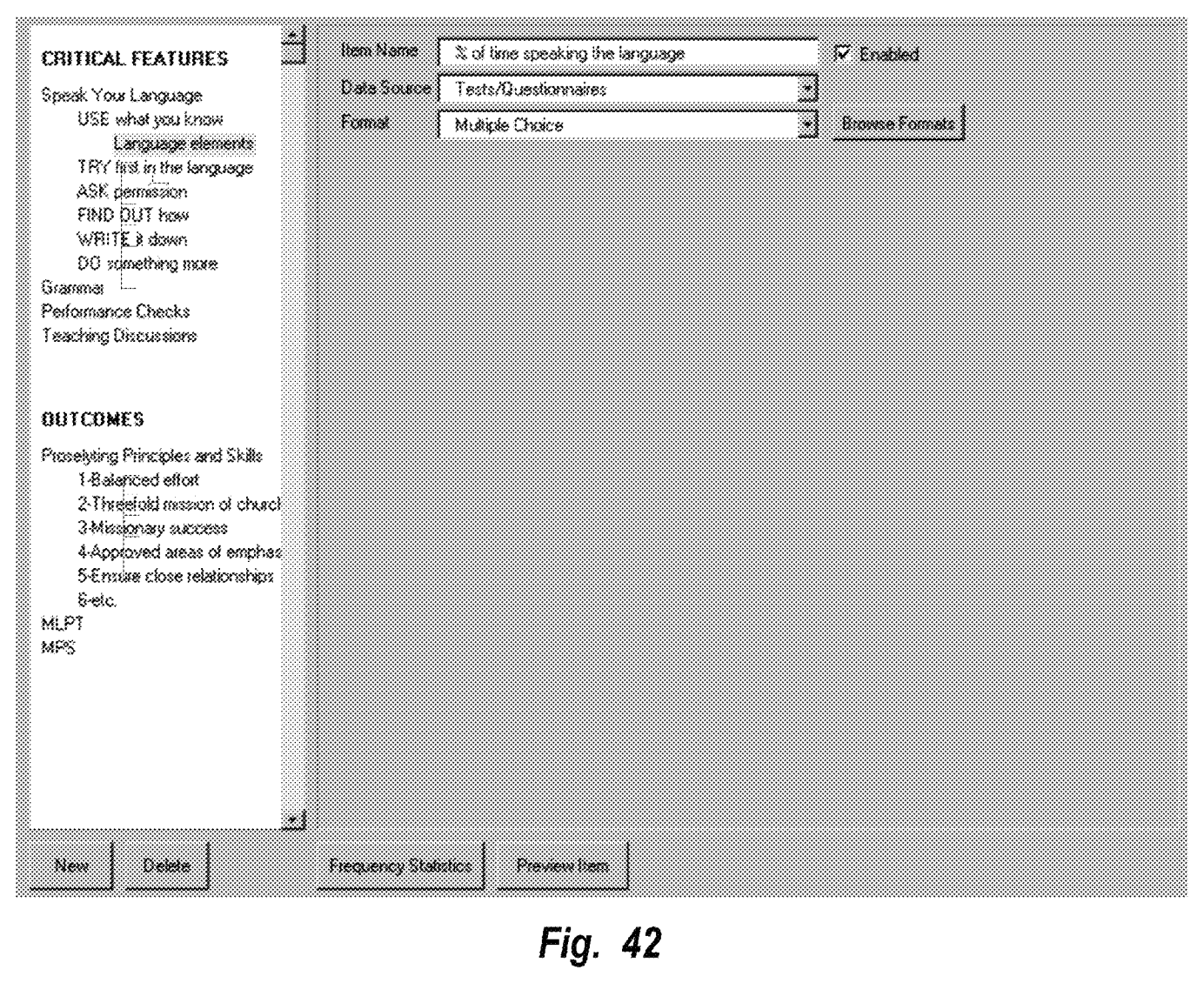
Figure 43:
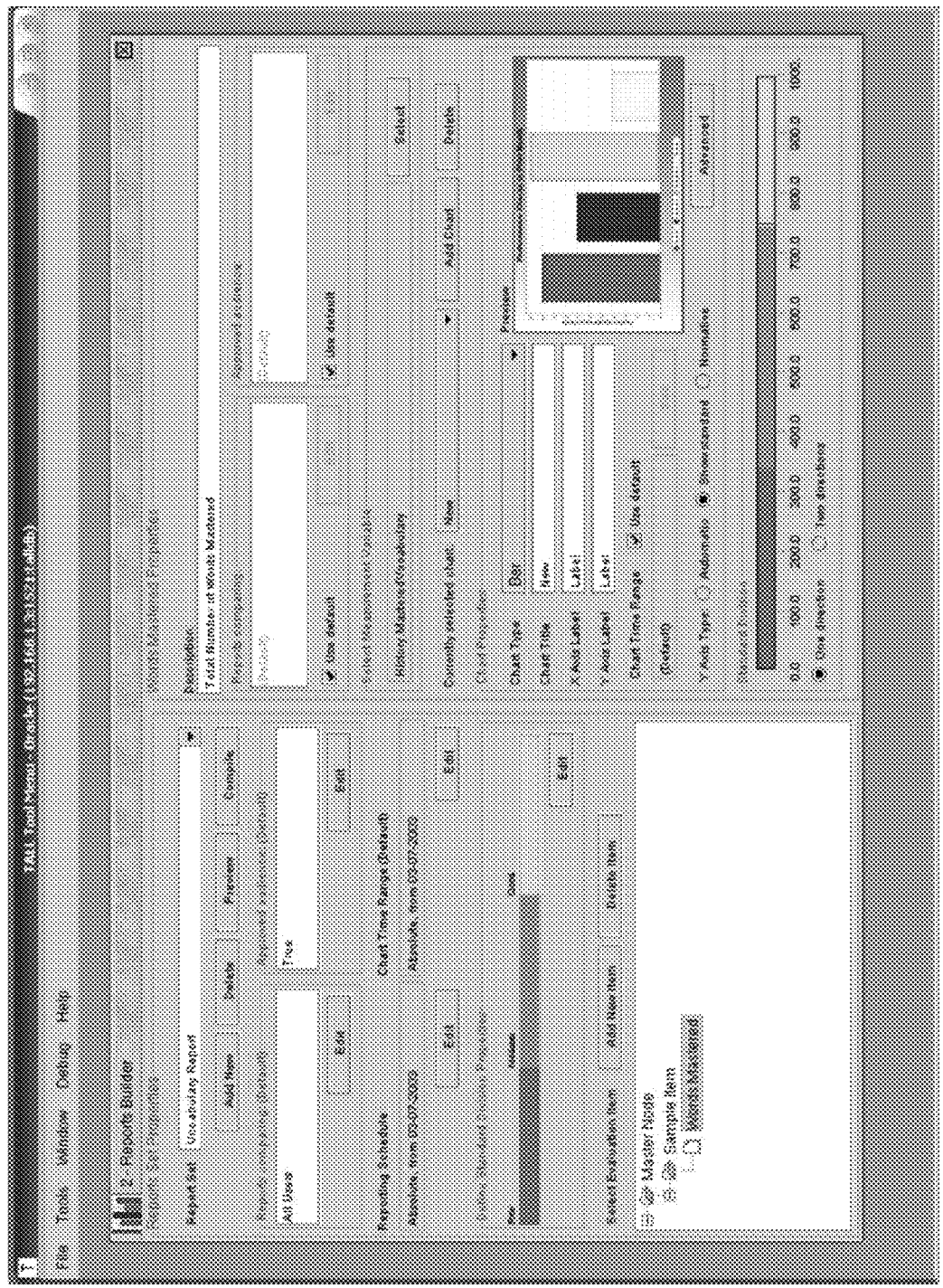
FIG. 43 illustrates a representative user interface in association with a reports builder tool.

With reference now to FIGS. 35-43, a representative user interface is illustrated that corresponds to a reports builder tool. In FIG. 35, a representative user interface having an edit screen associated with a reports builder tool is illustrated. In FIG. 36, a frequency screen of a reports builder tool is illustrated that is displayed upon selecting a category of learner (e.g., a student that is learning a language) in FIG. 35 to bring up the "events" options illustrated in FIG. 36. FIG. 37 illustrates a frequency screen brought up upon selecting "teacher" in FIG. 35. FIG. 38 illustrates a frequency screen brought up upon selecting "proctor-enabled" in FIG. 35. FIGS. 39-40 illustrate a representative user interface relating to a group screen in association with a reports builder tool. FIG. 41 illustrates a representative user interface in association with an edit screen relating to a reports builder tool, wherein the edit screen is on a question level. FIG. 42 illustrates a representative user interface in association with an edit screen relating to a reports builder tool, wherein the edit screen is on an item level. FIG. 43 illustrates a representative user interface in association with a reports builder tool.

J. Research Organizer

In accordance with at least some of the embodiments of the present invention, a research organizer tool is associated with implementation module 84 and/or analysis module 86. The research organizer will be discussed below in association with analysis module 86.

K. Tutor Guidance System (TGS)

Figure 44:
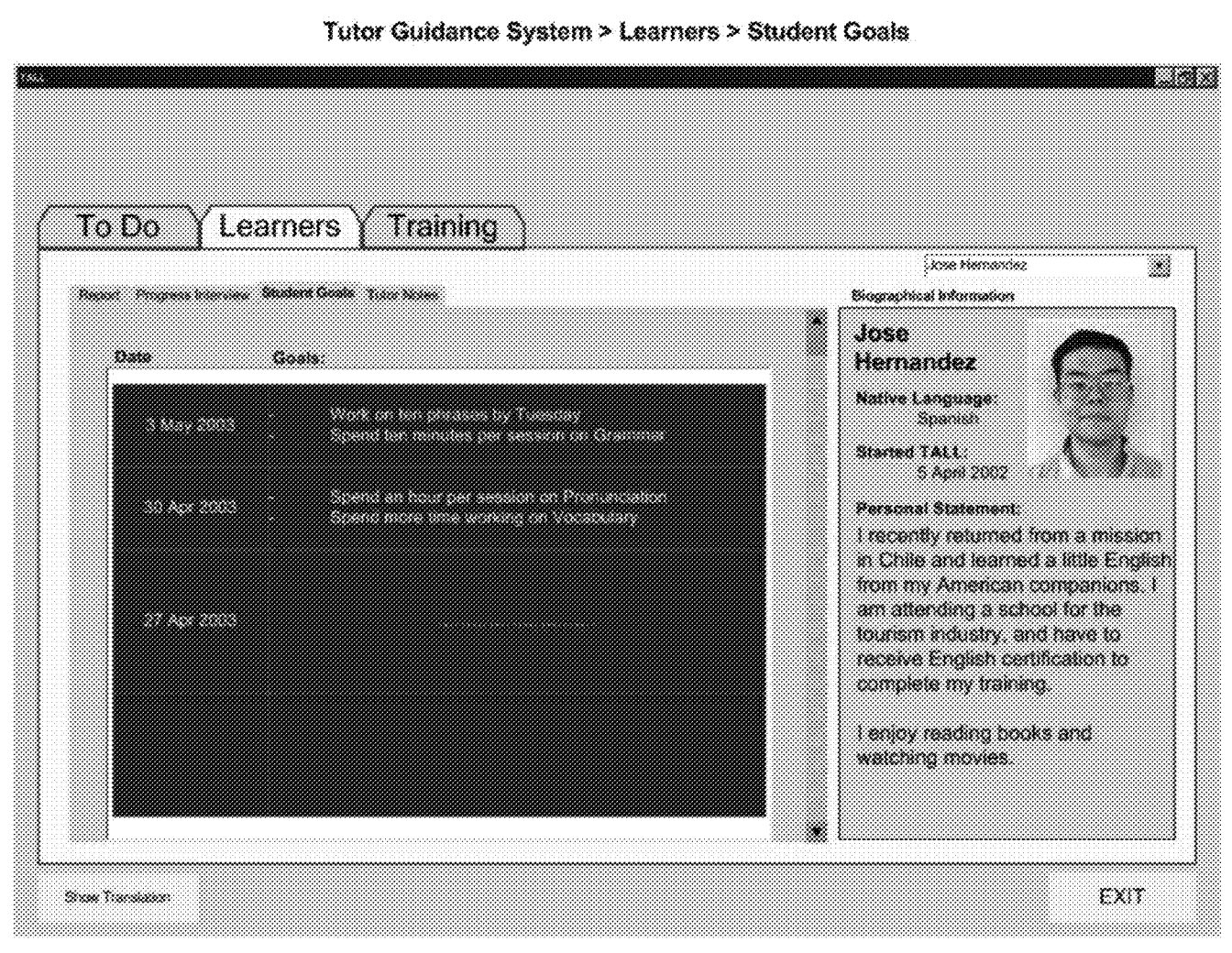
Figure 45:
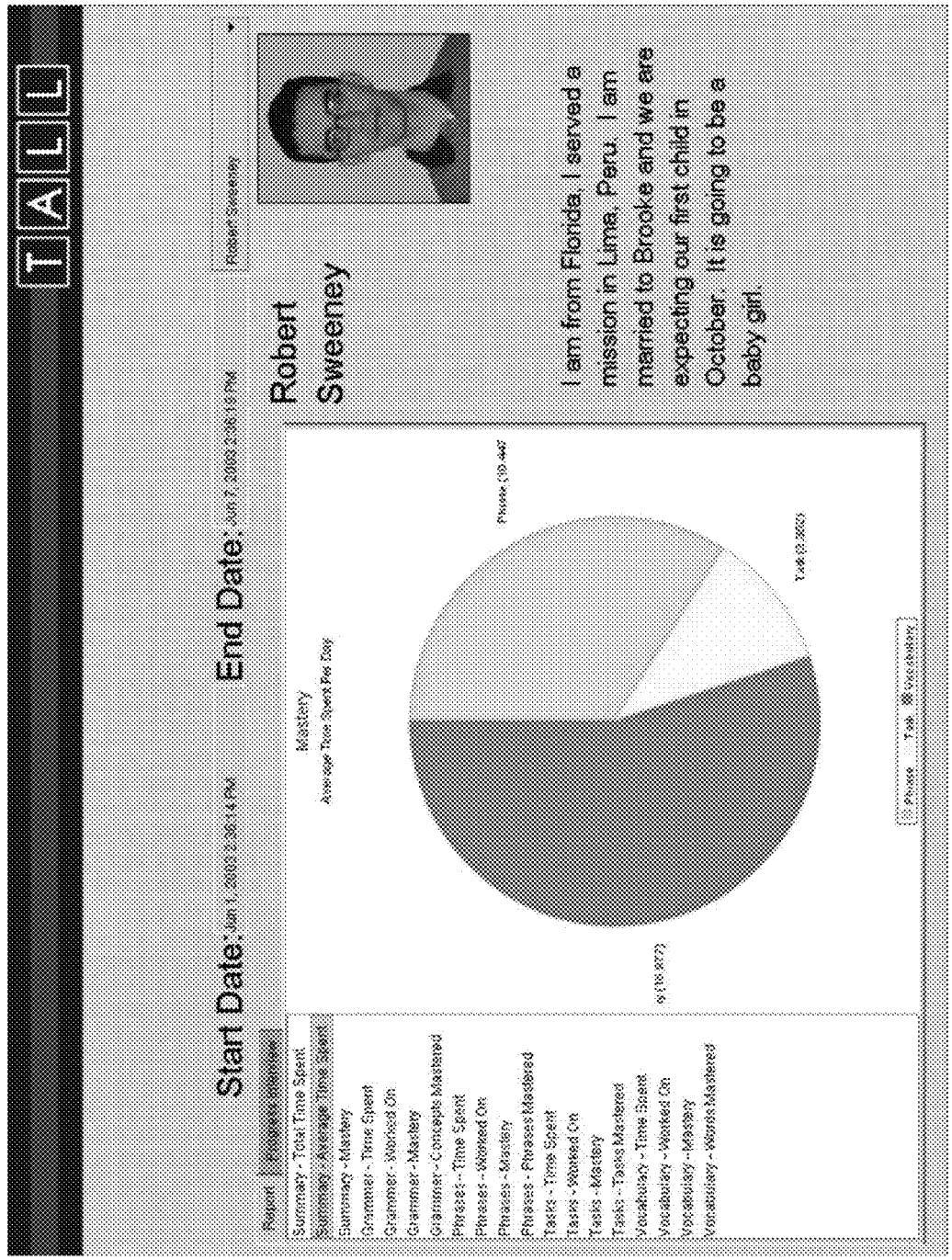

The tutor guidance system (TGS) is designed to guide tutors through the task of effectively tutoring learners. The following features of the TGS assist tutors in this task: to-do list, learner profile and reports, tutor notes, tutor session scheduling, and tutor training. Like the to-do list in the learner guidance system, this provides the tutor with a prioritized list of items that s/he needs to accomplish. The learner profile and reports provide the tutors access to information about each of the learners they work with, including learner biographical information, such as name, picture, native language, date started learning in system, and personal statement. It also includes reports on the learners' performance during past learning sessions as well as goals that the learners have set to accomplish during future learning sessions. The tutor notes section allows the tutor to enter notes about each learner's progress and share these notes with other tutors. The tutor also receives an automatically generated report depicting his/her own level of implementation fidelity to a variety of features of the program. The tutor may receive suggestions or links to on-line training on how to improve. The tutor session scheduling allows the tutors to view and, alternatively, set and edit times for tutoring sessions with students. The tutor training feature lists all the training the tutor needs to be certified at various levels, allows them to choose to begin a particular training module, and allows them to access completed training modules for review. It also provides access to embedded certification assessments. A representative embodiment is illustrated in FIGS. 44-45, wherein FIG. 44 illustrates student goals and FIG. 45 illustrates a report generation.

L. Updater

In accordance with at least some embodiments of the present invention, an updater tool is utilized to keep information current.

M. Administrator Guidance System (AGS)

The administrator guidance system (AGS) is designed to guide local on-site administrators through the task of effectively administering the learning system at a particular location. The following features of the AGS assist administrators in this task: to-do list, tutor profile and reports, learner summary reports, tutor scheduling, and administrator training. Like the to-do list in the learner guidance system, this provides the administrator with a prioritized list of items that s/he needs to accomplish. The tutor profile and reports provide the administrator access to information about each of the tutors they work with, including levels of implementation fidelity in a variety of areas, and tutor biographical information, such as name, picture, native language, date started tutoring in system, and personal statement. It also includes reports on each of the tutor's performance during past tutoring sessions, a list of a tutor's current and upcoming certifications as well as goals that the tutor has set to accomplish during future tutoring sessions. The learner summary reports provide data to the administrator on the progress of the learners at a particular site and/or of a particular grouping as well as comparative data to other, similar learners in other sites and/or groupings. This data may include pre-testing outcomes that may determine whether a particular person qualifies as a learner for a particular set of content, and what part of the content they may need to study. Tutor scheduling allows the administrator to view and, alternatively, set and edit tutoring schedules for a group of tutors. The administrator training feature lists all the training the administrator needs to be certified at various levels, allows them to choose to begin a particular training module, and allows them to access completed training modules for review. It also provides access to embedded certification assessments.

The preceding discussion relates to representative tools that may be utilized to implement educational content in a dynamic continual improvement educational environment. In at least some embodiments of the present invention, implementation of the educational content includes customizably and dynamically instructing individual students/learners and selectively gathering data relating to their learning the educational content.

III. Implementation Fidelity

Implementation fidelity refers to the degree in which the implementation of a given program is in harmony with the intended design. This refers not only to the computerized portions of the programs, but also the degree to which administrators, teachers and tutors, and students follow the intended design. In accordance with embodiments of the present invention, input from administrators, designers, or researchers can determine what data is tracked, gathered, and reported. For example, in one embodiment, the tutor's computer-mediated interactions with the learner are automatically tracked and reported to the tutor and an administrator, who can then be aware of how closely the tutor is meeting fidelity standards. At the same time, the tutor can receive feedback or instruction on how to improve fidelity, and/or the system can adapt to provide the learner with additional interventions to make up for the failure of the tutor to implement with fidelity.

The ability to track fidelity data, and the ability to improve implementation fidelity significantly increases the ability to employ continuous improvement.

IV. Analysis Tools

In accordance with embodiments of the present invention, an implementation module also interfaces with an analysis module, which is employed to evaluate the learning. The analysis module includes various tools (e.g., learning optimizer, research organizer, etc.) to perform the evaluation. Based on the evaluation, a modification module may be employed to selectively customize educational content, a frequency in which content is presented, an order of content presentation, or any other factor to customize the teachings to the individual user, group or lesson. Accordingly, embodiments of the present invention embrace the utilization of a variety of tools that enable the analysis of teaching within the dynamic and customizable continual improvement educational process. Representative examples of such tools include a learning optimizer and a research organizer, a discussion of which will be discussed below.

A. Learning Optimizer

A learning optimizer tool allows instructional designers to experiment with various options, in order to tune the system for optimal learning efficiency. Results are analyzed automatically, and the system recommends and in at least some embodiments even automatically adjusts variables to their optimum settings. The learning optimizer is in short the brain behind the research organizer. It performs analytical functions based on inputs defined in the research organizer.

There are four types of inputs or variables defined in the research organizer that are needed in order for the learning optimizer to perform its function. The variables describe (i) the learner, (ii) the instructional system, (iii) the situation, and (iv) response measurements. Learner variables describe the person using the system, whereas learning history reports the choices made by the learner. Instructional factors describe properties of an activity or adaptive path that are set by the system or determined by developer. These factors are on the learner or concept level. The user has no control over the frequency or levels of these factors. Situational factors describe the surroundings and environmental conditions of the learner. Response measurements are variables to measure how well the user is learning his/her target subject (e.g., language or other educational topic).

The applicable variable list is found in several locations throughout the system including the instructional builder tools (activity builder, adaptive path builder, etc) and research organizer.

For the purposes of the learning optimizer, the variables can also be considered in terms of three different categories, namely (i) fixed variables, (ii) adjustable variables, and (iii) response outcomes. The specification of fixed variables and adjustable variables in the research organizer determines how the learning optimizer constructs the experimental design. Fixed variables most commonly describe the learner, while adjustable variables most commonly describe the properties of the particular instructions system. Adjustable factors and response outcomes constitute the variables signifying the experimental intervention and measurement of its success. Situational variables are included as both fixed and adjustable variables.

The learning optimizer identifies and optimizes the relationships between these sets of variables using information obtained from the research organizer. The research organizer has the user (instructional designer or researcher) select the adjustable variables that are to be experimented. These variables are created in the object manager and appear for use in the Research Organizer. (An exception to both of these might include an experiment designed to test situational factors.) The process also requires the researcher to specify which response outcomes correspond with the chosen set of adjustable variables involved in the experiment.

The experimenter can control for (take into account during the analysis) fixed variables by specifying them during the proposal process. Fixed variables that are categorical (e.g., days of the week or gender) are called blocking variables. Fixed variables that are continuous in nature (e.g., age, education level, ESL background) are called covariates. This information is optional. For very specific learning contexts it is not as important to specify blocking variables or covariates, however for broad learning contexts it is recommended as homogeneity decreases. Specifying the adjustable variables, the fixed variables and the response outcomes allows the learning optimizer to create the correct design.

Four distinct items or sections are completed when proposing a new study, which directly relates to the creation of the experimental design. They will each be addressed in order to understand how and why the learning optimizer chooses a particular design for an experiment:

1. Define Learning Context

The purpose of the defining learning context is that it determines who is included or excluded from the study. An example of a learning context could be: all students with at least one year of a particular experience (e.g., training). This excludes anyone with less than one year of the experience regardless his or her race, education level, learning style, gender, age or any other important characteristic.

2. Define Instructional Factors

The purpose for defining instructional factors is to determine whether the experiment is a treatment comparison or factorial design, wherein one set of treatments is tested over one or more other sets of treatments.

In at least some embodiments, the learning optimizer builds an experimental design based solely on which adjustable factors are linked to the experiment and for which fixed factors are specified as blocking variables or covariates. Response outcome variables are not necessary information for this step in the process.

There are three types of experiments that the learning optimizer can perform, each with several design choices. They are: (i) treatment comparisons, (ii) screening factorial experiments, and (iii) response surface studies.

The learning optimizer recognizes the experiment as a treatment comparison study if a researcher assigns one variable with several values to the experiment. In other words, the researcher selects one variable with several realizations called treatments. Initially, all parameters governing each level are set to default values. Unless blocking variables are defined, the learning optimizer randomly assigns each level (treatment) to one individual such that all treatments are repeated the same number of times. This achieves balance and simplifies the analysis. The learning context provides the pool of possible subjects for the experiments. However, the learning optimizer and/or researcher may determine that only a subset of the available learners is needed (i.e. a subset of the total number from the learning context.)

The purpose of a factorial experiment is to choose optimal settings of many factors by taking into account the way they interact with each other in the learning process. Each person receives a combination of the factor levels (one level from each variable). One example is to determine if certain types of activities are superior when paired with specific other activities (and/or any combinations). This could be different activities within one group of concepts, or different activities across groups. Performing a factorial experiment like this is useful for detecting which combination of activities maximizes learning. Another example would be to perform an experiment within one activity so as to uncover what property settings should be used to maximize the mastery of a particular group of concepts. Assigning several two-level factors to one experiment results in a factorial design, despite the nature of the factors. Because factorial designs are in part based upon the number of available subjects, the learning optimizer searches for students in the learning context to determine the exact design that must be used.

3. Choose Experimental Unit

An experimental unit is defined as the basic unit that receives the treatment or experimental intervention. Another way to determine what this unit is for a given experiment is to answer the following question: To what or to whom am I randomly assigning the treatments? The researcher is given the choice between having a person or "learner" as the experimental unit and having a "concept" (e.g., word, phrase, grammar principle, or even a certain type of activity) as the experimental unit. If each learner receives a different treatment, the learner is then the experimental unit. However, if each concept for a learner receives a different treatment, then the concept is the experimental unit.

Using the concept as the experimental unit has the potential for greatly increasing the statistical power of the experiment, in cases where it makes sense. For example, an experiment involving only ten subjects would most likely not yield enough data from which to draw any conclusions, if the experimental unit is the learner. But if the experimental unit is the concept, and the ten subjects each learn one-thousand vocabulary concepts, each concept being randomly assigned to a few different treatments groups, then the likelihood of detecting the impact of different treatments is much higher, assuming there is a difference to detect. There are further advantages to using the concept as the experimental unit. Gathering data points for each treatment/student combination allows an interaction to be uncovered between the student and each treatment. This interaction reveals what treatments are best suited to every student, and subpopulations can be discovered. These subpopulations are poorly understood prior to conducting the experiment.

4. Define Blocking Variables or Covariates

Blocks and covariates are variables that describe the experimental unit or the experimental unit's situation. If the researcher selects "learner" as the experimental unit, he/she is then able to specify block variables or covariates if desired. However, until there are variables that describe concepts, such as difficulty level, specifying block variables and covariates will not be an option for concept-unit designs. Treatment comparisons experiments will thus be completely randomized, and factorial experiments will be traditional.

In the case wherein the learner is the experimental unit, the learning optimizer allows the researcher to specify up to two blocking variables (e.g., he/she can specify days of week AND gender as blocking variables). However, it will allow the researcher to consider as many covariates as desired.

A second purpose of the learning optimizer is to calculate and present the statistical power of the design for different numbers of experiment units. Before the learning optimizer actually implements the design it will allow the researcher to select the number of experimental units from a list of possibilities presented in the research organizer. The list is derived from the total number of students in the learning context by considering only those numbers that ensure a balanced experimental design. The research organizer presents the maximum possible number, along with lower numbers, which may enable the experiment to be completed in less time. The researcher can make his/her selection from the presented values based on two criteria: First, for each choice in the list the research organizer will display the projected amount of time to complete the study based on that particular number. Second, it will present a power analysis for each of the choices.

The purpose is to show the researcher the average effect size he/she can expect to detect from his experimental interventions based on the corresponding number (e.g., students or concepts). Effect size is the amount of effect that each variable has on the response measurement.

When a concept has been chosen as the experimental unit, the choice is more important to the researcher. Time plays an important role in determining how many concepts to include in the experiment. Doubling the number of concepts to be included in the experiment doubles the amount of time it takes to complete the experiment. The learning optimizer projects the length of the experiment for each number based on empirical trends and past data.

A third purpose of the learning optimizer is to perform the experiment with the users specified under the learning context by correctly applying the treatments and collecting the data. For automated experiments, this application of the treatments is performed by the learning optimizer in concert with the instruction engine. In a treatment comparisons experiment, each learner is assigned one level of the factor for the course of the experiment. This factor level is the treatment for that individual. In a factorial experiment, the learner will be assigned one level of each factor based on the plan. The one combination signifies the "treatment" for that learner. By reviewing the designs shown in the first section, it becomes clear that for both factorial designs and treatment comparison designs, the term "treatment" simply means a unique row in the design. Blocks are not included in the definition of the treatment.

The learning optimizer knows the meaning of each treatment and applies the correct levels of each factor to the correct people defined in the learning context or based upon blocking variables. In either instance, the term "treatment" is synonymous with a row in the design. Once the treatments have been applied to the experimental units, the data must be collected and compiled in a standard way to make it ready for analysis. It is also available in text format so that future researchers or visitors to the research organizer may download the data set to a file for personal examination.

A fourth purpose of the learning optimizer is to analyze the data according to the type of design and to suggest actions to be taken as a result of the experiment. The learning optimizer analyzes the data according to the type of design and other criteria as entered in the research organizer originally. The following are types of analyses that can be performed by the Learning Optimizer: (i) summary charts and graphs, (ii) significance tests, (iii) presentation of estimated effects/coefficients, and (iv) main effects plots and interaction plots.

Despite strong conclusions that favor one treatment over another, or one factor level over another, the learning optimizer does not enforce (make changes to parameter values) any conclusions without outside researcher instruction, at least in some embodiments. The learning optimizer simply presents the results of the study for the researcher to view in the research organizer. Once he/she has viewed the automatic analyses results, the data and also conducted any other additional analysis as desired, the researcher has the option of what to do with the information. At least some embodiments of the present invention embrace automated alteration of the instructional design based on the results.

Thus, a learning optimizer tool allows instructional designers to experiment with various options, in order to tune the system for optimal learning efficiency. Results are analyzed automatically, and the system recommends or enforces optimum settings. It functions by submitting studies in the GUI interface, namely a research organizer tool.

B. Research Organizer

Figure 46:
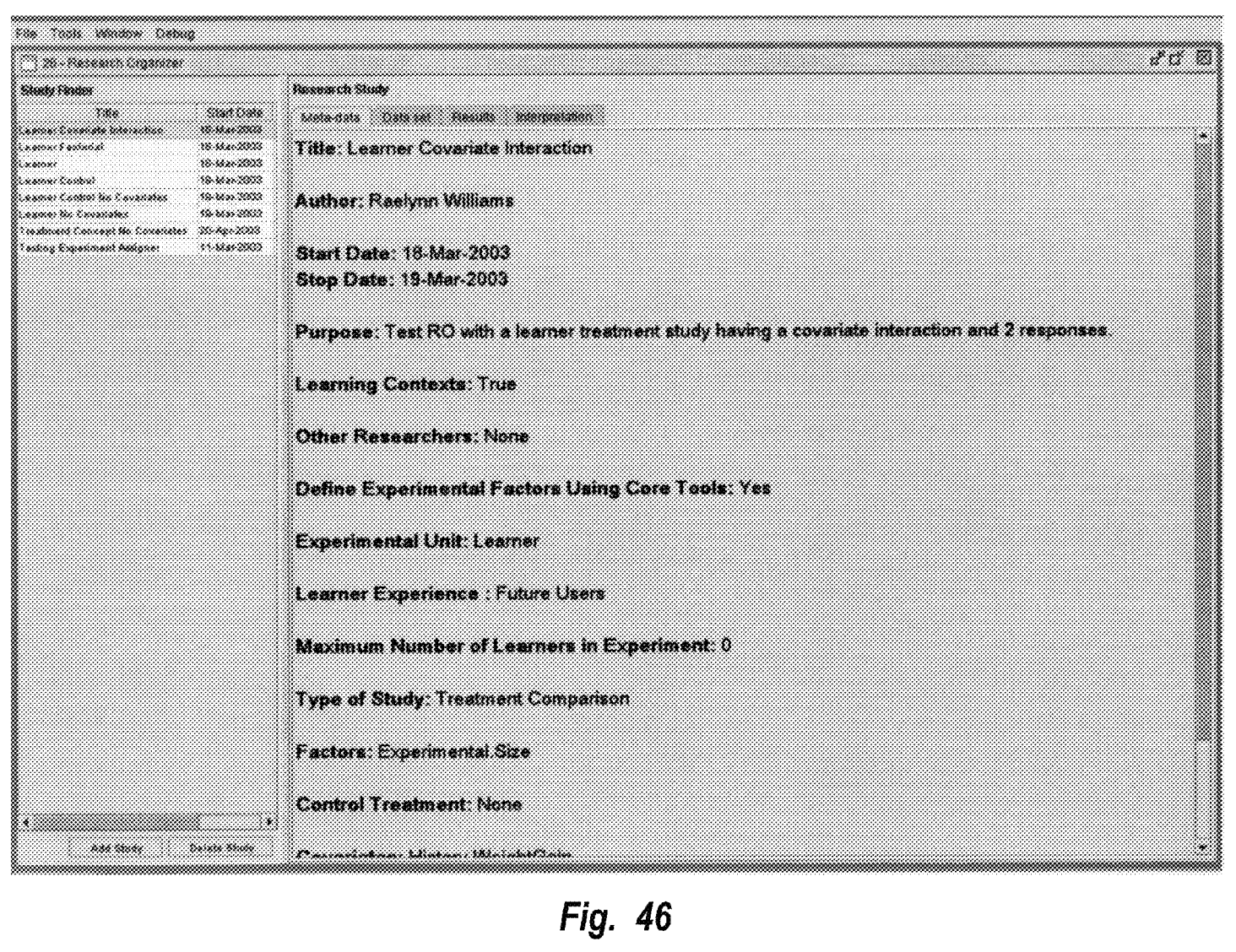

A research organizer tool allows researchers and developers to see the results of experiments, to suggest new experiments, to see data and rationale for making changes to instructions, and to see important findings highlighted. The research organizer is the center and user interface to review old studies and propose new ones. FIG. 46 illustrates a representative user interface in association with a research organizer tool.

The following is an explanation of three levels of meta-data. The first level ("level 1") of meta-data includes the three main summary descriptors of every study: title, author(s), and start date. It is required before submitting a study. This information is chosen by the researcher and input directly into the research organizer. The second level ("level 2") includes other keyword descriptors that apply to both manual and automatic studies, also input directly into the research organizer, but is not required to submit the study. The third level ("level 3") is slightly different for automatic and manual studies. For automatic studies this information is input immediately after completing the level 2 meta-data as the information will be used to create the design. For manual studies the level 3 meta-data is input once the study has been concluded and is simply for informational purposes. For both types of studies, the information is input into the research organizer itself. For automatic studies this includes defining variables and choosing the response. As explained previously, all variables are created in the object manager, selected in the research organizer tool, and implemented in the activity or adaptive path builder tools. Visually, in at least some embodiments there are three main sections to the research organizer. They are: (i) the study finder, used to search for and select studies for viewing, (ii) the process support, the equivalent to a help feature, and (iii) the research study panel, used to propose a new study or view a previously submitted study.

1. Study Finder

A study finder is used to search for and select studies for viewing. When on the index tab the researcher automatically views all studies in the database. These studies are ordered by specific headings chosen by the researcher. The studies are ordered by Title as a default, but can be ordered in other manners.

The search tab allows a researcher to select a keyword category out of the combo box and enter the corresponding keyword in the text field. The user can enter up to 8 different keywords and connect them with AND, OR and NOT. Once the information is entered, the researcher hits SEARCH and the system will immediately bring up the Results tab screen containing the matches. Upon clicking back to the Search tab the keywords previously entered by the user will have automatically appeared in the search history box. The user can either modify existing information and SEARCH again, or he can RESET the Search screen. Resetting the Search returns all categories in the combo boxes to their original positions and clears all keywords entered by the user. A completely new search can then be entered. Note: every time the SEARCH button is clicked a new entry is added as a new search in the Search History box.

Initially this tab is disabled, but after hitting the SEARCH button, the results appear by default. They are presented on the tab in a similar manner as the index portion of the Study Finder presents all studies. Headings to sort by can be included and excluded similarly to the headings on the Index. If the search was unsatisfactory or after getting all the desired information from one search the researcher can then go back to the search screen, reset and try and new search.

2. Process Support

The process support is equivalent to a help feature. This feature includes information on how to complete a task in the research organizer. The topics are provided in an attempt to guide the researcher through any of the research organizer's functions. Process support gives definitions, tips and instructions to accomplish different tasks.

The methods to find help on a specific topic are facilitated by the general help system for all tools. Help for a research organizer tool can be accessed from the tool menu or by pressing the F1 key when inside a research organizer tool. For quick help however, tool tips on each label and table heading provide simple instructions and explanations.

3. Research Study Panel

The research study panel is used to propose a new study or view a previously submitted study. In the present example, the research study portion of the research organizer includes of six tabs: 1) Meta-data, 2) Proposal, 3) Human Subjects Review, 4) Data Set, 5) Results, 6) Analysis, and 7) Comments. The comments screen is available for all types of studies and is a forum to submit new comments and review past comments. Tabs 1-3 are available for completed studies, ongoing studies, and studies scheduled in the future. Tabs 4-6 are available for studies that have been completed. The summary statistics and graphs found on the results tab are available for ongoing studies and are updated weekly.

The meta-data tab includes text descriptors of the study, but no results. The information is presented in order of the meta-data levels. Level 1 data as previously explained is shown first (includes the Title, author(s), and start date.) Level 2 information follows and includes the purpose, the learning context, the location(s) of the study, the rationale behind the study the other researchers involved and how the experimental factors were defined (i.e. in the object manager or from an outside source.) Finally the correct Level 3 information is presented depending on the type of study (automatic or manual). A more detailed explanation of how this information is entered is found after the description of the seven different tabs.

The proposal tab presents a written proposal of the experiment. For researchers who are designing a NEW study, there are two options for entering the proposal. First, the screen includes a blank text box to allow the researcher to write a proposal directly on the tab or copy and paste in a previously written proposal. Second, a text field to enter the path and a browse button to locate a previously written proposal appears on the screen. This allows the researcher to upload a document into the research organizer instead of being required to write it directly into the screen. The human subjects review tab provides a checklist of those items that are to be completed before the study can begin. This includes the application, literature review, proposal of methods and other documentation that is required in order to perform a study with human subjects. The last item is a check box that acknowledges receipt of an approval letter. Each of these items must be checked off and the date of completion entered. Once the approval letter has been received, and the meta-data and proposal sheets are satisfactory to the researcher, he may submit his study to the learning optimizer. There will be a button located on the meta-data screen indicating final submission. Once the study has been submitted, it will appear in the system as a future or current study in the study finder and can be viewed by all visitors to the research organizer. However, it will not actually start until the start date specified by the researcher in the meta-data sheet.

Regarding the data set, if the study was performed manually the data are uploaded to the system in text format. This is achieved similarly to uploading a proposal. The researcher enters in an explanation of all variables (in the correct location which appears as a text box only in the case of manual studies). This option is disabled when the researcher has already uploaded the data, and also when an automatic study has occurred. At this point the data is already compiled and stored in the correct location automatically. The explanation of variables also appears by default. These explanations are based on how they were chosen, changed and created in the instructional builder.

In the future, any visitor to the research organizer can download the complete data set to a file for additional analysis or study through a similar interface. The only options available on this screen for visitors are the explanations of variables and the download data option.

Summary tables and graphs are presented first and are available as the study is ongoing. They are updated weekly until the study's conclusion. These are standard graphs that will automatically be built by the reports builder and linked to this location. After submitting an automatic study the researcher will have the option to keep the standard graphs or personalize the results to display graphs of his choice. If the researcher finds the standard graphs unsatisfactory, he can enter the reports builder and change what graphs are linked to the results page, i.e. personalizing his results page.

For treatment comparisons the automatically generated graphs include the following: a histogram of each response variable for each treatment; an overall bar chart with the response variable averages plotted for each treatment; and a "default use of time" style chart with averages for each treatment. For a factorial design there will be a table of the response variables for each factor level across all factors, a bar chart comparing overall means for each response variable (i.e. bar chart of the previous table), and finally histograms of each of the overall response variables may be presented. For each type of experiment, the graphs will be presented by block representations if blocking variables have been specified.

Each graph is accompanied by a standard explanation of the graph type and how it should be interpreted. These explanations are viewed by clicking the button next to each graph. In conjunction with the summary statistics and graphs is an abort button that allows the author(s) to stop an automatic study in the (rare) case it seems to be an absolute failure. This button is disabled to all visitors that are not identified by the system as the author of the study. Once the study has been aborted it is not possible to resume the same study. A completely new study must be proposed in order to examine the same things.

Next the statistical analysis is presented. The analysis performed automatically includes: 1) graphs indicating the significance of experimental factors and 2) tables presenting results of hypothesis testing and estimated effects (coefficients). General information about interpreting the plots is located in the help feature.

Regarding manual analysis (referring to the analysis tab rather than a manual study), analysis refers to critical thinking and conclusions drawn by humans in contrast to results, which refers to procedures conducted automatically by the computer. The information on this tab may be input by the researcher regardless if the study is automatic or manual. The analysis tab may include a text box that suggests ideas of information to be entered, although it is ultimately up to the researcher. For example, the following information may be suggested: What additional statistical analyses did you conduct and what did you find? What theories do the results support of suggest? What changes if any to the system will result (document the before and after)?

Once all the text fields are filled, the researcher can electronically submit the information and it will be stored with the study as public information to be viewed by other researchers.

The comments tab is available when viewing any study off the study finder, meaning a future scheduled study, an ongoing study or a completed study. The majority of the screen is a text box that allows any researcher to type in comments and submit them to the system. The person submitting comments must also enter a subject in a separate text field, similar to an email. The system will categorize all comments by the subject, author (identified by user number when logged into the system) and date of submission.

If the user is recognized by the system as one of the authors, a button will also appear enabled that will bring up comments previously submitted about the study. Comments are accessed by inputting the password (chosen by the author at time of submission). Once the password has been correctly input, a new screen will appear that displays the comments. Comments are presented similarly to how studies are presented in the Study Finder. They will be listed by the headings of author, subject and date. The researcher can sort them in ascending or descending order according to one of the headings by clicking on it.

The research creates a new study by clicking on the "Add Study" button. After the title is input into a text field, the meta data sheet asking for with all required information will appear. The authors are chosen from a combo box one at a time and added to a list. There is also a feature to add a researcher to the combo box if the desired person is not already listed. Clicking on the Add Author button will bring up a box that has a text field wherein the user types the name to be added to the list. The system will not only add it to the combo box of names for future users, but include it in the current list of authors for that study. Finally the user will be required to type in the suggested start date into a text field in the following format: mm/dd/yyyy.

Level 2 information is also required information for all types of studies (automatic and manual). The first entry in Level 2 asks for the purpose of the study, which is typed directly into a text field. The learning context is the second entry in Level 2, and is defined similarly as in other parts of the system such as the activity builder.

The researcher is required to decide if his experimental factors can be defined using other tools. In at least some embodiments, only those experiments whose factors can be defined by the tools will have further information that must be defined in the meta-data sheet before submitting the study, i.e. Level 3 meta-data. If the researcher clicks "NO" to defining the factors using the tools, then a pop-up box appears which reminds him of the information that he must enter into the system following the conclusion of his study. The information includes: completing the Level-3 meta-data for manual studies, uploading the data set, and inputting the results and analysis. Another box contains two text fields to select (and re-enter) a password for the study. The password allows the author to view comments about his study in the future. He is now free to exit the Research Organizer and begin his study.

Once the researcher has selected "Yes" to defining the factors in the core tools, he must first select his experimental unit for the study: learner or concept. A follow up question asks him to decide whether he would like to use current TALL learners, future TALL learners, or a combination. Choosing "new" (current) learners will include a specific number of users as they enter the system until the quota is filled.

The experimental variables are selected from a combo box displaying those previously created in the object manager. One variable may be selected from the variable combo box and additional variables can be added through a list. Specifying further variables creates a factorial experiment. Only after selecting a two level variable from the combo box is the list of other two level variables enabled. Two questions are enabled if the study is a treatment comparison. They ask for a control treatment and whether or not the author is interested in finding the "best" treatment. Control treatments and (a guess at) the best treatment are chosen from a combo box that contains only those levels of the experimental variable associated with the experiment. Only one item per question may be chosen and nothing can be added to the list.

The researcher can select the categorical (blocking) variables to control for, and also the values that they take on from lists presented in combo boxes. The researcher may not add to these lists as he has previously been permitted to do. For example, by choosing the variable day of the week, he must also choose the values he would like to include, such as Monday, Wednesday and Friday. Thus, each variable box will only allow the researcher to select one item, while the boxes corresponding to the values, will allow him to select multiple.

He is then asked to select from a list of continuous variables (covariates) for which he would like to control. These include things such as age, education level, years or months of ESL experience and others. If a variable cannot be broken down into a small number of standard and finite categories, then it is probably a continuous variable. The researcher may select multiple values from the list, but cannot add new entries except by creating new variables in the object manager tool.

Finally the researcher chooses one or more response variables which measure the success of his experimental treatments or factors. Examples of these response variables include: percent correct, number mastered, learning efficiency. The researcher can create variables through a calculator type mechanism also seen inside the instructional builder. Defining the response is important so that the system will know which information to compile together and analyze.

To complete the meta-data sheet, the researcher may select the total number of subjects to include in his study. This may only be a guess at a first passing, but before the study is submitted the researcher should feel confident in his selection. The system will present choices for the number of experimental subjects to include in the study based on the criterion that he has previously entered. This criteria includes the total number of subjects available in the learning context, the type of experimental unit, response variable information, and if applicable whether or not the experiment is using current or future users, or both.

The decision of how many subjects to include should be guided by the accompanying projected amounts of time that the study will take to be completed, along with the predicted detectable effect of the treatment. Each choice will be paired with a predicted length of time based upon including that particular number of subjects. The prediction is primarily based upon historic or past data and also knowledge by the researcher. This number is also based upon whether the researcher would like to use current users, or limit the study to only future or "new" users.

Researchers should also select the number to include by viewing the statistical power of including differing amounts of subjects in the experiment. The greater the number of subjects, the greater power the experiment will have to detect a significant effect from the experimental interventions. Until the final plan is submitted, the researcher can make any changes he desires to the meta-data information. Once the plan has been submitted however, the meta-data sheet becomes a tab with text presented on it, and it cannot be changed or edited. The proposal and human subjects review tabs have the same limitations.

Upon completing all tasks explained above the researcher will have finished the meta-data sheet requirements. Upon submitting the final plan (which only happens after writing a proposal and getting approval from the Human Subjects Review), the system will design the experiment based on the above information, and return the meta-data sheet in its finished text form as seen on page 1. The system will have also filled in the final two pieces of information presented in the meta-data sheet on page 1. These are the type of study and the type of design. This information can only be determined by the system after all prior information is gathered. These two additional descriptors of the study are only for information and classification purposes and are not entered or chosen directly by the researcher.

Once the study has been submitted, there a pop-up box appears telling the researcher what information he is required to input into the system at the conclusion of the study. This primarily includes the "human" analysis, found on the analysis tab. There is also a place to choose a password for the study that must be entered in the study is ever aborted or if the researcher would like to view comments about his study.

Another pop-up box allows the researcher to add information to one of the lists previously encountered. The box appears basically the same for each category except that only the correct category is bolded, while the rest appear disabled. This reminds the researcher what he is adding to the system. If he decides not to add an item, he can click CANCEL to return to the meta-data sheet, or he can type in a new item and click OK to have it added to the list.

A pop up box appears if the researcher selects NO to defining the experimental factors in the instructional builder tools. This simply lists the information that is required to be input into the system. To submit the study the researcher must still press the SUBMIT button. A similar pop up box appears after clicking YES to define the factors in the instructional builder. Significantly less information is required at the conclusion of an automatic study. There are also two boxes that the system requires the researcher to pass through if he is to abort an automatic study. They include a confirmation box and one requiring the password (and then a re-entering of the password for confirmation purposes) chosen by the researcher.

Thus, in accordance with embodiments of the present invention, an implementation module also interfaces with an analysis module, which is employed to evaluate the learning. The analysis module includes various tools to perform the evaluation. Based on the evaluation, a modification module may be employed to selectively customize educational content, a frequency in which content is presented, an order of content presentation, or any other factor to customize the teachings to the individual user, group or lesson. Accordingly, embodiments of the present invention embrace the utilization of a variety of tools that enable the analysis of teaching and learning within the dynamic and customizable continual improvement educational process. Automated experimentation is an important part of the overall method of the present invention, which makes the continual improvement educational environment feasible. This method of automated experimentation accelerates the improvement of education well beyond the rate of traditional educational research methods.

V. Other Tools

Those skilled in the art will appreciate that other tools may be utilized in a dynamic continual improvement educational environment. Examples or such other tools include a data and code synchronizer and other tools.

A. Data and Code Synchronizer

A data and code synchronizer tool transfers both data and code between a client computer and a central server in order to ensure that the system remains up-to-date.

VI. Conclusion

Embodiments of the present invention take place in association with a dynamic learning process that includes the ability to design or develop an educational experience or otherwise provide educational lessons (e.g., educational activities, educational content, etc.). The designing of the educational experience or lesson is facilitated by utilizing an object oriented format, a drag-and-drop interface, or other process that facilitates design development of educational content and does not require a programmer to develop the educational experience. Once designed, the implementation of the educational lesson is experienced by an individual or group, and includes providing instruction and gathering data. An analysis is performed on the data to optimize learning. The analysis corresponds to a particular individual, group and/or educational lesson. Modifications are selectively or automatically made to the educational lesson. The process of designing, implementing, analyzing, and selectively modifying creates a cycle that optimizes the learning process and adapts to groups and individual learners with the goal of improving learning outcomes and efficiency.

At least some embodiments of the present invention embrace the utilization of a computer device in designing educational lessons, implementing educational lessons, performing analysis and/or providing modifications. An individual learner/student may interface with the computer device in the educational environment and may additionally interface with an instructor. If this instructor (or a peer) is at a distant location, their collaboration may be mediated through multiple computers connected to the internet or some other network.

Within the environment, the educational lesson or content is dynamically provided to the learner on an iterative basis according to the need of that learner in the learning process. Learner performance data is gathered and is selectively used to adjust the pace of learning, to modify the frequency of exposure to particular content, and to regulate the type and difficulty of content to which the learner is exposed.

Aspects of the educational environment are easily and/or automatically adapted to a learner's performance. For example, if an analysis of user data indicates that a given learning activity needs an additional feature, that feature can quickly be added or created, such as through the use of a drag-and-drop interface. Similarly, if a given activity proves to be unhelpful, it can be immediately eliminated. Also, if a particular activity proves to be helpful to some learners, but not to others, entry conditions are set to only allow those learners that are predicted to benefit from the activity to be exposed to the activity. Factors or characteristics of the user that may be taken into account include age, native language, learning style, institution, background, interests, purpose in learning, degree of long-term retention desired, the breadth or depth of their overall mastery, and their need to be particularly well-prepared to use a certain subset of the information for an upcoming responsibility or engagement (such as an academic conference on a particular subject), etc. Other learners skip or never experience the particular activity. Alternatively, they may be exposed to another educational activity. If a new activity would be useful to the learner, the new activity may be quickly provided or otherwise authored by a designer rather than a programmer.

Automatic or partially automated studies determine the effectiveness of particular lessons, activities, or other instructional design decisions. For example, an assignment may be made for a first test group to experience a first lesson and a second test group to experience a second lesson. In another example, one learning activity might be presented in a different way to one group than another group. The results of the two test groups are analyzed to determine the effectiveness of the two lessons in relation to each other.

While the methods and processes of the present invention have proven to be particularly useful in the area of teaching a foreign language to the learner, those skilled in the art will appreciate that the methods and processes of the present invention can be used in a variety of different applications and in a variety of different educational environments to teach any type of educational topic or material. For example the educational content may embrace language, mathematics, science, technical training, cooking, medical procedures, a particular skill, professional training, or any other learning.

Thus, as discussed herein, the embodiments of the present invention embrace providing a dynamic continual improvement educational environment. In particular, the present invention relates to dynamic systems and methods for gathering/tracking data, automatically adapting to an individual's pace of learning or other characteristics of the learner, selectively determining the type and difficulty of content provided to an individual, selectively providing an exposure frequency for the content, and/or enabling rapid design modifications within the educational environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system comprising:
one or more processors; and
memory storing computer executable instructions which when executed perform a method for developing learning activities for use in a learning program, the method comprising:
  displaying an adaptive path builder user interface for receiving user input to define an adaptive path of language learning activities, the adaptive path builder user interface including:
    an adaptive path editing window in which the adaptive path of language learning activities is defined, the adaptive path of language learning activities including a plurality of language learning activities that are interconnected by branches;
    a branching window which displays one or more branches of a selected language learning activity, each branch comprising at least two destination language learning activities to which branching from the selected language learning activity may occur and conditions defining to which of the at least two destination language learning activities branching will occur;
  displaying an activity builder user interface on a display device for receiving user input to define one or more of the language learning activities of the adaptive path of language learning activities, the activity builder user interface including:
    a work area in which components are added to a language learning activity of the adaptive path of language learning activities by dragging and dropping the components in the work area,
    a components list that lists components available to be dragged and dropped into the work area for inclusion in a language learning activity,
    a variables list that lists a language learning activity's components and properties of each component in the language learning activity, and
    a properties list that lists properties of a selected component in a language learning activity,
    wherein displaying the activity builder user interface includes displaying a first language learning activity of the adaptive path of language learning activities in the work area;
  receiving, at the activity builder user interface, user input that drags and drops a first set of components onto the work area;
  adding the first set of components to the first language learning activity being displayed in the work area, including displaying a representation of each component in the first set of components in the work area and the variables list, and displaying a representation of each property of each of the components in the first set of components in the variables list;
  receiving user input that selects the representation of a first component in the work area or the variables list and displaying the properties of the first component in the properties list;
  receiving user input that drags and drops the representation of a property of a second component displayed in the variables list onto the representation of a property of the first component displayed in the properties list; and
  automatically generating a relationship between the first and the second component by associating the property of the second component with the property of the first component.

2. The system of claim 1, wherein associating the property of the second component with the property of the first component comprises linking the value of the property of the second component to the value of the property of the first component such that at runtime if the value of one property changes, the value of the other property changes as well.

3. The system of claim 1, wherein the first set of components includes two or more components, the method further comprising:
relating the two or more components together within the first language learning activity based on a sequence in which the two or more components are dragged and dropped onto the work area.

4. The system of claim 1, wherein the method further comprises:
splitting the display of the work area into multiple roles, each role being associated with a separate language learning activity of the adaptive path of language learning activities.

5. The system of claim 4, wherein the method further comprises:
receiving user input that selects the representation of a component in a first role and the representation of a component in a second role; and automatically creating an association between the selected components.

6. The system of claim 1, wherein the method further comprises:
receiving user input that selects the representation of two components displayed within the work area or the variables list; and
displaying a dialog box that includes suggested property connections between the properties of the selected two components.

7. The system of claim 6, wherein the suggested property connections are determined based on previous property connections that have been created between the two components.

8. The system of claim 1, wherein the method further comprises:
receiving user input that selects a property from the property list; and
displaying a drop-down list of all properties of components in the first language learning activity that are compatible with the selected property.

9. The system of claim 1, wherein automatically generating a relationship between the first and the second component by associating the property of the second component with the property of the first component comprises displaying a line in the work area between the representation of the first component and the representation of the second component.

10. The system of claim 1, wherein the method further comprises:
creating a component module comprising the first set of components and one or more associations created between components in the first set; and
displaying a representation of the component module in the components list to allow the component module to be reused in other language learning activities.

11. The system of claim 1, wherein the first language learning activity is a dynamic activity that includes components having one or more properties that are resolved at runtime based on user interaction with the first language learning activity at runtime.

12. The system of claim 1, wherein the adaptive path of language learning activities is associated with a learning concept.

13. The system of claim 12, wherein the learning concept is related with another learning concept.

14. The system of claim 13, wherein the relationship between concepts is one of a hierarchical or a predecessor-successor relationship.

15. A method, performed by a computer system, for developing learning activities for use in a learning program, the method comprising:
displaying an adaptive path builder user interface for receiving user input to define an adaptive path of language learning activities, the adaptive path builder user interface including:
an adaptive path editing window in which the adaptive path of language learning activities is defined, the adaptive path of language learning activities including a plurality of language learning activities that are interconnected by branches;
a branching window which displays one or more branches of a selected language learning activity, each branch comprising at least two destination language learning activities to which branching from the selected language learning activity may occur and conditions defining to which of the at least two destination language learning activities branching will occur;

displaying an activity builder user interface on a display device for receiving user input to define one or more of the language learning activities of the adaptive path of language learning activities, the activity builder user interface including:
a work area in which components are added to a language learning activity of the adaptive path of language learning activities by dragging and dropping the components in the work area,
a components list that lists components available to be dragged and dropped into the work area for inclusion in a language learning activity,
a variables list that lists a language learning activity's components and properties of each component in the language learning activity, and
a properties list that lists properties of a selected component in a language learning activity,
wherein displaying the activity builder user interface includes displaying a first language learning activity of the adaptive path of language learning activities in the work area;
receiving, at the activity builder user interface, user input that drags and drops a first set of components onto the work area;
adding the first set of components to the first language learning activity being displayed in the work area, including displaying a representation of each component in the first set of components in the work area and the variables list, and displaying a representation of each property of each of the components in the first set of components in the variables list;
receiving user input that selects the representation of two components displayed within the work area or the variables list;
displaying a dialog box that includes suggested property connections between the properties of the selected two components;
receiving user input that selects one or the suggested property connections; and
automatically generating a relationship between the first and the second component by associating the property of the second component with the property of the first component.

16. The method of claim 15, wherein associating the property of the second component with the property of the first component comprises linking the value of the property of the second component to the value of the property of the first component such that at runtime if the value of one property changes, the value of the other property changes as well.

17. The method of claim 16, wherein the first set of components includes two or more components, the method further comprising:
relating the two or more components together within the first language learning activity based on a sequence in which the two or more components are dragged and dropped onto the work area.

18. One or more non-transitory computer readable media storing computer executable instructions which when executed perform a method for developing learning activities for use in a learning program, the method comprising:
displaying an adaptive path builder user interface for receiving user input to define an adaptive path of language learning activities, the adaptive path builder user interface including:
an adaptive path editing window in which the adaptive path of language learning activities is defined, the adaptive path of language learning activities including a plurality of language learning activities that are interconnected by branches;

a branching window which displays one or more branches of a selected language learning activity, each branch comprising at least two destination language learning activities to which branching from the selected language learning activity may occur and conditions defining to which of the at least two destination language learning activities branching will occur;

displaying an activity builder user interface on a display device for receiving user input to define one or more of the language learning activities of the adaptive path of language learning activities, the activity builder user interface including:

a work area in which components are added to a language learning activity of the adaptive path of language learning activities by dragging and dropping the components in the work area, a components list that lists components available to be dragged and dropped into the work area for inclusion in a language learning activity, a variables list that lists a language learning activity's components and properties of each component in the language learning activity, and a properties list that lists properties of a selected component in a language learning activity, wherein displaying the activity builder user interface includes displaying a first language learning activity in the work area;

receiving, at the activity builder user interface, user input that drags and drops a first set of components onto the work area;

adding the first set of components to the first language learning activity being displayed in the work area, including displaying a representation of each component in the first set of components in the work area and the variables list, and displaying a representation of each property of each of the components in the first set of components in the variables list;

receiving user input that selects the representation of a first component in the work area or the variables list and displaying the properties of the first component in the properties list;

receiving user input that drags and drops the representation of a property of a second component displayed in the variables list onto the representation of a property of the first component displayed in the properties list; and automatically generating a relationship between the first and the second component by associating the property of the second component with the property of the first component.

\* \* \* \* \*